United States Patent
Gotou et al.

(10) Patent No.: US 11,603,478 B2
(45) Date of Patent: *Mar. 14, 2023

(54) INK, METHOD OF MANUFACTURING INK, PRINTING METHOD, AND PRINTING DEVICE

(71) Applicant: RICOH COMPANY, LTD., Tokyo (JP)

(72) Inventors: Hiroshi Gotou, Kanagawa (JP); Ayaka Tanaka, Kanagawa (JP); Hiromi Sakaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 533 days.

This patent is subject to a terminal disclaimer.

(21) Appl. No.: 16/751,267

(22) Filed: Jan. 24, 2020

(65) Prior Publication Data

US 2020/0239714 A1   Jul. 30, 2020

(30) Foreign Application Priority Data

Jan. 25, 2019 (JP) .............................. JP2019-011633
Jan. 31, 2019 (JP) .............................. JP2019-015750
Oct. 24, 2019 (JP) .............................. JP2019-193658

(51) Int. Cl.
| | | |
|---|---|---|
| *C09D 11/033* | (2014.01) | |
| *B41J 2/175* | (2006.01) | |
| *B41J 2/335* | (2006.01) | |
| *C08K 3/22* | (2006.01) | |
| *C08K 5/00* | (2006.01) | |
| *C08K 5/053* | (2006.01) | |
| *C08K 5/10* | (2006.01) | |
| *C08L 33/16* | (2006.01) | |
| *C08L 75/04* | (2006.01) | |
| *C08L 83/12* | (2006.01) | |
| *C09D 11/102* | (2014.01) | |

(52) U.S. Cl.
CPC ......... *C09D 11/033* (2013.01); *B41J 2/17503* (2013.01); *B41J 2/3355* (2013.01); *C08K 3/22* (2013.01); *C08K 5/0041* (2013.01); *C08K 5/053* (2013.01); *C08K 5/10* (2013.01); *C08L 33/16* (2013.01); *C08L 75/04* (2013.01); *C08L 83/12* (2013.01); *C09D 11/102* (2013.01); *C08K 2201/003* (2013.01)

(58) Field of Classification Search
None
See application file for complete search history.

(56) References Cited

U.S. PATENT DOCUMENTS

| | | | |
|---|---|---|---|
| 8,911,071 B2 | 12/2014 | Nishino et al. | |
| 2014/0002539 A1 | 1/2014 | Goto et al. | |
| 2015/0307729 A1 | 10/2015 | Gotou et al. | |
| 2016/0264808 A1 | 9/2016 | Kido et al. | |
| 2017/0029638 A1* | 2/2017 | Fujii .................... | C09D 11/102 |
| 2017/0182770 A1 | 6/2017 | Gotou | |
| 2017/0247561 A1 | 8/2017 | Nakagawa et al. | |
| 2018/0170061 A1 | 6/2018 | Nakamura et al. | |
| 2018/0320011 A1* | 11/2018 | Kido .................... | C09D 11/106 |
| 2019/0092956 A1 | 3/2019 | Imanaga et al. | |
| 2019/0276694 A1 | 9/2019 | Yamazaki et al. | |
| 2019/0283406 A1 | 9/2019 | Fujita et al. | |
| 2020/0377747 A1 | 12/2020 | Sakaguchi et al. | |

FOREIGN PATENT DOCUMENTS

| | | | |
|---|---|---|---|
| JP | 2005-225948 | | 8/2005 |
| JP | 2006-342323 | | 12/2006 |
| JP | 2006-342324 | | 12/2006 |
| JP | 2012-207202 | | 10/2012 |
| JP | 2012-241135 | | 12/2012 |
| JP | 2014-094998 | | 5/2014 |
| JP | 2017-119415 | | 7/2017 |
| WO | WO 2017/126345 | * | 7/2017 |

OTHER PUBLICATIONS

U.S. Appl. No. 16/878,001, filed May 19, 2020, 2020/0377747, Sakaguchi et al.
Extended European Search Report dated May 29, 2020 in corresponding European Patent Application No. 20153672.9, citing documents AA-AC therein. 7 pages.
U.S. Appl. No. 16/515,321, filed Jul. 18, 2019, Hiroshi Gotou, et al.

* cited by examiner

*Primary Examiner* — Robert T Butcher
(74) *Attorney, Agent, or Firm* — Grüneberg and Myers, PLLC

(57) ABSTRACT

An ink contains water, an organic solvent, a polyurethane resin, and a cyclic ester including a structure represented by Chemical formula I, wherein the proportion of the cyclic ester having a crystal having a particle diameter of 1 μm or greater is less than 4 ppm of the total of the ink after the ink is allowed to stand at a temperature range of from 20 to 30 degrees C. for 30 days.

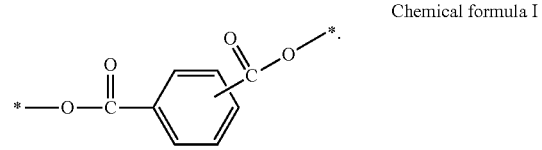

Chemical formula I

20 Claims, 7 Drawing Sheets

INK, METHOD OF MANUFACTURING INK, PRINTING METHOD, AND PRINTING DEVICE

CROSS-REFERENCE TO RELATED APPLICATIONS

This patent application is based on and claims priority pursuant to 35 U.S.C. § 119 to Japanese Patent Application Nos. 2019-011633, 2019-015750, and 2019-193658, filed on Jan. 25, 2019, Jan. 31, 2019, and Oct. 24, 2019, respectively, in the Japan Patent Office, the entire disclosures of which are hereby incorporated by reference herein.

BACKGROUND

Technical Field

The present invention relates to an ink, a method of manufacturing an ink, a printing method, and a printing device.

Description of the Related Art

Color images can be easily formed with low running cost utilizing inkjet recording methods. Therefore, the inkjet recording method has become popular. However, depending on a combination of ink and recording media, this method causes image deficiencies such as ink blurring, which significantly degrades image quality.

For example, since non-permeable media for signage does not absorb ink, images are violently blurred or fail to be fixed.

In addition, if an image is recorded on coated paper for commercial printing or publication printing using fillers such as calcium carbonate and kaolin as a coated layer material, the image is violently blurred or ink density does not demonstrate.

Therefore, in order to improve the drying property and the fixability, the ink composition is changing in the direction of using a quantity of water-dispersible resin particles with a hydrophobic organic solvent such as an organic solvent having an SP value of from 8.9 to 12.0 or an organic solvent having a high vapor pressure.

In addition, since the non-permeable medium for signage has poor ink fixability, it is necessary to select a material for the water-dispersible resin and in addition, the amount of addition is increasing. In particular, in order to improve the fixability of the ink onto the film of a non-permeable medium, the chance of using polyurethane resin synthesized from a polyol material containing an aromatic ring as an ink component is increasing.

Although the image quality is improved due to the factors mentioned above, there are problems with storage stability, liquid permeability, and discharging stability.

SUMMARY

According to embodiments of the present disclosure, provided is an ink which contains water, an organic solvent, a polyurethane resin, and a cyclic ester including a structure represented by Chemical formula I, wherein the proportion of the cyclic ester having a crystal having a particle diameter of 1 µm or greater is less than 4 ppm of the total of the ink after the ink is allowed to stand at a temperature range of from 20 to 30 degrees C. for 30 days,

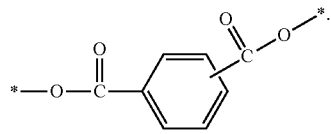
Chemical formula I

As another aspect of embodiments of the present disclosure, provided is a method of manufacturing an ink which includes mixing water, an organic solvent, and polyurethane resin to obtain a mixture; and heating the mixture in a temperature range of from 40 to lower than 70 degrees C. for six hours to obtain the ink.

As another aspect of embodiments of the present disclosure, provided is an improved.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
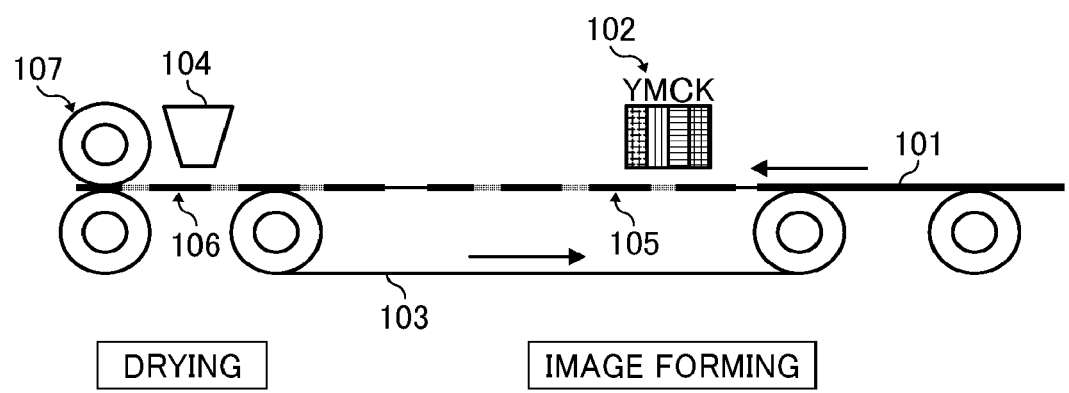
FIG. 1 is a schematic diagram illustrating an example of the printing device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, an ink is provided which can strike a balance between fixing and liquid permeability.

An aqueous inkjet ink has been proposed in JP-2012-241135-A1 which has excellent drying property and fixability when printed on the surface of a hydrophilic resin medium and also excellent dispersion stability of a resin binder. Also, in JP-2012-241135-A1 mentioned above, inclusion of an amide-based solvent having a specific structure, an aqueous emulsion-based polymer, and a cross-linking agent for the polymer is regulated. Inks containing the amide compounds having the specific structure mentioned above and other specific products also have been proposed in JP-2012-207202-A1 and JP2014-94998-A1.

One aspect of the present disclosure is the following 1, which includes 2 to 21 in embodiment of 1. These are described in detail below.

1. An ink contains water, an organic solvent, a polyurethane resin, and a cyclic ester including a structure represented by Chemical formula I, wherein the proportion of the cyclic ester having a crystal having a particle diameter of 1 μm or greater is less than 4 ppm of the total of the ink after the ink is allowed to stand at a temperature range of from 20 to 30 degrees C. for one month (30 days).

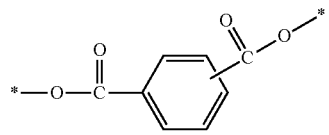

Chemical formula I

2. The ink according to 1 mentioned above, wherein the polyurethane resin contains a polyurethane resin having a structure represented by Chemical formula I.

3. The ink according to 1 or 2 mentioned above further contains a colorant.

4. The ink according to 3 mentioned above, wherein the proportion of a solid portion of the polyurethane resin in the ink is 3 percent by mass or more and a solid portion ratio of the colorant to the polyurethane resin is from 1.0:2.0 to 1.0:11.0.

5. The ink according to 3 or 4 mentioned above, wherein the colorant contains a pigment.

6. The ink according to any one of 1 to 5 mentioned above, wherein the organic solvent contains a diol compound and an organic solvent having a solution parameter (SP) of from 8.9 to 12.0.

7. The ink according to any one of 1 to 6 mentioned above, wherein the ink has a pH of 8.5 or greater.

8. The ink according to 7 mentioned above further contains a strong basic compound.

9. The ink according to 8 mentioned above, wherein the strong basic compound contains sodium hydroxide or potassium hydroxide.

10. The ink according to any one of 1 to 9 mentioned above further contains a polyether-modified siloxane compound as surfactant.

11. A method of manufacturing the ink according to any one of 1 to 10 mentioned above includes mixing water, an organic solvent, and a polyurethane resin particle to obtain a mixture and heating the mixture in a temperature range of from 40 to lower than 70 degrees C. for six hours or longer.

12 A method of manufacturing an ink includes mixing water, an organic solvent, a polyurethane resin, and a colorant to obtain a mixture and heating the mixture in a temperature range of from 40 to lower than 70 degrees C. for six hours or longer to obtain the ink.

13. A printing method includes attaching the ink of any one of 1 to 10 mentioned above to a substrate.

14. The printing method according to 13 mentioned above, wherein the attaching further includes discharging the ink from an ink discharging head including a nozzle plate through which the ink is discharged, wherein the ink contains water, an organic solvent, a polyurethane resin, and a cyclic ester including a structure represented by Chemical formula I, wherein the proportion of the cyclic ester having a crystal having a particle diameter of 1 μm or greater is less than 4 ppm of the total of the ink after the ink is allowed to stand at a temperature range of from 20 to 30 degrees C. for one month (30 days), wherein the ink has a receding contact angle of 35 degrees or greater to the nozzle plate.

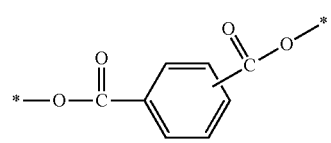

Chemical formula I

15. A printing device includes an ink cartridge containing the ink of any one of 1 to 10 mentioned above and a discharging device that discharges the ink.

16. The printing device according to 15 mentioned above further includes a filter disposed on an ink flow path between the ink cartridge and the discharging device.

17. The printing device according to 15 or 16 mentioned above, wherein the discharging device includes an ink discharging head having a nozzle plate that discharges the ink, wherein the ink has a receding contact angle of 35 degrees or greater to the nozzle plate.

18. The printing device according to 17 mentioned above, wherein the nozzle plate has an ink-repellent film and the ink-repellent film contains a fluorine-containing acrylate ester polymer.

19. The printing device according to 18 mentioned above, wherein the fluorine-containing acrylate ester polymer contains a polymer obtained by polymerizing at least one of a compound represented by the following Chemical formula II and a compound represented by the following Chemical formula III.

Chemical formula II

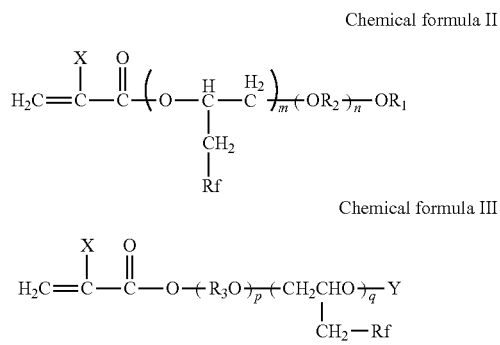

Chemical formula III

In Chemical formula II and Chemical formula III, X represents a hydrogen atom, a linear or branched alkyl group having 1 to 21 carbon atoms, a halogen atom, a CFX1X2 group, where X1 and X2 each, independently represent hydrogen atoms or halogen atoms, a cyano group, a linear or branched fluoroalkyl group having 1 to 21 carbon atoms, a substituted or non-substituted benzyl group, and a substituted or non-substituted phenyl group, $R_1$ represents an alkyl group having 1 to 18 carbon atoms, $R_2$ represents an alkylene group having 2 to 6 carbon atoms, $R_3$ represents an alkylene group having 2 to 6 carbon atoms, Y represents an acid group, Rf represents a linear or branched fluoroalkyl group having 1 to 21 carbon atoms. m represents an integer of from 1 to 10, n represents an integer of from 2 to 90, p represents an integer of from 1 to 90, and q represents an integer of from 1 to 10.

20. The printing device according to 19 mentioned above, wherein the fluorine-containing acrylate ester polymer contains a polymer having at least one of a structure unit represented by the following Chemical formula IV and a structure unit represented by the following Chemical formula V, Chemical formula IV

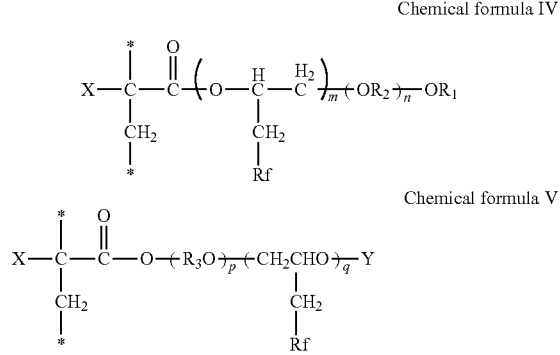

Chemical formula V

In Chemical formula IV and Chemical formula V, X represents a hydrogen atom, a linear or branched alkyl group having 1 to 21 carbon atoms, a halogen atom, a CFX1X2 group, where X1 and X2 each, independently represent hydrogen atoms or halogen atoms, a cyano group, a linear or branched fluoroalkyl group having 1 to 21 carbon atoms, a substituted or non-substituted benzyl group, and a substituted or non-substituted phenyl group, R1 represents an alkyl group having 1 to 18 carbon atoms, R2 represents an alkylene group having 2 to 6 carbon atoms, R3 represents an alkylene group having 2 to 6 carbon atoms, Y represents an acid group, Rf represents a linear or branched fluoroalkyl group having 1 to 21 carbon atoms. m represents an integer of from 1 to 10, n represents an integer of from 2 to 90, p represents an integer of from 1 to 90, and q represents an integer of from 1 to 10.

21. The printing device according to any one of 18 to 20 mentioned above, wherein the ink-repellent film contains a polymer having a fluorine-containing heterocyclic structure in the main chain.

Ink

The ink of the present disclosure contains water, an organic solvent, a polyurethane resin, and a cyclic ester including a structure represented by Chemical formula I, wherein the proportion of the cyclic ester having a crystal having a particle diameter of 1 μm or greater is less than 4 ppm, preferably from 0.2 ppm to less than 4 ppm, of the total of the ink as the ink is allowed to stand at a temperature range of from 20 to 30 degrees C. for one month (30 days).

Chemical formula I

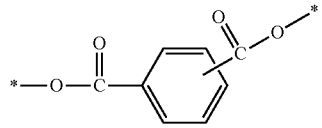

In particular, since ink does not easily fix on a non-permeable medium for signage, it is necessary to select materials of water-dispersible resin or increases the amount of addition. Moreover, in order to improve fixability of ink onto a film of a non-permeable medium, frequency of using polyurethane resin synthesized from a polyol material having an aromatic ring having a structure represented by the following Chemical formula I as an ink composition is increasing.

Chemical formula I

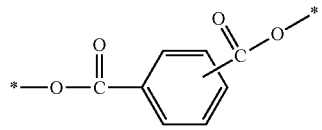

However, the polyol material having an aromatic ring having a structure represented by the following Chemical formula I used a raw material of the polyurethane resin contains a cyclic ester having a structure represented by Chemical formula I as a by-product, which is never or little soluble in water or a water-soluble solvent. This is contained in a highly viscous polyol so that it turs into a polyurethane resin in which the cyclic ester is not removable.

When an ink is manufactured using the polyurethane resin mentioned above and the ink is placed in an ink pack at room temperature (20 to 30 degrees C.) and allowed to stand for at least one month (30 days), the cyclic ester compound having the structure represented by the Chemical formula I elutes from the polyurethane resin so that the cyclic ester crystal having the structure represented by the Chemical formula I precipitates in the ink. It has been found that the liquid permeability deteriorates due to the precipitation of the cyclic ester crystals in the ink, which makes discharging unstable.

The cyclic ester having the structure represented by the Chemical formula I contained in the ink is considered to include a raw material used for producing a polyurethane resin and a by-product of the raw material. A specific example is a cyclic ester having the structure represented by the following Chemical formula A.

Chemical formula A

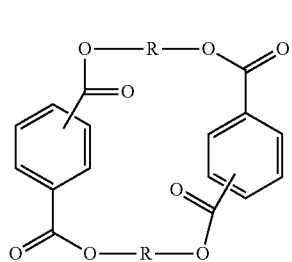

In the Chemical formula A, R represents an alkylene, usually an alkylene having 3 to 10 carbon atoms.

The ink contains raw materials and by-products that are not removed during the purification or ink manufacturing and the cyclic ester having the structure represented by Chemical formula I is found to crystallize in the ink over time. The present inventors have found that when the proportion of the cyclic ester having the structure represented by the Chemical formula I having a particle size of 1 μm or greater is less than 4 ppm of the entire of the ink, the ink can strike a balance between fixing and liquid permeability.

Further, according to the present disclosure, an ink can be provided which has good fixing property, good drying property, good image density, good liquid permeability, good discharging stability, and excellent storage stability even for a non-permeable medium for signage and commercial printing paper.

The cyclic ester having the structure represented by the Chemical formula I is usually insoluble in water. Even if the cyclic ester having the structure represented by the Chemical formula I is not present in the moisture in the aqueous dispersion of the urethane resin particle, crystals of the cyclic ester having the structure represented by the Chemical formula I may precipitate in the ink when the aqueous dispersion of the urethane resin particles is mixed with other components such as an organic solvent to prepare an ink. It is inferred that the cyclic ester having the structure represented by the Chemical formula I contained in the urethane resin particles elutes and crystallizes when mixed with the organic solvent.

When the ink is allowed to stand at room temperature (20 to 30 degrees C.) for one month (30 days) or longer, it has been found that when the proportion of the crystal of the cyclic ester in the ink having a particle diameter of 1 μm or greater is 4 ppm or more of the entire ink, the ink has a practical problem with liquid permeability, which finally causes discharging failure. Further, when the proportion of the cyclic ester having 1 μm or greater is less than 4 ppm in the entire ink, it has been confirmed that no practical problem occurs. Note that less than 4 ppm of the entire ink means that the proportion of crystals to the total mass of the entire ink is less than 0.0004 percent by mass.

Allowed to stand" means storing without applying intentional vibration.

Further, by heating the ink containing the cyclic ester compound having the structure represented by the Chemical formula I in the ink at a temperature of from 40 to lower than 70 degrees C. for six hours or more, the precipitation amount of the cyclic ester crystals decreases. Further, the present inventors have found that the cyclic ester crystals precipitating in the ink disappear.

However, the mechanism of the amount of precipitated cyclic ester crystals decreasing and the mechanism of the cyclic ester crystals disappearing are not clear. In the case of heating at 40 degrees C., the precipitation of the cyclic ester crystals decreases when the ink is heated for two weeks or longer. At 68 degrees C., the precipitation of the cyclic ester crystals stops and the crystal precipitating in the ink disappears when the ink is heated for six hours.

The heating time is preferably from two weeks to one month when heated at 40 degrees C. and preferably six hours to 12 hours when heated at 68 degrees C.

Heating at a temperature lower than 40 degrees C. has no effect of reducing the precipitation of the cyclic ester crystal. Heating at 70 degrees C. or higher may change the ink properties or cause ink liquid separation.

Particularly preferably, storage at a temperature of from 55 to 65 degrees C. for 12 to 24 hours maximizes the effect with less damage to the ink.

In the present disclosure, the precipitated crystals is filtrated by filter paper (for example, filter paper No. 5C for Kiriyama funnel having a particle retention ability of 1 μm. Thereafter, taking the difference between the mass of the filter paper before filtration and the total of the mass of the crystal retained on the filter paper and the mass of the filter paper after filtration, the crystal of the cyclic ester having the structure represented by the Chemical formula I is quantified. Therefore, the crystal retained after filtration has a particle size of 1 μm or more and the proportion of the crystal of the cyclic ester including the structure represented by the Chemical formula I and having a particle size of 1 μm or more are less than 4 ppm of the entire ink.

The mechanism of the decrease and disappearance of the cyclic ester crystal is inferred that, when the cyclic ester compound is heated in the presence of a pH regulator (basic compound) contained in the ink, the cyclic ester compound is hydrolyzed and the basic compound is added to the ring-opened carboxylic group to form a water-soluble compound, which finally leads to the decrease and disappearance of the cyclic ester crystal in the ink.

Under such a circumstance, image quality is improved and ink storage stability, liquid permeability, and discharging stability are also improved.

Incidentally, inclusion of the cyclic ester having the structure represented by the Chemical formula I in the ink can be subject to qualitative analysis by GC-MS analysis, LC-MS analysis+$C^{13}$-NMR+$H^1$-NMR+FT-IR after separating the crystal precipitated in the ink from the ink.

In addition, in order to ensure wettability of the ink to non-permeable media for signage and commercial printing paper, it is preferable to decrease the dynamic surface tension of the ink at a surface life time of 15 msec as measured by 25 degrees C. maximum bubble pressure technique to 34.0 mN/m or less and keep the static surface tension of the ink at 25 degrees C. at 20.0 mN/m or more.

Under such a circumstance, image quality is improved and ink storage stability, liquid permeability, and discharging stability are also improved.

Dynamic surface tension of the ink at a surface life of 15 msec according to maximum bubble pressure technique can be measured at 25 degrees C. by, for example, SITA_DynoTester (manufactured by SITA Messtechnik GmbH).

Static surface tension of the ink can be measured at 25 degrees C. by using, for example, a fully-automatic surface tensiometer (DY-300, manufactured by Kyowa Interface Science Co., LTD.).

When the balance between the dynamic surface tension and the static surface tension of the ink is optimized and the receding contact angle of the ink against the nozzle plate is set to 35 degrees C. or greater, the ink is not easy to be wet on the ink repellent film of the nozzle plate of an ink discharging head and discharging stability is secured so that an extremely stable and ideal printing device can be obtained without nozzle omission in the continuous discharging.

The receding contact angle of the ink against the nozzle plate is 35 degrees or more, preferably from 35 to 80 degrees, and more preferably from 40 to 70 degrees.

Even if the ink adheres to the wall surface of the ink chamber of an ink discharging head, it is easy to repel the ink again when the receding contact angle is 35 degrees or greater. Incidentally, the upper limit of the receding contact angle is not particularly limited because as the receding contact angle increases, the nozzle plate does not become wet. Taking into account wettability and permeability to a recording medium, the receding contact angle does not preferably surpass 80 degrees.

The receding contact angle can be measured by, for example, an automatic contact angle measuring device and an expansion/contraction method.

An example of the automatic contact angle measuring device is DMo-501 (manufactured by Kyowa Interface Science Co., Ltd.).

For example, 2 μl of ink is extruded from a syringe to the exterior surface of the nozzle plate for use in the present disclosure to measure the receding contact angle by the device mentioned above according to the contraction method. The receding contact angle in the present disclosure means a value at a measurement temperature of 25 degrees C.

The static surface tension B of the ink at 25 degrees C. is preferably from 20.0 to 30.0 mN/m.

When the static surface tension is in the range of from 20.0 to 30.0 mN/m, wettability of the ink to non-permeable media for signage and commercial printing paper can be enhanced and occurrence of cockling and curling decreases, so that permeation and drying of plain paper becomes good.

Next, details of the ink and the method for manufacturing the ink will be described.

Ink

Organic Solvent

The ink of the present disclosure preferably contains at least one type of organic solvent (hereinafter referred to as organic solvent X) having a solubility parameter (SP value) of from 8.9 to 12.0. Inclusion of the organic solvent X improves wettability of the ink to a recording medium so that the ink components permeates commercial printing paper such as coated paper having a coated layer with poor ink absorption property. Therefore, occurrence of beading can be reduced.

In addition, such ink easily permeates a non-permeable medium.

As described later, the ink of the present disclosure preferably contains a diol as an organic solvent. However, the diol compound may also serve as an organic solvent having a solubility parameter (SP value) of from 8.9 to 12.0. Inclusion of the organic solvent X improves wettability of the ink to a recording medium so that the ink components permeates commercial printing paper such as coated paper having a coated layer with poor ink absorption property. Therefore, occurrence of beading can be reduced. In addition, the ink easily permeates a non-permeable medium.

In general, an organic solvent having an SP value of 8.9 or greater has rich water solubility. For this reason, such an organic solvent tends not to be separated, so that it is suitable for the aqueous ink of the present invention. Further, due to an organic solvent having an SP value of 12.0 or less improves the drying property and beading.

The SP value is defined by the regular solution theory introduced by Hildebrand and indicates the solubility of a two-component system solution. In addition, the SP value in the present disclosure is calculated by Fedors method. The SP value is represented in $(J/cm^3)^{0.5}$ by root square of the cohesion energy density in the regular solution theory. It can be calculated by simple software available on the market.

As the organic solvent X, water-soluble articles are suitable. In particular, the amide compound represented by the Chemical formula VI or the oxetane compound represented by the Chemical formula VII is suitable.

Chemical formula VI $$R-O-\underset{H_2}{C}-\underset{H_2}{C}-\underset{\parallel}{\overset{O}{C}}-N\underset{CH_3}{\overset{CH_3}{\diagdown}}$$

In Chemical formula VI, R represents an alkyl group having 1 to 6 carbon atoms.

Chemical formula VII (oxetane structure with R₁ and CH₂OH substituents)

In Chemical formula VII, $R_1$ is an alkyl group having 1 to 2 carbon atoms.

Specific examples of the amide compound represented by the Chemical formula VI include, but are not limited to, compounds represented by the following Chemical formulae 1 to 4.

Chemical formula 1

$$H_3C-O-\underset{H_2}{C}-\underset{H_2}{C}-\underset{\parallel}{\overset{O}{C}}-N\underset{CH_3}{\overset{CH_3}{\diagdown}}$$

SP value 9.19

Chemical formula 2

$$n\text{-}C_4H_9-O-\underset{H_2}{C}-\underset{H_2}{C}-\underset{\parallel}{\overset{O}{C}}-N\underset{CH_3}{\overset{CH_3}{\diagdown}}$$

SP value 9.03

Chemical formula 3

$$n\text{-}C_5H_{11}-O-\underset{H_2}{C}-\underset{H_2}{C}-\underset{\parallel}{\overset{O}{C}}-N\underset{CH_3}{\overset{CH_3}{\diagdown}}$$

SP value 9.00

-continued

Chemical formula 4

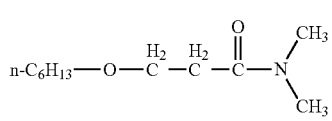

SP value 8.96

Specific examples of the oxetan compound represented by the Chemical formula VII include, but are not limited to, compounds represented by the following Chemical formulae 5 and 6.

Chemical formula 5

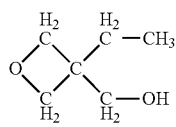

SP value: 11.31

Chemical formula 6

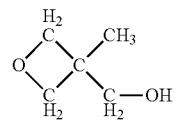

SP value: 11.79

The proportion of the organic solvent X is preferably 3 percent by mass or more and more preferably from 5 to 20 percent by mass to the total mass of the ink. When the proportion is 5 percent by mass or more, the ink component permeates commercial printing paper, it is possible to reduce beading, and the ink easily wet on the non-permeable media. In addition, when the proportion is 20 percent by mass or less, discharging stability of the ink is not degraded by an increase of viscosity of the ink.

Furthermore, in the present disclosure, inclusion of a glycol ether compound (compound Z) having a vapor pressure of 50 mmHg or more in an environment of 100 degrees C. as an organic solvent enhances drying property and the drying property is improved even on commercial printing paper. Further, even when an image portion is brought into contact with a conveyance roller immediately after drying the image portion with hot air at 100 degrees C., the image is not transferred and high-speed performance is secured.

Compounds soluble in pure water are suitable as the compound Z.

Specific examples include, but are not limited to, propylene glycol monopropylether (boiling point: 150 degrees C., vapor pressure: 107 mmHg), propylene glycol monoethylether (boiling point: 133 degrees C., vapor pressure: 252 mmHg), propylene glycol monomethylether (boiling point: 120 degrees C., vapor pressure: 360 mmHg), propylene glycol monobutyl ether (boiling point: 170 degrees C., vapor pressure: 59 mmHg), 3-methoxy-1-butanol (boiling point: 161 degrees C., vapor pressure: 76 mmHg), and 3-methoxy-3-methyl-1-butanol (boiling point: 174 degrees C., vapor pressure: 50 mmHg).

The mass ratio of the organic solvent X to the compound Z in the ink is preferably from 1:1 to 8:1. More preferably, it is from 3:1 to 5:1. When this ratio is 1:1 or greater, that is, the organic solvent X is equal to or greater than the compound Z, drying property is not excessively improved. Therefore, the inside of the inkjet head is prevented from being too dried so that a problem with discharging stability does not occur. In addition, when the ratio is 8:1 or less, the proportion of the organic solvent X is not excessive so that drying property on commercial printing paper is enhanced, thereby ameliorating productivity.

The total proportion of the organic solvent in the ink containing the organic solvent X and the compound Z is preferably from 5 to 30 percent by mass. When the proportion is 5 percent by mass or more, beading on commercial printing paper is still prevented. When the mass ratio is 30 percent by mass or less, it is highly unlikely that viscosity increases excessively, causing problems with discharging stability.

Further, it is preferable to contain a polyhydric alcohol as an organic solvent for discharging stability and ink storage stability. Specific examples include, but are not limited to, diethylene glycol (bp: 245 degrees C.), triethylene glycol (bp: 285 degrees C.), tetraethylene glycol (bp: 324 to 330 degrees C.), 1,3-butanediol (bp: 203 to 204 degrees C.), glycerin (bp: 290 degrees C.), diglycerin (bp: 270 degrees C./20 hPa), 1,2,3-butanetriol (bp: 175 degrees C./33 hPa), 1,2,4-butanetriol (bp: 190 to 191 degrees C./24 hPa), dipropylene glycol (bp: 232 degrees C.), 1,5-pentanediol (bp: 242 degrees C.), propylene glycol (bp: 187 degrees C.), 2-methyl-2,4-pentanediol (bp: 197 degrees C.), ethylene glycol (bp: 196 to 198 degrees C.), tripropylene glycol (bp: 267 degrees C.), hexylene glycol (bp: 197 degrees C.), polyethylene glycol (viscous liquid to solid), 1,6-hexanediol (bp: 253 to 260 degrees C.), 1,2,6-hexanetriol (bp: 178 degrees C.), trimethylolethane (solid, mp: 199 to 201 degrees C.), and trimethylolpropane (solid, mp: 61 degrees C.).

The organic solvent preferably contains at least one type of non-wetting agent type polyol compounds or glycol ether compounds having 8 to 11 carbon atoms. The polyol compound preferably contains a diol compound. "Non-wetting" means solubility being between 0.2 to 5.0 percent by mass in water at 25 degrees C. Of these compounds, 1,3-diol compounds represented by the following Chemical formula VIII is preferable. Compounds of 2-ethyl-1,3-hexane diol (solubility of 4.2 percent at 25 degrees C.) and 2,2,4-trimethyl-1,3-pentane diol (solubility of 2.0 percent at 25 degrees C.) are particularly preferable.

Chemical formula VIII

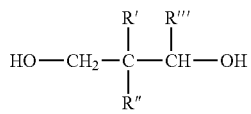

In Chemical formula VIII, R' represents a methyl group or an ethyl group, R" represents a hydrogen or a methyl group, and R'" represents an ethyl group or a propyl group.

Specific examples of the other non-wetting agent type polyol compounds include, but are not limited to, aliphatic diols such as 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, and 5-hexene-1,2-diol.

The proportion of the non-wetting agent type polyol compound and the glycol ether compound having 8 to 11 carbon atoms in the ink is preferably from 0.5 to 4 percent by mass and more preferably from 1 to 3 percent by mass. When the proportion is not less than 0.5 percent by mass, permeation effect of the ink is obtained and image quality is improved. In addition, if the proportion is not greater than 4 percent by mass, the ink is sufficiently dissolved so that no separation occurs and the initial viscosity of the ink is not high.

Water-Dispersible Resin Particle

As the water-dispersible resin (or water-dispersible resin particle), a resin having excellent film-forming (image forming) property, chemical resistance, water-resistance, and weather resistance is suitable for image recording of strong water-resistance and high image density (high coloring property). For example, condensation-based synthetic resins, addition-based synthetic resins, and natural polymers are suitable. In the present disclosure, polyurethane resin particles are contained.

In addition, since the non-permeable medium for signage has poor ink fixability, it is necessary to select a material for the water-dispersible resin particle and in addition, increase the amount of addition. Further, polyurethane resin particles synthesized from a polyol material containing an aromatic ring having a structure represented by the Chemical formula I are widely used in order to improve the fixability to a film of a non-permeable medium.

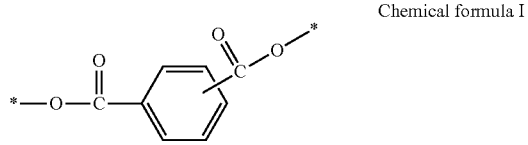

Chemical formula I

Specific examples of the polyol raw material containing an aromatic ring having a structure represented by the Chemical formula I include, but are not limited to, terephthalic acid and isophthalic acid. When terephthalic acid or isophthalic acid is used as a raw material, a cyclic ester compound is produced. It has been confirmed by GC-MS that a cyclic ester in which two types of phthalic acid are mixed is produced when two types of raw materials are used.

In the present disclosure, it is preferable that a polyol raw material containing an aromatic ring having a structure represented by the Chemical formula I be used as the raw material of the polyurethane resin particle to contain a polyurethane resin having a structure represented by the Chemical formula I.

The ratio of the polyol raw material containing an aromatic ring having the structure represented by the Chemical formula I in the polyurethane resin having the structure represented by the Chemical formula I is about a half of the polyol. In the polyurethane resin, it is preferably about 10 to about 30 percent. When the ratio of the polyol raw material is in the range specified above, alcohol resistance is excellent.

A preferable range of the proportion of the polyurethane resin having the structure represented by the Chemical formula I is from 2.0 to 20.0 percent by mass and more preferably from 2.8 to 15.0 percent by mass in resin solid portion.

Specific examples of the other condensation-based synthetic resins include, but are not limited to, polyester resins, polyurethane resins, polyepoxy resins, polyamide resins, polyether resins, poly(meth)acrylic resins, acrylic-silicone resins, and fluorine-containing resins.

Specific examples of the addition-based resins include, but are not limited to, polyolefin resins, polystyrene resins, polyvinyl alcohol resins, polyvinyl ester resins, polyacrylic acid resins, and unsaturated carboxylic acid resins.

Specific examples of the natural polymer include, but are not limited to, celluloses, rosins, and natural rubber.

Of these, polyurethane resin fine particles are preferable in terms of the fixability of the ink. The water-dispersible resin can be used alone or in combination.

As the water-dispersible resin, a self-dispersible resin having a hydrophilic group thereby having self-dispersibility and a resin having no dispersibility while dispersibility is imparted by a surfactant or a resin having a hydrophilic group are usable.

Of these, emulsions of resin particles obtained by emulsification polymerization or suspension polymerization of ionomers or unsaturated monomers of a polyester resin or polyurethane resin are most suitable.

In the case of emulsification polymerization of an unsaturated monomer, since an unsaturated monomer, a polymerization initiator, a surfactant, a chain transfer agent, a chelate agent, a pH regulator, etc. are added in water to conduct reaction to obtain a resin emulsion, it is easy to obtain a water-dispersible resin and change the resin formulation. Therefore, a water-dispersible resin having target properties is easily obtained.

Since, for a water-dispersible resin, dispersion breakage or cleavage of molecular chains such as hydrolysis is caused in a strong alkali or strong acid environment, pH is preferably from 4 to 12, more preferably from 7 to 11, and furthermore preferably from 8 to 10.5 in terms of the miscibility with the water-dispersible colorant.

In addition, the water-dispersible resin fixes the water-dispersible colorant on media and forms a film at room temperature or higher to improve the fixability of the colorant. Therefore, the minimum film-forming temperature (MFT) of the water-dispersible resin is preferably 100 degrees C. or lower. In addition, when the glass transition temperature of the water-dispersible resin is −40 degrees C. or lower, viscosity of the resin film increases, thereby causing tackiness to printed matter. Therefore, the glass transition temperature of the water-dispersible resin is preferably −30 degrees C. or higher.

The proportion of the water-dispersible resin in the ink is preferably from 0.5 to 20 percent by mass and more preferably from 1 to 15 percent by mass in a solid portion.

However, taking into account the fixability of the colorant to the non-permeable medium for signage or commercial printing paper, it is preferable that the ink contain polyurethane resin particles in a solid content of 3 percent by mass or more and the ratio of the colorant to the polyurethane resin particle be from 1.0:2.0 to 1.0:12.0 and particularly preferably from 1.0:2.0 to 1.0:11.0. The proportion of the polyurethane resin particle is the total amount of the polyurethane resin particle which is the solid portion contained in the ink.

Colorant

The ink of the present disclosure can be a clear ink containing no colorant but can also contain a colorant. The colorant is preferably a pigment.

The colorant includes a surfactant dispersion pigment in which a pigment is dispersed with a surfactant, a resin dispersion pigment in which a pigment is dispersed with a resin, a resin coverage dispersion pigment in which the surface of a pigment is covered with a resin, a self-dispersion pigment in which a hydrophilic group is provided to the surface of a pigment, etc. Of these, water-dispersible pigments are preferable. Of these, it is good to use the resin coverage pigment or self dispersion pigment having at least one hydrophilic group on the surface of a pigment.

Specific examples of such hydrophilic groups include, but are not limited to, —COOM, —SO$_3$M, —PO$_3$HM, —PO$_3$M$_2$, —CONM$_2$, —SO$_3$NM$_2$, —NH—C$_6$H$_4$—COOM, —NH—C$_6$H$_4$—SO$_3$M, —NH—C$_6$H$_4$—PO$_3$HM, —NH—C$_6$H$_4$—PO$_3$M$_2$, —NH—C$_6$H$_4$—CONM$_2$, and —NH—C$_6$H$_4$—SO$_3$NM$_2$. These hydrophilic groups can be introduced by known methods.

The counter ion M in the hydrophilic group is preferably a quaternary ammonium ion. Specific examples include, but are not limited to, tetramethyl ammonium ion, tetraethyl ammonium ion, tetrapropyl ammonium ion, tetrabutyl ammonium ion, tetra pentyl ammonium ion, benzyl trimethyl ammonium ion, benzyl triethyl ammonium ion, and tetrahexyl ammonium ion. Of these, tetraethyl ammonium ion, tetrabutyl ammonium ion, and benzyl trimethyl ammonium ion are preferable and tetrabutyl ammonium ion is particularly preferable.

The ink using the pigment mentioned above particularly has excellent storage stability over time and the viscosity rise during moisture vaporing is reduced. This is because even when moisture is evaporated from water rich ink so that the ink becomes organic solvent rich, dispersion of a pigment is inferred to be kept stable by the hydrophilic group having a quaternary ammonium ion.

A polymer emulsion including a polymer particulate containing a pigment can be preferably used as the colorant other than the pigment having the hydrophilic group. The pigment can be encapsulated in a polymer particulate or adsorbed to the surface thereof. In this case, it is not necessary that all the pigments are encapsulated or adsorbed. The pigments may be partially dispersed in an emulsion.

Specific examples of the polymer for polymer particulate include, but are not limited to, vinyl-based polymers, polyester-based polymers, and polyurethane-based polymers. Of these, the vinyl-based polymers and the polyester-based polymers are particularly suitable. Specific examples are disclosed in, for example, JP-2000-53897-A1 and JP-2001-139849-A1.

In addition, typical organic pigments and complex pigments covering inorganic pigment particles with an organic pigment or carbon black can be used. The complex pigment can be manufactured by a method including precipitating organic pigments under the presence of inorganic pigments, a mechanochemical method including mechanically mixing and grinding inorganic pigments and organic pigments, etc. Optionally, it is possible to provide an organosilane compound layer formed of polysiloxane and alkylsilane between inorganic pigments and organic pigments to improve attachability between them.

The mass ratio of the inorganic pigment particle to the organic pigment of coloring material or carbon black is preferably from 3:1 to 1:3 and more preferably from 3:2 to 1:2. When the amount of the coloring material is in the range mentioned above, the color developability and coloring power do not decrease and the transparency and color tone do not deteriorate.

As the complex pigments, for example, silica/carbon black complex material, silica/phthalocyanine complex material (PB15:3), silica/disazo yellow complex material, and silica/quinacridone complex material (PR122) (manufactured by TODAKOGYO CORP.) are preferable because these have small primary particle diameters.

When inorganic pigment particles having a primary particle diameter of 20 nm are covered with an equivalent amount of an organic pigment, the primary particle diameter of the pigment is about 25 nm. If a suitable dispersant is used to disperse the pigment to the degree of the primary particle, it is possible to manufacture ultrafine pigment dispersion ink having a dispersion particle diameter of 25 nm. With regard to the complex material, the organic pigment on the surface thereof contributes to dispersion and the feature of the inorganic pigment disposed in the center of the complex material demonstrates through the thin layer of the organic pigment having a thickness of about 2.5 nm. Therefore, a pigment dispersant capable of stably dispersing both at the same time has to be selected.

Specific examples of the inorganic pigments include, but are not limited to, titanium oxide, iron oxide, calcium oxide, barium sulfate, aluminum hydroxide, barium yellow, cadmium red, chrome yellow, and carbon black. Of these, carbon black is particularly preferable. For example, channel black, furnace black, gas black, and lamp black manufactured by a known method such as a contact method, a furnace method, and a thermal method are suitable.

Specific examples of the organic pigments include, but are not limited to, azo pigments, polycyclic pigments, dye chelate, nitro pigments, nitroso pigments, and aniline black. Of these, azo pigments and polycyclic pigments are preferable.

Specific examples of the azo pigments include, but are not limited to, azo lake, insoluble azo pigments, condensation azo pigments, and chelate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, and quinofuranone pigments. The dye chelate includes, but are not limited to, basic dye type chelate, and acidic dye type chelate.

Specific examples of the organic pigment include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 139, 150, 151, 155, 153, 180, 183, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 219, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, (Phthalocyanine Blue), 16, 17:1, 56, 60, and 63; C.I. Pigment Green 1, 4, 7, 8, 10, 17, 18, and 36.

BET specific surface area of the pigment is preferably about from about 10 to about 1,500 m$^2$/g, more preferably from about 20 to about 600 m$^2$/g, and furthermore preferably from about 50 to about 300 m$^2$/g.

Unless a pigment having such a suitable specific surface area is easily available, it is possible to reduce the size of the pigment or pulverize the pigment by using, for example, a ball mill, a jet mill, or ultrasonic wave to obtain a relatively small particle diameter.

The median diameter (D$_{50}$) of the water-dispersible colorant is preferably from 10 to 200 nm in the ink.

The proportion of the water dispersible coloring material in the ink is preferably from 1 to 15 percent by mass and more preferably from 1.5 to 10 percent by mass in a solid content. When the proportion is not less than 1 percent by mass, the coloring of the ink and the image density are improved. When the proportion is not greater than 15 percent by mass, the ink does not thicken so that deterioration of discharging property dose not occur. In addition, this is preferable in terms of economy.

Dyes can be added to adjust color tone. However, it should be used within a range having no adverse impact on weather resistance.

Surfactant

Using a polyether-modified siloxane compound is preferable as a surfactant. This makes ink not easy to be wet on a head nozzle plate ink repelling layer. Therefore, defective discharging caused by ink attachment to a nozzle can be prevented and discharging stability is improved. In addition, ink is not easily attached to the surface of a nozzle ink repelling layer which tends to create a problem. The ink is free of defective discharging.

Of these, it is preferable to select surfactants represented by chemical formula IX to chemical formula XII. In particular, surfactants having a low dynamic surface tension, a high permeability, and an excellent leveling property without degrading dispersion stability irrespective of the kind of the water-dispersible colorant and the combinational use of the organic solvents.

These surfactants can be used alone or in combination.

Chemical formula IX

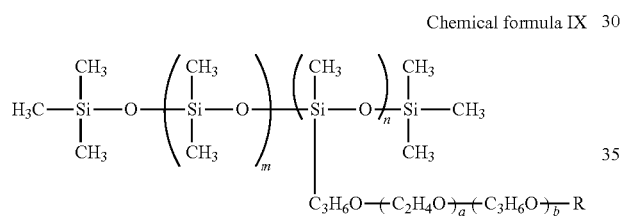

In the Chemical formula IX, R represents a hydrogen atom or an alkyl group having 1 to 4 carbon atoms, m represents 0 or an integer of from 1 to 23, n represents an integer of from 1 to 10, a represents an integer of from 1 to 23, and b represents 0 or an integer of from 1 to 23.

Examples of the compound represented by the Chemical formula IX illustrated above are compounds represented by the following chemical formulae 7 to 14.

Chemical formula 7

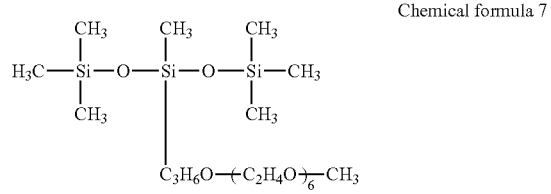

Chemical formula 8

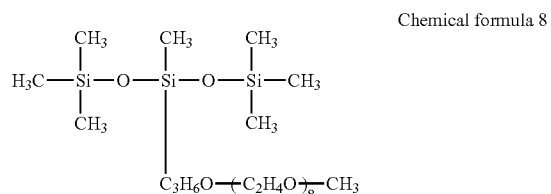

Chemical formula 9

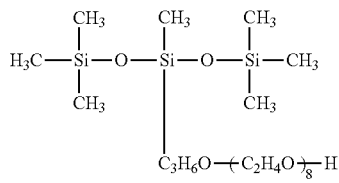

Chemical formula 10

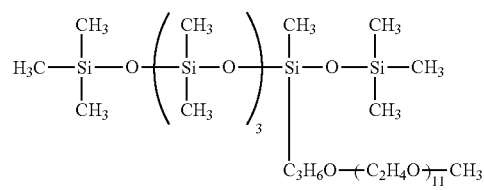

Chemical formula 11

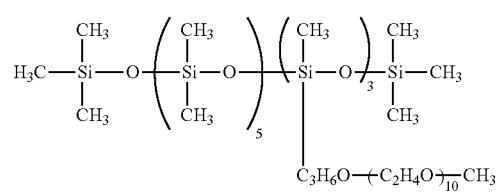

Chemical formula 12

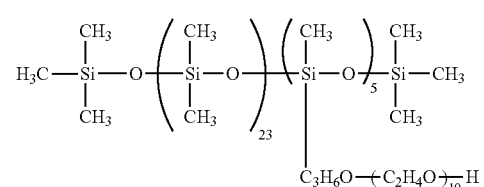

Chemical formula 13

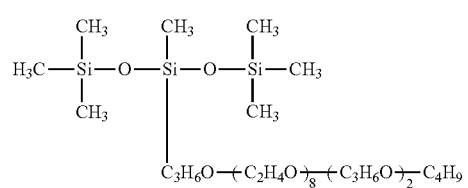

Chemical formula 14

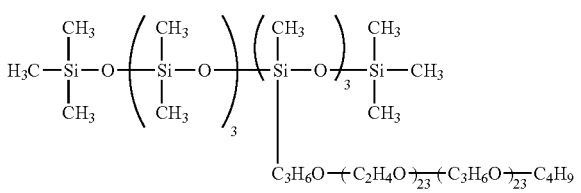

Chemical formula X

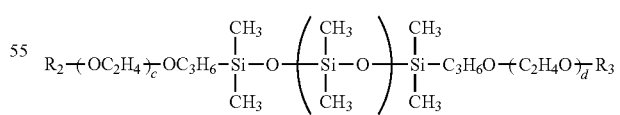

In the Chemical formula X, $R_2$ and $R_3$ each, independently represent hydrogen atoms or alkyl groups having 1 to 4 carbon, m represents an integer of from 1 to 8, c and d each, independently represent integers of from 1 to 10.

Examples of the compound represented by the Chemical formula X are compounds represented by the following chemical formula 15.

Chemical formula 15

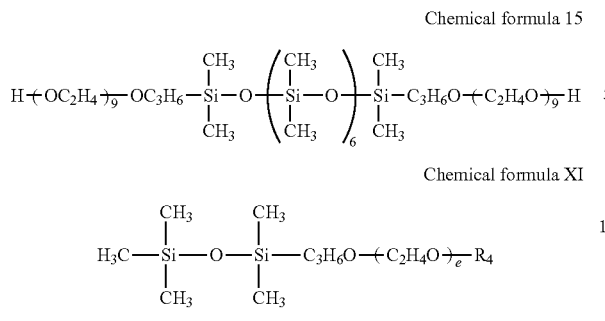

Chemical formula XI

In the Chemical formula XI, $R_4$ represents a hydrogen atom or an alkyl group having 1 to 4 carbon atoms and e represents an integer of from 1 to 8.

Examples of the compound represented by the Chemical formula XI are compounds represented by the following chemical formula 16.

Chemical formula 16

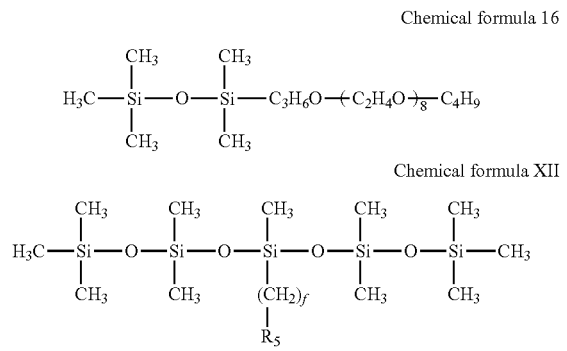

Chemical formula XII

In the chemical formula XII, $R_5$ represents a polyether group represented by the following Chemical formula A and f represents an integer of from 1 to 8.

Chemical formula A

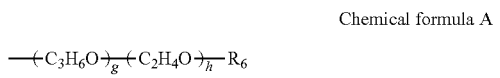

In the Chemical formula A, $R_6$ represents a hydrogen atom or an alkyl group having 1 to 4 carbon atoms, g represents 0 or an integer of from 1 to 23, and h represents 0 or an integer of from 1 to 23, excluding the case in which g and h are simultaneously 0.

Examples of the compound represented by the Chemical formula XII are compounds represented by the following chemical formulae 17 to 19.

Chemical formula 17

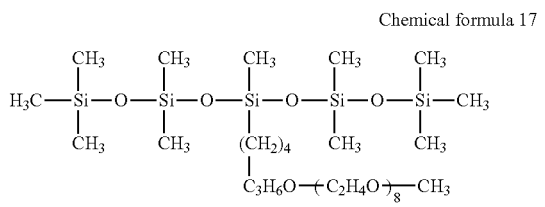

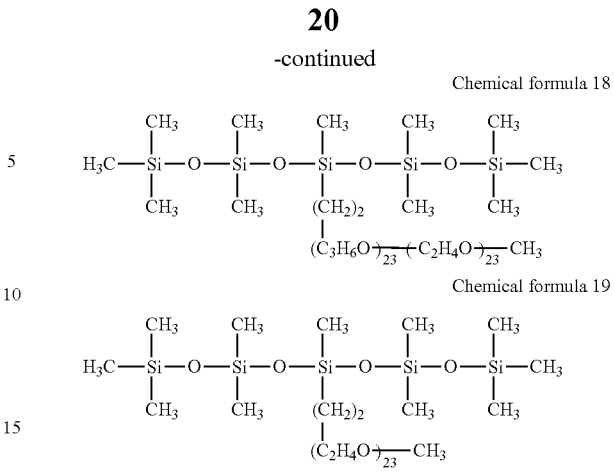

Furthermore, specific examples of polyether-modified siloxane compound surfactants available on the market demonstrating the same feature as the above-mentioned compounds include, but are not limited to, 71ADDITIVE, 74ADDITIVE, 57ADDITIVE, 8029ADDITIVE, 8054ADDITIVE, 8211ADDITIVE, 8019ADDITIVE, 8526ADDITIVE, FZ-2123, and FZ-2191, all manufactured by Dow Corning Toray Co., Ltd., TSF4440, TSF4441, TSF4445, TSF4446, TSF4450, TSF4452, and TSF4460, all manufactured by Momentive Performance Materials Inc., SILFACE SAG002, SILFACE SAG003, SILFACE SAG005, SILFACE SAG503A, SILFACE SAG008, and SILFACE SJM003, all manufactured by Nisshin Chemical Co., Ltd., TEGO_Wet_KL245, TEGO_Wet_250, TEGO_Wet_260, TEGO_Wet_265, TEGO_Wet_270, and TEGO_Wet_280, all manufactured by Evonik Industries AG, and BYK-345, BYK-347, BYK-348, BYK-375, and BYK-377, all manufactured by BYK Japan KK.

In addition, the polyether-modified siloxane compound surfactant, fluorochemical surfactants, silicone-based surfactants, and acetyleneglycol-based or acetylenealcohol-based surfactants can be used in combination.

The proportion of the surfactant in the ink is preferably from 0.001 to 5 percent by mass and more preferably from 0.5 to 3 percent by mass. When the proportion is 0.001 percent by mass or more, the addition of a surfactant has a good impact. However, when the proportion is not less than 5 percent by mass, the addition impact is saturated, meaning that increasing the proportion furthermore is meaningless.

Other Components

The ink of the present disclosure may optionally furthermore contain known additives in addition to the components mentioned above. Examples thereof are penetrants, foam inhibitors (defoaming agents), pH regulators, preservatives and fungicides, chelate reagents, corrosion inhibitors, antioxidants, ultraviolet absorbents, oxygen absorbers, and photostabilizing agents.

Defoaming Agent

A very small amount of a foam inhibitor is added to ink to prevent foaming in the ink. Foaming means that liquid forms a thin film enclosing air. The properties such as surface tension and viscosity of ink have impacts on formation of foams. That is, a force to make the surface area as least as possible is applied to the liquid such as water having a high surface tension so that no or little foaming occurs. Conversely, ink having a high viscosity and high permeation property tends to foam because the surface tension thereof is low so that the foam formed due to viscosity of the liquid is easily maintained and does not easily break.

Normally, foam inhibitors locally lower the surface tension of bubble film or foam inhibitors insoluble in a foaming agent is dotted on the surface of the foaming agent to break the bubble. When a polyether-modified siloxane compound surfactant capable of extremely reducing the surface tension as the surfactant and a foam inhibitor of the former mechanism is used, it is not possible to locally reduce the surface tension of a bubble film. Therefore, the latter foam inhibitor insoluble in a foaming liquid is used. However, ink stability deteriorates due to this foam inhibitor insoluble in the solution.

On the other hand, although the foam inhibitor represented by the following Chemical formula XIII is less able to reduce the surface tension than the polyether-modified siloxane compound surfactant, compatibility with the surfactant is good. Therefore, the defoaming agent is efficiently taken in by the foam film, so that the surface of the foam film locally becomes an unequilibrium state due to the difference of the surface tension between the surfactant and the defoaming agent.

Chemical formula XIII

In the Chemical formula XIII, $R_7$ and $R_8$ each, independently represent alkyl groups having 3 to 6 carbon atoms, $R_9$ and $R_{10}$ each, independently represent alkyl groups having one or two carbon atoms, and n represents an integer of from 1 to 6.

Specific examples of the compound represented by the Chemical formula XIII include, but are not limited to, 2,4,7,9-tetramethyldecane-4,7-diol and 2,5,8,11-tetramethyl dodecane-5,8-diol. Considering defoaming and compatibility with ink, 2,5,8,11-tetramethyldodecane-5,8-diol is particularly preferable.

The proportion of the defoaming agent in the ink is preferably from 0.01 to 10 percent by mass and more preferably from 0.1 to 5 percent by mass. When the proportion is not less than 0.01 percent by mass, defoaming is satisfactory. When the proportion is not greater than 10 percent by mass, defoaming effect does not hit the peak or no adverse impact on ink properties such as viscosity and particle diameter occurs.

pH Regulator

The pH regulator can be any agent capable of adjusting the pH in the range of from 7 to 11 without having an adverse impact on formulated ink and suitably selected to suit to a particular application.

Specific examples thereof include, but are not limited to, alcohol amines, hydroxides of alkali metal elements, hydroxides of ammonium, phosphonium hydroxides, and alkali metal carbonates.

When the pH is less than 7 or greater than 11, an inkjet head or an ink supplying unit tends to be significantly dissolved, which may lead to modification, leakage, poor discharging performance, etc. of the ink.

Specific examples of the alcohol amines include, but are not limited to, diethanolamine, triethanol amine, and 2-amino-2-ethyl-1,3-propanediol.

Specific examples of the hydroxides of alkali metal elements include, but are not limited to, lithium hydroxide, sodium hydroxide, and potassium hydroxide.

Specific examples of the ammonium hydroxides include, but are not limited to, ammonium hydroxide and quaternary ammonium hydroxide.

A specific example of the phosphonium hydroxides is quaternary phosphonium hydroxide.

Specific examples of the alkali metal carbonates include, but are not limited to, lithium carbonate, sodium carbonate, and potassium carbonate.

It is preferable to use a strongly basic compound as the pH regulator.

Inclusion of a strongly basic compound in the ink can diminish precipitation of crystals of the cyclic ester having the structure represented by the Chemical formula I. This improves the fixability of the ink and the liquid permeability. Even when ink is discharged by an inkjet method, non-discharging can be avoided and the ink is stably printed.

It is inferred that the strongly basic compound acts on the cyclic ester compound having the structure represented by the Chemical formula I to cause hydrolysis, thereby reducing crystal precipitation.

The strongly basic compound is not particularly limited. For example, using sodium hydroxide or potassium hydroxide is preferable in terms of effectively reducing crystallization.

The proportion of the strongly basic compound contained in the ink is preferably from 0.05 to 0.24 percent by mass in terms of effectively reducing crystallization.

It is also preferable to use 2-amino-2-ethyl-1,3-propanediol as a pH regulator.

Preservatives and Fungicides

Specific examples of the preservatives and fungicides include, but are not limited to, dehydrosodium acetate, sodium sorbinate, 2-pyridine thiol-1-oxide sodium, sodium benzoate, and pentachlorophenol sodium.

Chelate Reagent

Specific examples of the chelate reagents include, but are not limited to, ethylene diamine sodium tetraacetate, nitrilo sodium triacetate, hydroxyethyl ethylene diamine sodium tri-acetate, diethylene triamine sodium quinternary acetate, and uramil sodium diacetate.

Corrosion Inhibitor

Specific examples of the anti-corrosion agents include, but are not limited to, acid sulfite, thiosodium sulfate, ammonium thiodiglycolate, diisopropyl ammonium nitrite, pentaerythritol quaternary nitrite, and dicyclohexyl ammonium nitrite.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Ultraviolet Absorber

Specific examples of the ultraviolet absorbent include, but are not limited to, a benzophenone-based ultraviolet absorbent, a benzotriazole-based ultraviolet absorbent, a salicylate-based ultraviolet absorbent, a cyanoacrylate-based ultraviolet absorbent, and a nickel complex salt-based ultraviolet absorbent.

Manufacturing of Ink

The ink of the present disclosure can be manufactured by dispersing or dissolving water, an organic solvent, a polyurethane resin particle, and other optional components such as a colorant in an aqueous medium followed by optional stirring and mixing to obtain a mixture and heating the mixture in a temperature range of from 40 to lower than 70 degrees C. for six or more hours. A sand mill, a homogenizer, a ball mill, a paint shaker, an ultrasonic dispersing agent, etc. can be used to disperse or dissolve the ink components. For stirring and mixing, a stirrer having a typical stirring wing, a magnetic stirrer, a high speed dispersing device can be used.

Ink Properties

The properties of the ink of the present disclosure is not particularly limited and can be suitably selected to suit to a particular application.

However, when the static surface tension of the ink is not less than 20 mN/m and the dynamic surface tension thereof is 34 mN/m or less at a bubble life time of 15 msec as measured by maximum bubble pressure technique, wettability to a recording medium is sufficiently secured. However, the ink is not easily wet to the nozzle plate optool repelling film of an inkjet head and discharging can be stabilized so that the ink is extremely stable, which is preferable.

Viscosity of the ink is preferably from 5 to 25 mPa·S and more preferably from 6 to 20 mPa·S at 25 degrees C. When the ink viscosity is 5 mPa·s or greater, the printing density and the text quality of the ink are improved.

When the ink viscosity is 25 mPa·S or less, ink can be stably discharged.

The viscosity can be measured by, for example, a viscometer (RE-85L, manufactured by TOKI SANGYO CO., LTD.) at 25 degree C.

In order to ensure the storage stability of the ink, the pH is preferably from 8 to 11 and more preferably from 8.5 to 11.

The ink of the present disclosure is suitable for any printer including an inkjet head such as a piezoelectric element type in which ink droplets are discharged by transforming a diaphragm forming the wall of the ink flow path using a piezoelectric element as a pressure generating device to press the ink in the ink flow path (JP-H2-51734-A1), a thermal type in which bubbles are produced by heating ink in the ink flow path with a heat element (JP-S61-59911-A1); and an electrostatic type in which ink droplets are discharged by volume changes in the ink flow path caused by transforming a diaphragm that forms the wall surface of the ink flow path by an electrostatic force generated between the diaphragm and the electrode while the diaphragm and the electrode are provided facing each other (JP-H6-71882-A1).

The ink of the present disclosure can be accommodated in a container such as an ink cartridge.

Recording Medium

There is no specific limitation to the recording medium on which recording is possible using the ink of the present disclosure. The recording medium can be suitably selected to suit to a particular application. For example, plain paper, gloss paper, special paper, cloth, film, transparent sheets, print sheet for general purpose, etc. are suitable. However, the ink of the present disclosure is excellent in terms that quality printing with this ink is possible on non-permeable printing media for signage and commercial printing paper as well as other kinds of paper.

Printed matter having an image formed with the ink of the present disclosure is high quality, free of image blur and has excellent stability over time so that it can be suitably used as references for various purposes, on which texts, images, etc. are recorded.

Next, the ink discharging head will be described.

Ink Discharging Head

The ink discharging head has a nozzle plate and other optional members.

Nozzle Plate

The nozzle plate includes a nozzle substrate and an ink repellent film on the nozzle substrate.

Nozzle Substrate

The nozzle substrate is provided with nozzle holes, and the number, shape, size, material, structure, etc., thereof are not particularly limited and can be suitably selected to suit to a particular application.

The nozzle substrate has a surface on the ink discharging side from which the ink is discharged through the nozzle holes and a liquid chamber bonding surface located on the opposite side to the surface on the ink discharge side.

The ink repellent film is formed on the surface on the ink discharging side of the nozzle substrate.

The planar form of the nozzle substrate is not particularly limited and can be suitably selected to suit to a particular application. Examples include a rectangle, a square, a rhombus, a circle, and an ellipse. The cross-section form of the nozzle substrate may be, for example, a flat plate or a plate.

There is no specific limit to the size and form of the nozzle substrate and it can be suitably selected to suit to the size of the nozzle plate.

There is no particular limit to the material for the nozzle substrate and it can be suitably selected to suit to a particular application. Specific examples include, but are not limited to, Al, Bi, Cr, InSn, ITO, Nb, $Nb_2O_5$, NiCr, Si, SiO2, Sn, $Ta_2O_5$, Ti, W, ZAO(ZnO+$Al_2O_3$), and Zn. These can be used alone or in combination. Of these, stainless steel is preferable in terms of rust prevention.

The stainless steel is not particularly limited and can be suitably selected to suit to a particular application. Examples include, but are not limited to, austenitic stainless steel, ferritic stainless steel, martensitic stainless steel, and precipitation hardening stainless steel. These can be used alone or in combination.

At least the surface of the nozzle substrate on the ink discharging side may be subjected to oxygen plasma treatment to introduce hydroxyl groups in terms of improving the attachability between the ink repellent film and the nozzle substrate.

Nozzle Hole

The nozzle hole is not particularly limited with respect to the number, arrangement, spacing, opening form, opening size, cross-section form of the opening, etc. The nozzle hole is not particularly limited and can be suitably selected to suit to a particular application.

The arrangement of the nozzle holes is not particularly limited and can be suitably selected to suit to a particular application. For example, a plurality of the nozzle holes can be equally spaced along the length direction of the nozzle substrate.

The arrangement of the nozzle holes can be appropriately selected according to the type of ink to be discharged. For example, it is preferably from one to a plurality of rows and more preferably one to four rows.

The number of the nozzle holes per row is not particularly limited and can be suitably select to suit to a particular application. For example, the number is preferably from 10 to 10,000 and more preferably from 50 to 500.

The pitch P, which is the minimum distance between the centers of adjacent nozzle holes, is not particularly limited and can be suitably selected to suit to a particular application. For example, it is preferably from 21 to 169 μm.

The form of the opening of the nozzle hole is not particularly limited and can be suitably selected to suit to a particular application. For example, circular, elliptical, square, etc. are suitable. Of these, a circular form is preferable in terms of discharging ink droplets.

Ink Repellent Film

The ink-repellent film preferably contains a fluorine-containing acrylate ester polymer or a polymer having a fluorine-containing heterocyclic structure in the main chain.

When the ink-repellent film contains a fluorine-containing acrylate ester polymer or a polymer having a fluorine-containing heterocyclic structure in the main chain, the surface free energy becomes extremely small. This is preferable because the ink having a low surface tension for use in the present disclosure can maintain a non-wettable state. However, when another material is used as the ink-repellent film, the surface free energy becomes extremely small and the ink having a low surface tension for use in the present disclosure may be wet on the repellent film.

Fluorine-Containing Acrylate Ester Polymer

The fluorine-containing acrylate ester polymer preferably contains at least one of a compound represented by the following Chemical formula II and a compound represented by the following Chemical formula III as a monomer unit.

Chemical structure II

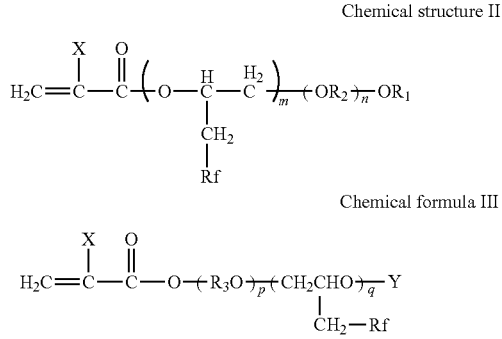

Chemical formula III

In Chemical formula II and Chemical formula III, X represents a hydrogen atom, a linear or branched alkyl group having 1 to 21 carbon atoms, a halogen atom, a CFX1X2 group, where X1 and X2 each, independently represent hydrogen atoms or halogen atoms, a cyano group, a linear or branched fluoroalkyl group having 1 to 21 carbon atoms, a substituted or non-substituted benzyl group, and a substituted or non-substituted phenyl group, $R_1$ represents an alkyl group having 1 to 18 carbon atoms, $R_2$ represents an alkylene group having 2 to 6 carbon atoms, $R_3$ represents an alkylene group having 2 to 6 carbon atoms, Y represents an acid group, Rf represents a linear or branched fluoroalkyl group having 1 to 21 carbon atoms, m represents an integer of from 1 to 10, n represents an integer of from 2 to 90, p represents an integer of from 1 to 90, and q represents an integer of from 1 to 10.

In addition, a polymer obtained by polymerizing at least one of the compounds represented by Chemical formula II and Chemical formula III has at least one of the structure unit represented by the Chemical formula IV illustrated above and the structure unit represented by the Chemical formula V illustrated above.

The $R_1$ mentioned above preferably has 1 to 18 carbon atoms, more preferably 1 to 4 carbon atoms.

Specific examples include, but are not limited to, methyl group, ethyl group, propyl group, butyl group, pentyl group, hexyl group, heptyl group, octyl group, nonyl group, decyl group, and undecyl group.

The $R_2$ mentioned above is an alkylene group having 2 to 6 carbon atoms.

Specific examples include, but are not limited to, ethylene group, propylene group, and butylene group. Of these, ethylene groups are preferable.

The $R_3$ mentioned above is an alkylene group having 2 to 6 carbon atoms. Specific examples include, but are not limited to, ethylene group, propylene group, and butylene group. Of these, ethylene groups are preferable.

Y is an acid group such as a sulfonic acid group, a succinic acid group, an acetic acid group, a phthalic acid group, a hydrogenated phthalic acid group, and a maleic acid group.

Rf is a linear or branched fluoroalkyl group having 1 to 21 carbon atoms, preferably a perfluoroalkyl group, and more preferably Rf has 1 to 10 carbon atoms.

As the Rf mentioned above, examples include, but are not limited to, $-CF_3$, $-CF_2CF_3$, $-CF_2CF_2CF_3$, $-CF(CF_3)_2$, $-CF_2CF_2CF_2CF_3$, $-CF_2CF(CF_3)_2$, $-C(CF_3)_3$, $-(CF_2)_4CF_3$, $-(CF_2)_2CF(CF_3)_2$, $-CF_2C(CF_3)_3$, $-CF(CF_3)CF_2CF_2CF_3$, $-(CF_2)_5CF_3$, $-(CF_2)_3CF(CF_3)_2$, $-(CF_2)_4CF(CF_3)_2$, $-(CF_2)_7CF_3$, $-(CF_2)_5CF(CF_3)_2$, $-(CF_2)_6CF(CF_3)_2$, and $-(CF_2)_9CF_3$.

The m mentioned above is preferably from 1 to 10 and more preferably from 1 to 3.

The n mentioned above is preferably from 2 to 90, more preferably from 3 to 50, and furthermore preferably from 4 to 30.

The p mentioned above is preferably from 1 to 90 and more preferably from 1 to 30.

The q mentioned above is preferably from 1 to 10 and more preferably from 1 to 3.

The fluorine-containing acrylate ester polymer is suitably synthesized or available on the market.

The fluorine-containing acrylate ester polymer (where Rf is $C_6F_{13}$) represented by the Chemical formula III can be synthesized by, for example, the following reaction formula.

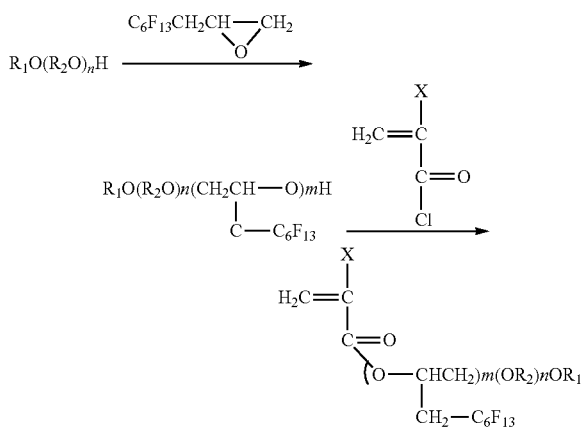

Also, the fluorine-containing acrylate ester polymer (where Rf is $C_6F_{13}$) represented by the Chemical formula III can be synthesized by, for example, the following reaction formula.

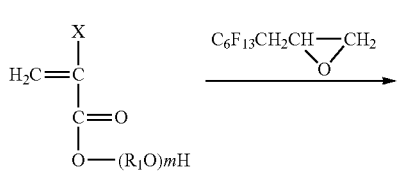

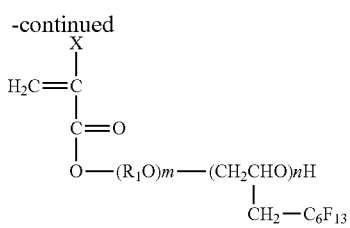

Chlorosulfonic acid
Succinic anhydride
Monochloro acetate
Phthalic anhydride
Hydrogenated phthalic anhydride
Maletic anhydride, etc.

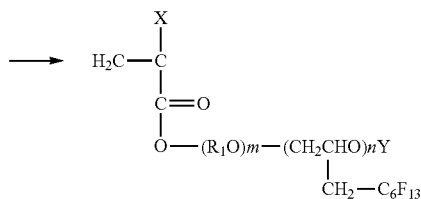

The proportion of fluorine in the fluorine-containing acrylate ester polymer is preferably 10 percent by mass or more, more preferably 25 percent by mass or more, and furthermore preferably 50 percent by mass or more in terms of ink repellency (contact angle).

Specific examples of the commercially available products include, but are not limited to, krytoxFSL (manufactured by E.I. du Pont de Nemours and Company), krytoxFSH (manufactured by E.I. du Pont de Nemours and Company), FomblinZ (manufactured by Solvay Solexis), FLUOROLINKS10 (manufactured by Solvay Solexis), Optool DSX (manufactured by DAIKIN INDUSTRIES, LTD.), FLUOROLINKC10 (manufactured by Solvay Solexis), Morescophospharol A20H (manufactured by Matsumura Oil Co., Ltd.), Morescophospharol ADOH (manufactured by Matsumura Oil Co., Ltd.), Morescophospharol DDOH (manufactured by Matsumura Oil Co., Ltd.), Fluorosurf FG5010 (manufactured by Fluoro Technology), Fluorosurf FG5020 (manufactured by Fluoro Technology), Fluorosurf FG5060 (manufactured by Fluoro Technology), and Fluorosurf FG5070 (manufactured by Fluoro Technology).

The ink-repellent film is formed of film of a compound containing the fluorine-containing acrylate ester polymer skeleton in the molecule. An inorganic oxide layer can be provided between the nozzle substrate and the ink-repellent film in order to improve attachability by allowing a large number of hydroxyl groups present as the bonding point with the compound containing a fluorine-containing acrylate ester polymer skeleton in the molecule.

Specific examples of the material of the inorganic oxide layer include, but are not limited to, $SiO_2$ and $TiO_2$.

The average thickness of the inorganic oxide layer is preferably from 0.001 to 0.2 μm and more preferably from 0.01 to 0.1 μm.

Examples of the compound containing a fluorine-containing acrylate ester polymer skeleton in the molecule include, but are not limited to, low-molecular substances and resins. Specific examples of the compound containing a fluorine-containing acrylate ester polymer skeleton in the molecule are disclosed in, for example, JP-H3-43065-A1, JP-H6-210857-A1, JP-H10-32984-A1, JP-2000-94567-A1, JP-2002-145645-A1, JP-2003-341070-A1, JP-2007-106024-A1, and JP 2007-125849-A1.

A particularly preferred example is modified perfluoropolyoxetane (Optool DSX, manufactured by DAIKIN INDUSTRIES, LTD.).

The average thickness of the ink repellent film is preferably from 0.001 to 0.2 μm and more preferably from 0.01 to 0.1 μm.

Examples of the method of forming an ink-repellent film using a compound containing a fluorine-containing acrylate ester polymer skeleton in the molecule include, but are not limited to, dipping, printing, and vacuum deposition by, for example, spin coating, roll coating, and dipping using a fluorinated solvent.

As the fluorine-containing solvent, Novec™ (manufactured by 3M Company), Vertrel® (manufactured by E. I. du Pont de Nemours and Company), and Galden® (manufactured by Solvay Solexis) can be used.

Polymer Having Fluorine-Containing Heterocyclic Structure in Main Chain

The polymer having a fluorine-containing heterocyclic structure in the main chain is particularly preferably an amorphous polymer. The amorphous polymer is excellent in film strength, attachability to a substrate, which is advantageous to demonstrate the effects of the present disclosure.

The polymer having a fluorine-containing heterocyclic structure in the main chain disclosed in, for example, U.S. Pat. Nos. 3,418,302, 3,978,030, JP-S63-238111-A1, JP-S63-238115-A1, JP-H1-131214-A1, and JP-H1-131215 are preferably used.

Of these, typical polymers having the following heterocyclic structure are as follows. However, the present disclosure is not limited thereto

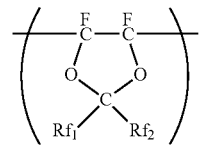

Chemical formula i

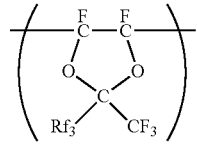

Chemical formula ii

In Chemical formula i and Chemical formula ii, $Rf_1$, $Rf_2$, and $Rf_3$ each, independently represent fluorine-containing alkyl groups.

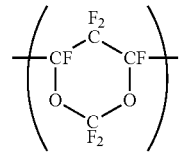

Chemical structure i

-continued

Chemical structure ii
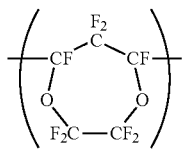

Chemical structure iii
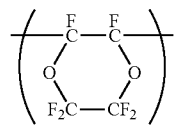

Chemical structure iv
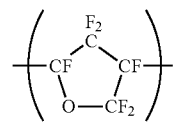

Chemical structure v
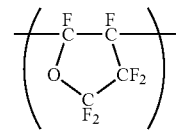

Chemical structure vi
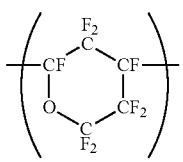

Further, in order to improve attachability to a substrate and control the glass transition temperature (Tg) and the solubility in a solvent, the structure represent by the following Chemical formula iii may be introduced. These structures can be obtained by copolymerizing with comonomers represented by the following Chemical structure vii to the Chemical structure ix.

Chemical formula iii
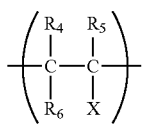

In the Chemical formula iii, $R_4$, $R_5$, and $R_6$ each, represent hydrogen atoms, fluorine atoms, chlorine atoms, or $Rf_4$. The $Rf_4$ mentioned above is a fluorine-containing alkyl group. X represents a hydrogen atom, a fluorine atom, a chlorine atom, $Rf_5$ or $Rf_6$. The $Rf_5$ mentioned above is a fluorine-containing organic substituent having a functional group such as an acid, an ester, an alcohol, an amine, or an amide at the terminal and the $Rf_6$ mentioned above is a fluorine-containing alkyl group or a fluorine-containing ether group.

Chemical structure vii
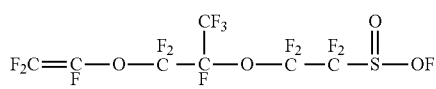

Chemical structure viii
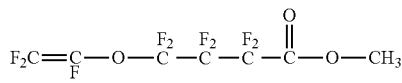

Chemical structure ix
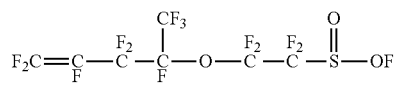

Examples of those having a specific chemical structure described above and suitable as an ink repellent agent include, but are not limited to, Cytop CTX-105 (manufactured by ASAHI GLASS CO., LTD.) and Cytop CTX-805 (manufactured by ASAHI GLASS CO., LTD.), and Teflon® AF1600 and AF2400, manufactured by E.I. du Pont de Nemours and Company).

Examples of the method of forming an ink-repellent film using a polymer having a fluorine-containing heterocyclic structure in the main chain include, but are not limited to, dipping, printing, and vacuum deposition by, for example, spin coating, roll coating, and dipping using a fluorinated solvent.

The fluorine-containing solvent is not particularly limited as long as it can dissolve the polymer having a fluorine-containing heterocyclic structure in the main chain and can be suitably selected to suit to a particular application.

Specific examples include, but are not limited to, perfluorobenzene (Aflud®, fluorine-containing solvent, manufactured by ASAHI GLASS CO., LTD.), Fluorinert FC-75 (liquid containing perfluoro(2-butyl tetrahydrofuran, manufactured by 3M Company). These can be used alone or in combination. Of these, in the case of a mixed solvent, a hydrocarbon, a chlorinated hydrocarbon, a fluorinated hydrocarbon, an alcohol, or another organic solvent can be used in combination.

The solution concentration is preferably from 0.01 to 50 percent by mass and more preferably from 0.01 to 20 percent by mass.

The ink repellent film having an average thickness of from 0.01 μm or greater is suitable to achieve the object described above. Preferably, it is from 0.01 to 2 μm.

The heat treatment conditions (temperature) of the polymer having a fluorine-containing heterocyclic structure in the main chain are determined by the boiling point of the solvent, the glass transition temperature of the polymer, and the heat-resistant temperature of the substrate. That is, it is suitable to set a temperature higher than the boiling point of the solvent and the glass transition temperature of the polymer and lower than the heat resistance temperature of the substrate.

The glass transition temperature of the polymer having a fluorine-containing heterocyclic structure in the main chain varies depending on the structure. For example, many of the structures represented by the Chemical structure iv to the Chemical structure vi have a glass transition temperature of from 50 to 110 degrees. Therefore, the temperature range is preferably from 120 to 170 degrees and the heating time is preferably from 30 minutes to two hours.

In addition, a copolymer having the structure of the Chemical formula ii and the structure of the following Chemical structure x in the main chain is available from E.I. du Pont de Nemours and Company, which is Teflon® AF.

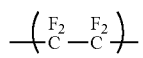

Chemical structure x

The glass transition temperature of Teflon® AF can be changed by changing its copolymerization ratio. That is, as the ratio of the [perfluoro(2,2-dimethyl-1,3-dioxole)](PDD) component increases, the glass transition temperature rises. Depending on the component ratio, it exists in the temperature range of from 80 to 330 degrees C. Commercially available articles AF1600 and AF2400 have respectively 160 degrees and 240 degrees C. For example, the heat treatment temperature of AF1600 is preferably from 165 to 180 degrees C. taking into account the heat resistance temperature of a substrate.

Other Members

The other members are not particularly limited and can be suitably selected to suit to a particular application. Examples include, but are not limited to, a pressurizing chamber and a stimulus generating device.

Pressurizing Chamber

Each of the pressurizing chambers, which is individually disposed corresponding to a nozzle hole provided to the nozzle plate is an individual flow path communicating with the nozzle hole. The pressurizing chamber is also referred to as an ink flow path, a pressurizing liquid chamber, a pressure chamber, a discharging chamber, a liquid chamber, etc.

Device for Discharging Ink

The ink discharging head includes a device that generates a stimulus to be applied to an ink.

The stimulus generated by the stimulus generating device has no specific limit and can be suitably selected to a particular application. For example, heat (temperature), pressure, vibration, and light can be suitably used as the stimulus. These can be used alone or in combination. Of these, heat and pressure are preferable.

The stimulus generating device includes, for example, a heating device (heater), a pressurizing device, a piezoelectric element, a vibrator, an ultrasonic oscillator, and light.

Specific examples include, but are not limited to, a piezoelectric actuator such as the piezoelectric element, a thermal actuator that utilizes a phase change caused by film boiling of ink using an electric heat conversion element such as a heat generating resistance, a shape-memory alloy actuator that uses the metal phase change due to temperature change, and an electrostatic actuator that utilizes an electrostatic force.

When the stimulus is "heat", thermal energy corresponding to a recording signal is applied to the ink in the ink discharging head using, for example, a thermal head. For example, a method can be utilized which generates bubbles in the ink by the heat energy and discharges the ink as liquid droplets from the nozzle hole of the nozzle plate due to the pressure of the bubbles.

When the stimulus is "pressure", for example, the piezoelectric element is bent by applying a voltage to the piezoelectric element bonded at a position called the pressure chamber in the ink flow path in the ink discharging head. As a result, the volume of the pressure chamber is contracted, and the ink may be discharged as droplets from the nozzle hole of the ink discharging head.

Of these, a piezo method of applying a voltage to a piezoelectric element to jet the ink is preferable.

Figure 4:
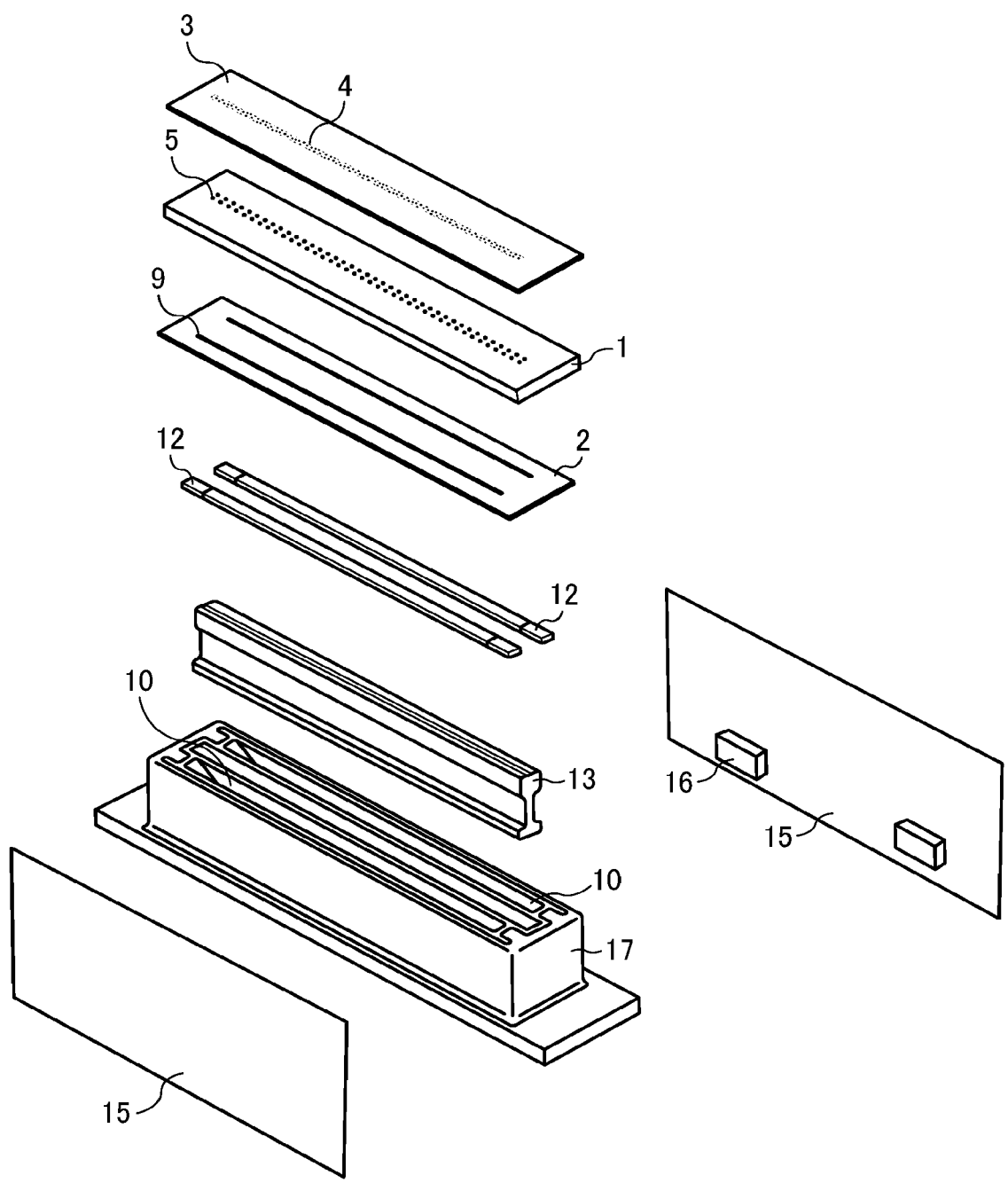
FIG. 4 is a diagram illustrating an exploded perspective view of an example of an ink discharging head according to an embodiment of the present disclosure.
Figure 5:
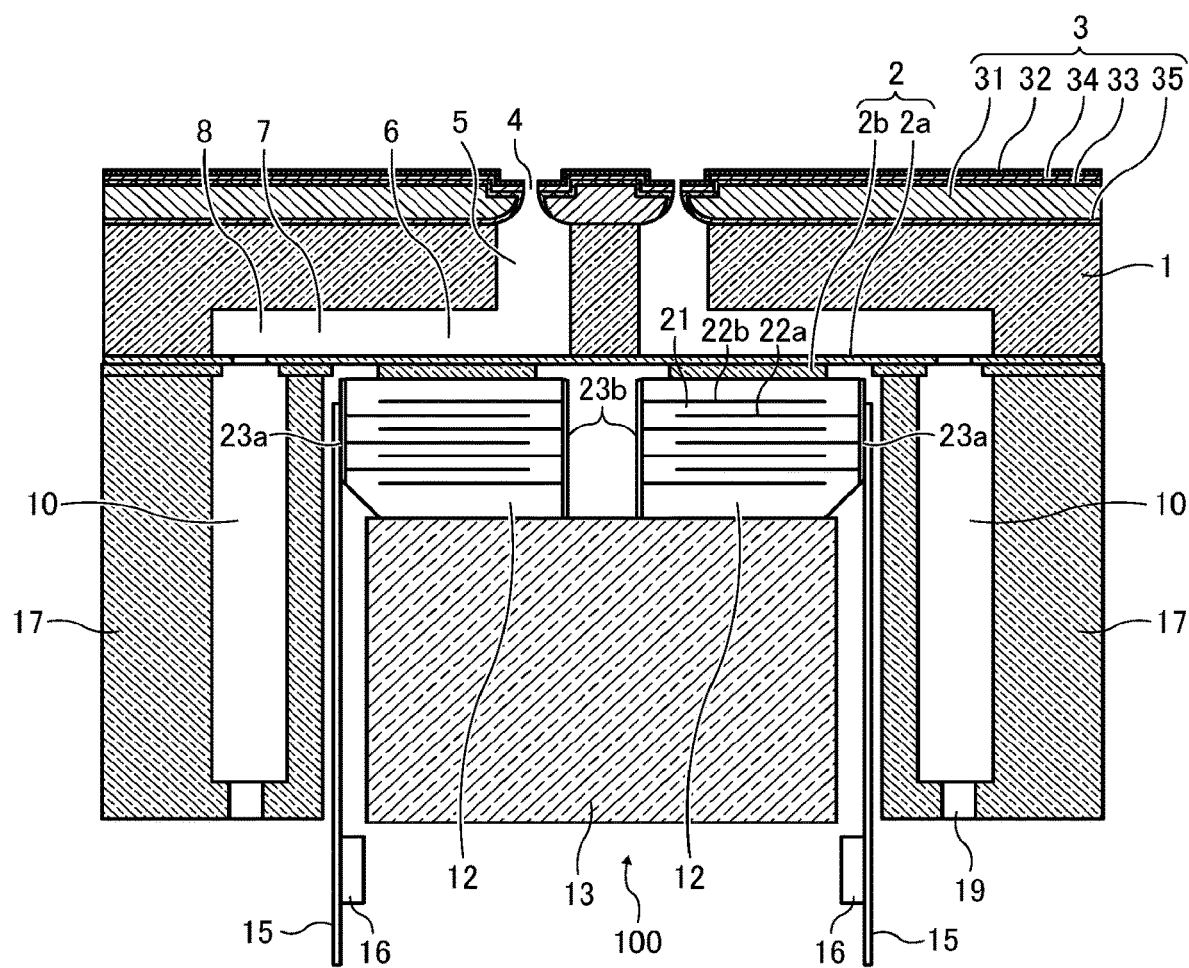
FIG. 5 is a diagram illustrating a cross section of the ink discharging head along the longitudinal direction of a liquid chamber.
Figure 6:
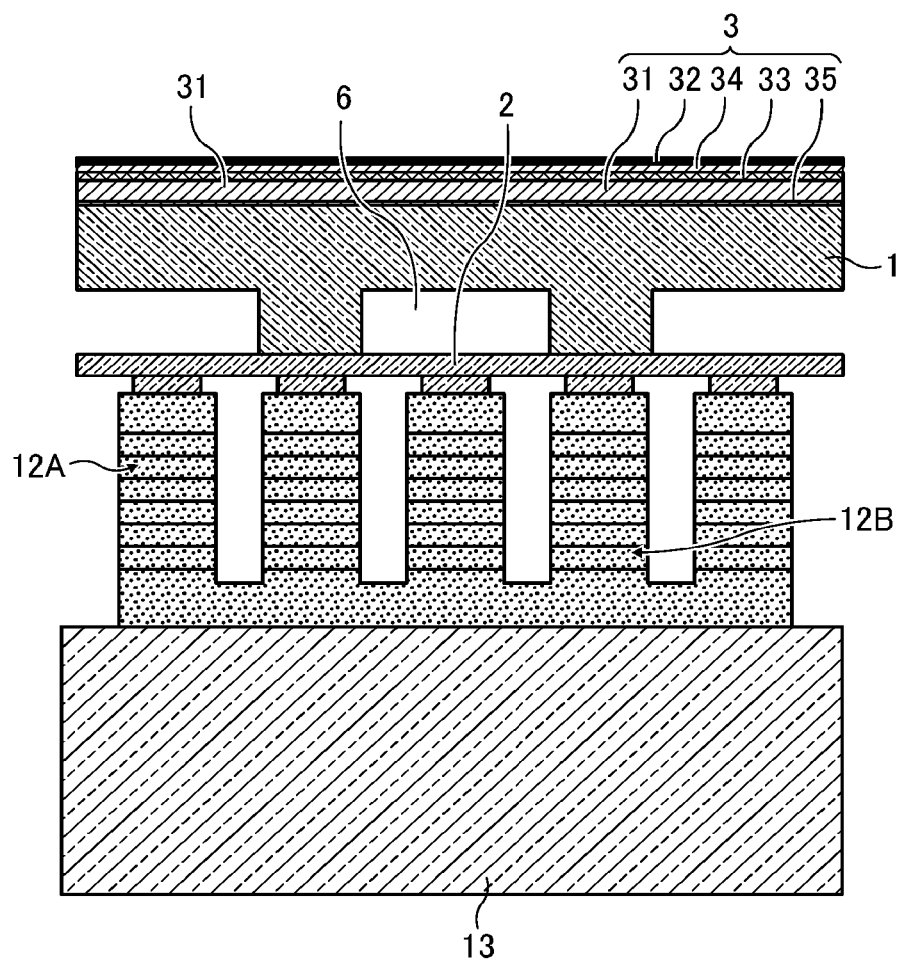
FIG. 6 is a diagram illustrating a cross section of the ink discharging head along the latitudinal direction of a liquid chamber.

Next, an example of the inkjet discharging head for use in the present disclosure will be described with reference to FIG. 4 to FIG. 6. FIG. 4 is a diagram illustrating an exploded perspective view of the head, FIG. 5 is a diagram illustrating a cross section along the direction (longitudinal direction of liquid chamber) perpendicular to the nozzle arrangement direction of the head, and FIG. 6 is a diagram illustrating a cross section along the direction (latitudinal direction of liquid chamber) of the nozzle arrangement of the head.

The ink discharging head includes a flow path plate (liquid chamber substrate, flow path member) 1, a diaphragm member 2 joined to a lower surface of the flow path plate 1, and a nozzle plate 3 as a nozzle forming member jointed to an upper surface of the flow path plate 1 and forms multiple liquid chambers (also referred to as pressurizing liquid chamber, pressure chamber, pressurizing chamber, or flow path) 6 as individual flow paths communicating with respective multiple nozzle holes 4 through which liquid droplets (ink droplets) are discharged via respective nozzle communication paths 5 by these members, fluid resistance portion 7 also serving as a supplying path through which the ink is supplied to the liquid chamber 6, and a communication portion 8 communicating with the liquid chamber 6 via the fluid resistance portion 7 to supply the ink from a common liquid chamber 10 formed on a frame member 17 to the communication portion 8 via a supplying opening 19 formed on a diaphragm member 2.

Openings such as the nozzle communication path 5, the liquid chamber 6, and the fluid resistance portion 7 are formed on the flow path plate 1 by etching a silicone substrate. The flow path plate 1 can also be formed by, for example, etching a SUS substrate using an acidic etching solution or performing mechanical processing such as punching (pressing).

The diaphragm member 2 has respective vibration regions (diaphragm portions) 2a forming the wall surfaces corresponding to each of the liquid chambers 6. An island-shaped convex portion 2b is provided on the exterior of the surface (opposite side to the liquid chamber 6) of the vibration region 2a. The diaphragm member 2 is jointed to the upper surfaces (jointed surfaces) of a laminated piezoelectric element 12 as drive element (actuator device, pressure generation device) and each piezoelectric element columns 12A and 12B of the laminated piezoelectric element 12. The laminated piezoelectric element 12 generates energy to discharge droplets by transforming the vibration region 2a by the island-shaped convex portion 2b. The lower end surface of the laminate piezoelectric element 12 is joined to the base member 13.

The piezoelectric element 12 is formed by alternately laminating a piezoelectric material layer 21 such as PZT and internal electrodes 22a and 22b. The internal electrodes 22a and 22b are respectively attached to the end faces, that is, pulled out to side surface significantly perpendicular to the diaphragm member 2 of the piezoelectric element 12, and connected to end surface electrodes (external electrode) 23a and 23b formed on the side surface. A voltage is applied to the end surface electrodes 23a and 23b to cause displacement along the lamination direction. The piezoelectric element 12 is subject to groove processing by half cut dicing to form a required number of piezoelectric element columns 12A and 12B for one piezoelectric element member.

Although the piezoelectric element columns 12A and 12B of the piezoelectric element 12 are the same, they are distinguished from each other in that a drive waveform is applied to drive the piezoelectric element column 12A while a drive waveform is not applied to the piezoelectric element column 12B used as a simple support. This can be applied to a bi-pitch configuration alternatively using the piezoelectric element column 12A for drive and the piezoelectric element column 12B for support or a normal pitch configuration using all the piezoelectric element columns as the piezoelectric element column 12A.

Therefore, two rows of the driving elements (rows of the piezoelectric element columns 12A for drive) in which a plurality of driving piezoelectric element columns 12A for drive are arranged as drive elements on the base member 13 are provided in this configuration.

In addition, it is possible to have a configuration in which the ink in the liquid chamber 6 is pressurized using the displacement along the direction (the lamination direction of the piezoelectric material layer) as the piezoelectric direction of the laminated piezoelectric element 12 or another configuration in which the ink in the liquid chamber 6 can be pressurized using the displacement along the direction (surface direction of the piezoelectric element layer: direction perpendicular to the electric field).

The material of the piezoelectric element is not particularly limited. Examples include, but are not limited to, electromechanical conversion elements such as ferroelectric materials including $BaTiO_3$, $PbTiO_3$, and $(NaK)NbO_3$ used as generally used piezoelectric element materials. Further, although the laminated piezoelectric element is used, a single-plate piezoelectric element may be used. As the single-plate piezoelectric element, a cut piezoelectric element, a thick-film element obtained by screen printing followed by sintering, or a thin-film element formed by sputtering, vapor deposition, or a sol-gel method can be used. Further, the laminated piezoelectric elements 12 provided on one base member 13 may have a single row structure or a multiple row structure.

The end surface electrode 23a of the piezoelectric element columns 12A for drive of the piezoelectric element 12 is directly connected to an FPC 15 as wiring device by a soldering member to supply drive signals. To the FPC 15, a drive circuit (driver IC) 16 to selectively apply a drive waveform to the piezoelectric element column 12A for drive of the piezoelectric element 12 is implemented. The external electrodes 23b of all the piezoelectric element columns 12A are electrically connected and similarly connected to the common wiring of the FPC 15 by a solder member. Further, the output terminal portion jointed to the piezoelectric element 12 of the FPC 15 is plated with solder, thereby enabling the solder joint. It is also possible to solder plate not on the FPC but on the piezoelectric element 12. In addition, as for the joining method, it is possible to utilize jointing by an anisotropic conductive film or wire bonding in addition to the soldering The nozzle plate 3 has an ink repellent film 32 formed on a liquid droplet discharging side (surface along the discharging direction, discharging surface or the opposite surface relative to the liquid chamber 6, nozzle forming surface) of the nozzle substrate 31 on which holes constituting the nozzle holes 4 having a diameter of from 10 to 35 μm corresponding to each liquid chamber 6.

In addition, a frame member 17 formed of an epoxy resin or polyphenylene sulfide by injection molding is jointed on the outer peripheral side of a piezoelectric actuator unit 100 including the piezoelectric element 12 on which the FPC 15 is mounted (connected) and the base member 13. Moreover, the common liquid chamber 10 is formed on the frame member 17. Furthermore, a supplying opening 19 to supply an ink from outside is formed on the common liquid chamber 10. This supplying opening 19 is connected with an ink supply source such as a sub-tank or an ink container.

In the ink discharging head configured as described above, for example, when the voltage applied to the piezoelectric element column 12A for drive is lowered from a reference voltage, the piezoelectric element column 12A is contracted and the vibration region 2a of the diaphragm member 2 is lowered, thereby inflating the volume of the liquid chamber 6. As a result, the ink flows into the liquid chamber 6 and thereafter the voltage applied to the piezoelectric element column 12A is increased to elongate the piezoelectric element column 12A in the lamination direction. Accordingly, the diaphragm member 2 is transformed along the direction of the nozzle hole 4 to contract the volume of the liquid chamber 6. As a result, the ink in the liquid chamber 6 is pressurized, thereby discharging (jetting) ink droplets from the nozzle hole 4.

Thereafter, the voltage applied to the piezoelectric element column 12A is returned to the reference voltage. Accordingly, the diaphragm member 2 is back to the initial position so that the liquid chamber 6 inflates, generating a negative pressure. At this time, the liquid chamber 6 is filled with the ink from the common liquid chamber 10. After the vibration of the meniscus surface of the nozzle hole 4 decays and becomes stable, the system starts operations to discharge the next droplet.

The drive method of the ink discharging head is not limited to the above-mentioned (pull-push discharging). The way of discharging changes in accordance with how a drive waveform is provided, and pull discharging or push discharging is possible.

The nozzle plate 3 relating to the present disclosure is described with reference to FIG. 7 to FIG. 9.

Figure 7:
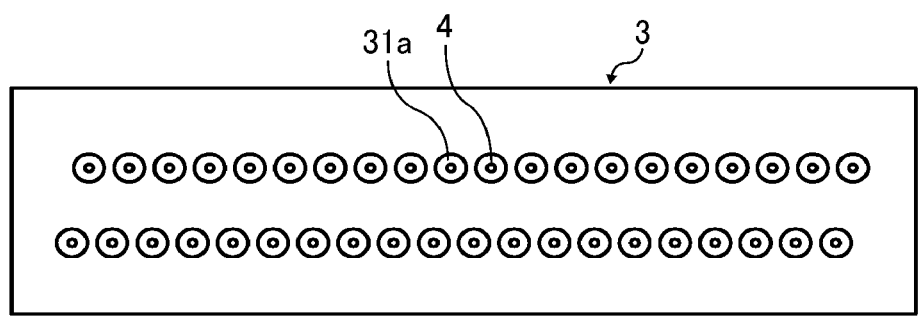
FIG. 7 is a diagram illustrating a planar view of the nozzle plate of the ink discharging head.
Figure 8:
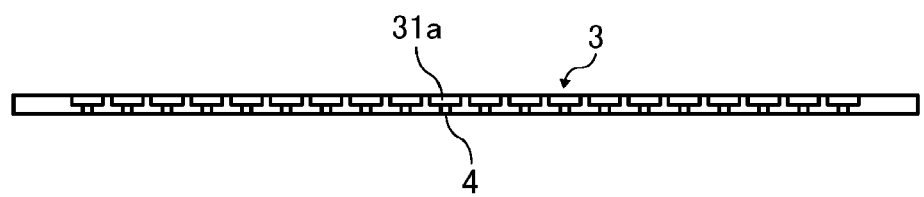
FIG. 8 is a diagram illustrating a cross section of the nozzle plate illustrated in FIG. 7.
Figure 9:
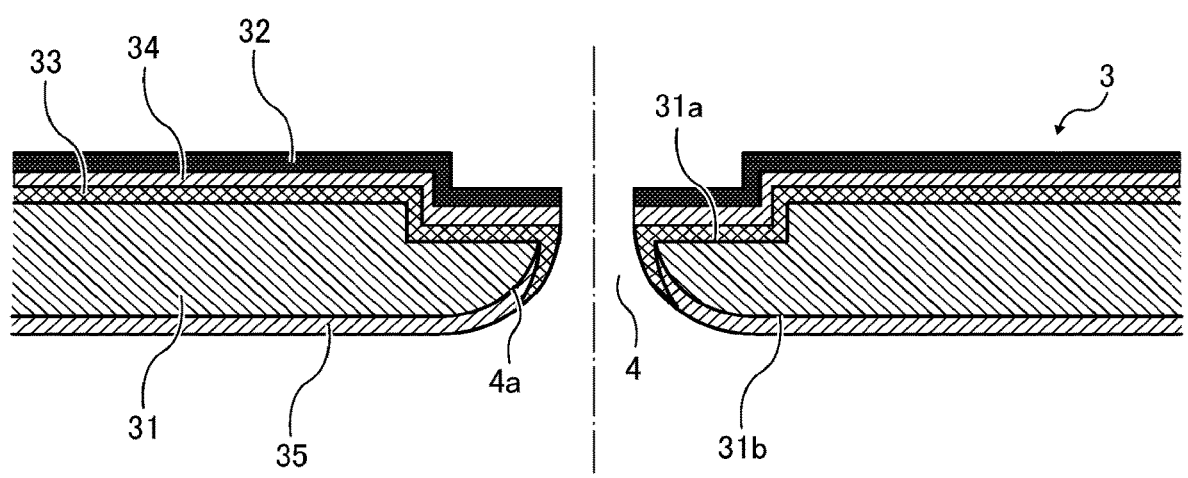
FIG. 9 is a diagram illustrating an enlarged cross section of a nozzle portion of the nozzle plate illustrated in FIG. 8.

FIG. 7 is a diagram illustrating a schematic planar view of the nozzle plate 3, FIG. 8 is a diagram illustrating a cross section thereof, and FIG. 9 is a diagram illustrating an enlarged cross section of a single nozzle portion.

The nozzle plate 3 includes a Ti layer 33 as a base layer, an $SiO_2$ film 34, and a perfluoropolyether film (ink repellent film) 32 having alkoxysilane in the molecule are formed in this order from the surface of the nozzle substrate 31. In the vicinity of the exit of the inner wall surface 4a of the nozzle hole 4, the base layer (Ti layer) 33 is continuously formed from the discharging surface on the $SiO_2$ film 35 formed on the liquid chamber surface 31b of the nozzle substrate 31. The base layer (Ti layer) 33 is exposed to the outermost surface.

The nozzle substrate 31 can be formed of Ni metal plate, etc. but is not limited thereto.

Here, the ink repellent film 32 of the nozzle plate 3 is formed by vapor deposition and a vapor-deposited film for forming the ink repellent film 32 is not formed near the exit of the inner wall surface of the nozzle hole 4. This makes it possible to stably discharge droplets without causing discharging failure or impairing liquid filling property.

Printing Method and Printing Device

The printing method of the present disclosure is to discharge the ink of the present disclosure for printing and includes at least ink discharging and other optional processes such as stimulus generating and controlling.

The printing device includes at least an ink cartridge to contain the ink of the present disclosure, an ink discharging device that discharges the ink, and other optional devices such as a stimulus generating device and a control device.

The printing method of the present disclosure is executed by the printing device of the present disclosure and the ink discharging device suitably executes the ink discharging. In addition, the other processes are suitably conducted by the other corresponding devices.

Ink Discharging Process (Example of Printing)

The ink discharging including applying a stimulus (energy) to the ink to discharge it to print on a recording medium. In this process, as the printing method of discharging the ink onto a recording medium, any known inkjet recording method can be used. Specific examples of such methods include, but are not limited to, an inkjet recording method of scanning a head and an inkjet recording method using aligned heads to record images on recording media.

There is no specific limitation to the system of driving a recording head serving as the ink discharging device in the image forming process. For example, a piezoelectric element actuator using PZT, etc., a system of using a thermal energy, an on-demand type recording head using an actuator, etc. utilizing an electrostatic force, and a charge control type recording head employing continuous spraying system can be used to record images.

In the printing method of the present disclosure, a heat drying can be optionally added after the ink discharging. For example, recording media can be dried by using an infra red drier, a microwave drier, a roll heater, a drum heater, or warm air.

FIG. 1 is a diagram illustrating an example of the printing device described above.

FIG. 1 is a diagram illustrating a case including the image forming process and the drying process. Reference numerals 101, 102, 103, 104, 105, 106, and 107 represent a recording medium, an ink discharging unit, a conveyor belt, a heated wind drier, an image forming unit, a drying processing unit, and a transfer roller, respectively.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the recording device and the recording method respectively represent a device capable of discharging ink, various processing liquids, etc., to a recording medium and a method of recording utilizing the device. The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc., in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the liquid discharging head is caused to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll form as a recording medium.

Figure 2:
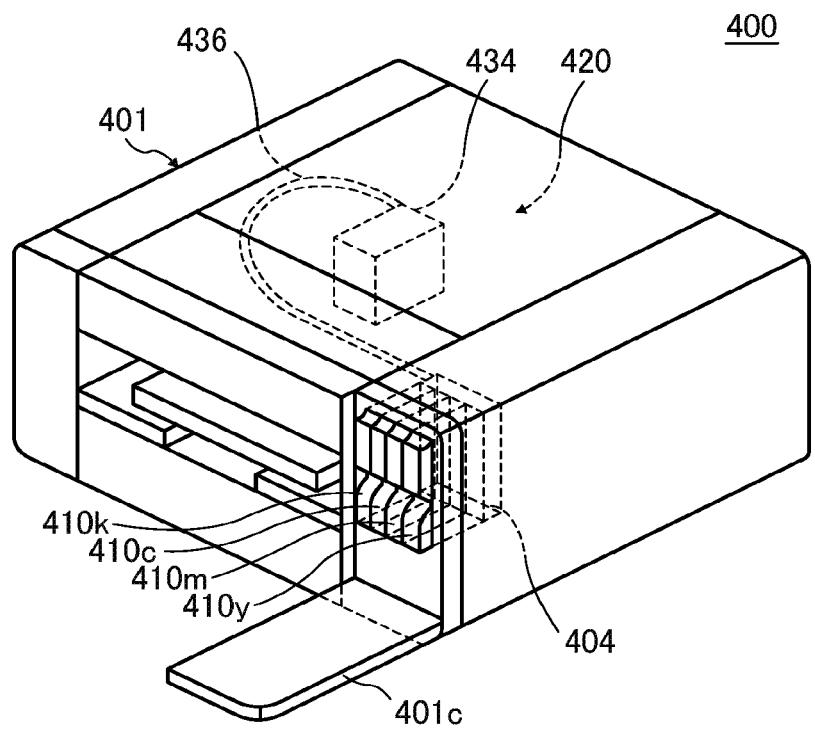
FIG. 2 is a diagram illustrating an example of the recording device using the ink according to an embodiment of the present disclosure.
Figure 3:
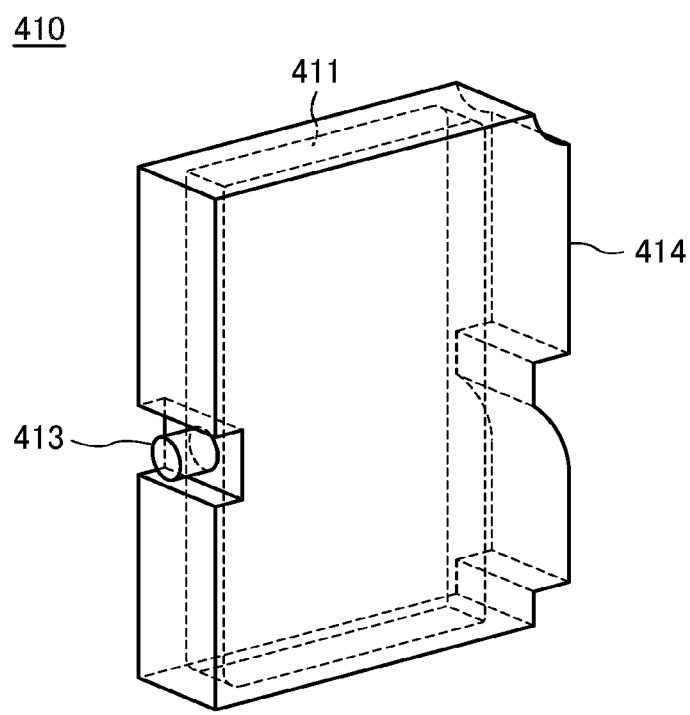
FIG. 3 is a diagram illustrating a perspective view of a tank accommodating the ink according to an embodiment of the present disclosure.

The recording device is described using an example with reference to FIG. 2 and FIG. 3. FIG. 2 is a diagram illustrating a perspective view of the recording device. FIG. 3 is a diagram illustrating a perspective view of the main tank. An image forming apparatus 400 as an embodiment of the recording device is a serial type image forming apparatus. A mechanical unit 420 is disposed in an exterior 401 of the image forming apparatus 400. Each ink accommodating unit (ink cartridge) 411 of each main tank 410 (410k, 410c, 410m, and 410y) for each color of black (K), cyan (C), magenta (M), and yellow (Y) is made of, for example, packaging material such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401c is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

It is preferable that a filter be disposed on the ink flow path somewhere between the ink accommodating unit (ink cartridge) 411 illustrated in FIG. 3 and the discharging head (discharging device that discharges ink) 434. Further, a filter may be provided to the ink outlet 413. The filter can preferably retain particles having a diameter of 10 μm or greater, thereby to remove particles having a diameter of 10 μm or greater so that a printing device having excellent discharging stability can be provided.

The filter is preferably made of stainless steel in terms of corrosion resistance because the filter is constantly in contact with the ink. Above all, austenitic stainless steel, particularly SUS304, SUS316, or SUS316L, are particularly preferable, which have excellent corrosion resistance. The filter preferably contains any of SUS304, SUS316, or SUS316L, but more preferably it is consisted of any one of these.

In addition, filters with different filtration accuracy are commercially available. For example, an Acro/Last Chance filter, manufactured by NIHON PALL LTD. can be used. Since solid content present in the ink can be removed by a filter having a filtration accuracy of 10 μm or less, discharging stability can be improved. It is preferable to use a filter having a filtration accuracy of from 6 to 10 μm because the ink is suitably supplied to a discharging device.

A specific example is 10 μm disposable filter (PALL ACRO25 LCF-12100, filtration accuracy: 10 μm and material: polypropylene).

An ink containing water, an organic solvent, a polyurethane resin, and a cyclic ester having a structure represented by Chemical formula I, wherein the proportion of the cyclic ester having a crystal having a particle diameter of 1 μm or greater is less than 4 ppm of the total of the ink as the ink is allowed to stand at a temperature range of from 20 to 30 degrees C. for 30 days is used to provide good fixability and drying property even on non-penetrable media for signage and commercial printing paper. According to the ink, a good liquid permeability, discharging stability, and storage stability while providing high image density can be achieved and in addition, according to the present disclosure, a printing method and a printing device using the ink can be provided.

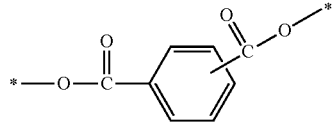
Chemical formula I

By using a printing device having a filter disposed on the ink flow path somewhere between the ink cartridge and the discharge device for discharging the ink, crystals having a diameter greater than 10 µm can be removed, thereby suitably stabilizing discharging.

In the process of producing an ink containing at least water, an organic solvent, and a polyurethane resin, after mixing water, the organic solvent, and the polyurethane resin, the resulting mixture is heated at 40 to lower than 70 degrees C. for six hours or more. As a result, the proportion of the cyclic ester having the structure represented by the Chemical formula I with a particle size of 1 µm or greater is less than 4 ppm of the entire ink. by lowering the proportion of the cyclic ester having the structure represented by the Chemical formula I in the ink, the ink can have good fixability, good drying property, high image density, good liquid permeability, good discharging stability, and excellent storage stability. In addition, regarding the crystal, when large crystals having a diameter greater than 10 µm remain, such crystals can be removed by the filter, thereby obtaining more suitable discharging stability.

The form of the filter for use in the present disclosure is not particularly limited and any known filter can be used. Of these, using a sintered filter made by laminating stainless fibers in a felt-like form followed by sintering or a Dutch twilled woven filter formed by Dutch-twilled-weaving stainless fibers, an inkjet recording device having longer-term discharging reliability can be obtained.

Image forming, recording, printing, print, etc., in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Preparation Examples, Manufacturing Examples, Examples, and Comparative Examples but are not limited thereto. In those Examples, "parts" and "percent" are "parts by mass" and "percent by mass" unless otherwise specified.

Unless otherwise specified, the inks were prepared and evaluated under the conditions of room temperature of 25 degrees C. and humidity of 60 percent.

Preparation of Pigment Dispersion

Preparation Example 1

Preparation of Surface Reformed Black Pigment Dispersion 100 g of Black Pearls® 1000 (carbon black having a BET specific surface area of 343 m$^2$/g and an absorption amount of dibutylphthalate (DBPA) of 105 ml/100 g, manufactured by Cabot Corporation), 100 milimole of sulfanilic acid, and 1 litter of highly pure water were mixed by a Silverson Mixer at 6,000 rpm in a room temperature environment. Thereafter, 100 milimole of nitric acid was added to the thus-obtained slurry. 30 minutes later, 100 milimole of sodium nitrite dissolved in a 10 mL of highly deionized water was gradually added. Furthermore, the resulting material was heated to 60 degrees C. while being stirred to conduct reaction for one hour to obtain a reformed pigment in which sulfanilic acid was added to carbon black. Next, pH of the product was adjusted to 9 with 10 percent tetrabutyl ammonium hydroxide solution (methanol solution) to obtain a reformed pigment dispersion in 30 minutes. Thereafter, subsequent to ultrafiltration by dialysis membrane using the dispersion and highly deionized water followed by ultrasonic dispersion, reformed pigment dispersion having a solid portion accounting for 20 percent was obtained. The surface treatment level of the pigment was 0.75 milimole/g and the median size ($D_{50}$) was 120 nm as measured by a particle size distribution measuring instrument (NANOTRAC UPA-EX150, manufactured by NIKKISO CO., LTD.).

Preparation Example 2

Preparation of Surface Reformed Magenta Pigment Dispersion 1 kg of SMART Magenta 3122BA (Pigment Red 122 surface treated dispersion, Solid portion: 14.5 percent, manufactured by SENSIENT Corporation) was subject to acid deposition with 0.1 normal HCl aqueous solution. Next, pH of the product was adjusted to 9 with 10 percent tetraethyl ammonium hydroxide aqueous solution to obtain a reformed pigment dispersion in 30 minutes. The thus-obtained reformed pigment dispersion including a pigment bonded to at least one amino benzoate group or amino benzoate tetraethyl ammonium salt was subject to ultrafiltration by dialysis membrane with highly deionized water, followed by ultrasonic dispersion to obtain a reformed pigment dispersion having a pigment solid portion of 20 percent. The median size ($D_{50}$) was 104 nm as measured by a particle size distribution measuring instrument (NANOTRAC UPA-EX150, manufactured by NIKKISO CO., LTD.).

Preparation Example 3

Preparation of Surface Reformed Cyan Pigment Dispersion 1 kg of SMART Cyan 3154BA (Pigment Blue 15:4 surface treated dispersion element, Solid portion: 14.5 percent, manufactured by SENSIENT Corporation) was subject to acid deposition with 0.1 normal HCL aqueous solution. Next, pH of the product was adjusted to 9 with 40 percent benzyl trimethyl ammonium hydroxide solution (methanol solution) to obtain a reformed pigment dispersion in 30 minutes. The thus-obtained reformed pigment dispersion including a pigment bonded to at least one amino benzoate group or amino benzoate benzyltrimethyl ammonium salt was subject to ultrafiltration by dialysis membrane with highly deionized water, followed by ultrasonic dispersion to obtain a reformed pigment dispersion having a pigment solid portion of 20 percent. The median size ($D_{50}$) was 116 nm as measured by a particle size distribution measuring instrument (NANOTRAC UPA-EX150, manufactured by NIKKISO CO., LTD.).

Preparation Example 4

Preparation of Surface Reformed Yellow Pigment Dispersion

Next, pH of 1 kg of SMART Yellow 3074BA (Pigment Yellow 74 surface treated dispersion, solid portion: 14.5 percent, manufactured by SENSIENT Corporation) was adjusted to 9 with 10 percent tetrabutyl ammonium hydroxide solution (methanol solution) to obtain a reformed pigment dispersion in 30 minutes. The thus-obtained reformed pigment dispersion including a pigment bonded to at least one amino benzoate group or amino benzoate tetrabutyl ammonium salt was subject to ultrafiltration by dialysis membrane with highly deionized water, followed by ultrasonic dispersion to obtain a reformed pigment dispersion having a pigment solid portion of 20 percent. The median size ($D_{50}$) was 145 nm as measured by a particle size distribution measuring instrument (NANOTRAC UPA-EX150, manufactured by NIKKISO CO., LTD.).

Preparation Example 5

Preparation of Liquid Dispersion of Polymer Particulate Containing Magenta Pigment Preparation of Polymer Solution A After through replacement with nitrogen gas in a 1 L flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were admixed in the flask and heated to 65 degrees C.

Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 18.0 g of methyl ethyl ketone was dripped into the flask in two and a half hours. Subsequently, a liquid mixture of 0.8 g of azobismethyl valeronitrile and 18 g of methyl ethyl ketone was dripped into the flask in half an hour. Subsequent to one-hour aging at 65 degrees C., 0.8 g of azobisdimethyl valeronitrile was added followed by another one-hour aging. After the reaction was complete, 364 g of methyl ethyl ketone was added to the flask to obtain 800 g of a polymer solution A having a concentration of 50 percent by mass.

Preparation of Liquid Dispersion of Polymer Particulate Containing Magenta Pigment Next, 28 g of the polymer solution A, 42 g of C.I. Pigment Red 122, 13.6 g of 1 mol/L potassium hydroxide aqueous solution, 20 g of methyl ethyl ketone, and 13.6 g of deionized water were thoroughly stirred followed by mix-kneading using a roll mill to obtain a paste. The obtained paste was placed in 200 g of pure water followed by sufficient stirring. Thereafter, methylethyl ketone and water were distilled away using an evaporator. Furthermore, to remove coarse particles, this liquid dispersion was filtrated under a pressure by a polyvinylidene fluoride membrane filter having an average hole diameter of 5.0 μm. Consequently, a liquid dispersion of polymer particulates containing a magenta pigment was obtained, which contained the pigment in an amount of 15 percent by mass and a solids content of 20 percent by mass. The median size ($D_{50}$) of the polymer particulates in the liquid dispersion of polymer particulates containing magenta pigment was 127 nm. The median size ($D_{50}$) was measured by particle size distribution measuring instrument (NANOTRAC UPA-EX-150, manufactured by NIKKISO CO., LTD.).

Preparation Example 6

Preparation of Liquid Dispersion of Polymer Particulate Containing Cyan Pigment

Liquid dispersion of polymer particulate containing cyan pigment was prepared in the same manner as in the Preparation Example 5 except that C.I. Pigment red 122 serving as pigment was changed to a phthalocyanine pigment (C.I. Pigment Blue 15:3).

The median size ($D_{50}$) of the polymer particulates in the liquid dispersion of polymer particulates containing cyan pigment was measured by particle size distribution measuring instrument (NANOTRAC UPA-EX150, manufactured by NIKKISO CO., LTD.) and it was 93 nm.

Preparation Example 7

Preparation of Liquid Dispersion of Polymer Particulate Containing Yellow Pigment A liquid dispersion of polymer particulates containing yellow pigment was prepared in the same manner as in Preparation Example 5 except that C.I. Pigment Red 122 was replaced with bisazo yellow pigment (C.I. Pigment Yellow 155).

The median size ($D_{50}$) of the polymer particulates in the liquid dispersion of polymer particulates containing yellow pigment was measured by particle size distribution measuring instrument (NANOTRAC UPA-EX150, manufactured by NIKKISO CO., LTD.) and it was 76 nm.

Preparation Example 8

Preparation of Liquid Dispersion of Polymer Particulate Containing Carbon Black Pigment A liquid dispersion of polymer particulates containing carbon black pigment was prepared in the same manner as in Preparation Example 5 except that C.I. Pigment Red 122 was replaced with carbon black (FW 100, manufactured by Degussa AG).

The median size ($D_{50}$) of the polymer particulates in the liquid dispersion of polymer particulates containing carbon black pigment was measured by particle size distribution measuring instrument (NANOTRAC UPA-EX150, manufactured by NIKKISO CO., LTD.) and it was 104 nm.

Preparation Example of Resin Particle

Preparation of Water-Dispersible Polyurethane Resin A

Preparation of Polyester Polyol P-1

While introducing nitrogen gas into a reaction container equipped with a thermometer, a nitrogen gas introducing tube, and a stirrer, 830 parts of terephthalic acid, 830 parts of isophthalic acid, 374 parts of ethylene glycol, 598 parts of neopentyl glycol, and 0.5 parts of dibutyltin oxide were loaded in the reaction container and allowed to conduct polycondensation reaction at 230 degrees C. for 15 hours until the acid value was 1 or less at 180 to 230 degrees C.

to obtain a polyester polyol P-1 having a hydroxyl value of 74.5, an acid value of 0.2, and an average molecular weight of 1,500.

Preparation of Hydrophobic Polyester Polyol Q-1

While introducing nitrogen gas into a reaction container equipped with a thermometer, a nitrogen gas introducing tube, and a stirrer, 1,660 parts of orthophthalic acid, 1,637 parts of diethylene glycol, and 0.5 parts of dibutyltin oxide were charged in the container and allowed to conduct polycondensation reaction at 230 degrees C. for 15 hours until the acid value was 1 or less at 180 to 230 degrees C. to obtain a polyester polyol Q-1 having a hydroxyl value of 190 and an acid value of 0.3.

Preparation of Water-Dispersible Polyurethane Resin A

After 1,000 parts of the polyester polyol P-1 was dehydrated at 100 degrees C. under a reduced pressure and cooled down to 80 degrees C., 907 parts of methyl ethyl ketone was added and the obtained mixture was sufficiently stirred and dissolved. A total of 80 parts of 2,2'-dimethylolpropionic acid was added and thereafter 281 parts of isophorone diisocyanate was added to react at 75 degrees C. for eight hours to carry out urethanification.

After confirming that the isocyanate value was 0.1 percent or less, the mixture was cooled down to 50 degrees C. and 340 parts of the polyester polyol Q-1 was added to obtain a homogeneous solution. After 60 parts of triethyl amine was added for neutralization, 7,000 parts of water was added to make it water-soluble.

After removing methyl ethyl ketone from the obtained transparent reaction product under a reduced pressure at a temperature range of from 40 to 60 degrees C., water was added to adjust the concentration to obtain a stable translucent colloidal aqueous dispersion having a nonvolatile content of 25 percent.

Preparation of Water-Dispersible Polyurethane Resin B

After 1,000 parts of the polyester polyol P-1 was dehydrated at 100 degrees C. under a reduced pressure and cooled down to 80 degrees C., 907 parts of methyl ethyl ketone was added and the obtained mixture was sufficiently stirred and dissolved. A total of 80 parts of 2,2'-dimethylolpropionic acid was added and thereafter 281 parts of isophorone diisocyanate was added to react at 75 degrees C. for eight hours to carry out urethanification.

After confirming that the isocyanate value was 0.1 percent or less, the mixture was cooled down to 50 degrees C. After 60 parts of triethyl amine was added for neutralization, 7,000 parts of water was added to make it water-soluble.

After removing methyl ethyl ketone from the obtained transparent reaction product under a reduced pressure at a temperature range of from 40 to 60 degrees C., water was added to adjust the concentration to obtain a stable translucent colloidal aqueous dispersion having a nonvolatile content of 25 percent.

Preparation of Water-Dispersible Polyurethane Resin C

Preparation of Polyester Polyol P-2

While introducing nitrogen gas into a reaction container equipped with a thermometer, a nitrogen gas introducing tube, and a stirrer, 664 parts of terephthalic acid, 631 parts of isophthalic acid, 472 parts of 1,4-butanediol, 447 parts of neopentyl glycol, and 0.5 parts of dibutyltin oxide were loaded in the reaction container and allowed to react at 180 to 230 degrees C. for five hours for esterification followed by polycondensation reaction at 230 degrees C. for six hours until the acid value was 1 or less. Thereafter, the resulting solution was cooled down to 120 degrees C. and 321 parts of adipic acid and 268 parts of 2,2'-dimethylol propionic acid were added thereto followed by heating again to 170 degrees C., and the reaction was carried out at this temperature for 20 hours to obtain a polyester polyol P-2 having a carboxyl group having an acid value of 46.5 and a hydroxyl value of 59.8.

Preparation of Water-Dispersible Polyurethane Resin C 1,000 parts of the polyester polyol P-2 was dehydrated at 100 degrees C. under a reduced pressure and cooled down to 80 degrees C. Thereafter, 812 parts of methyl ethyl ketone was added followed by stirring to obtain a solution. 20 parts of 1,4-butanediol was added to the solution and thereafter, 198 parts of dicyclohexyl methane-4,4'diisocyanate (hydrogenated MDI) were added followed by reaction at 75 degrees C. for eight hours. After confirming that the isocyanate value was 0.1 percent or less, the mixture was cooled down to 50 degrees C. After 84 parts of triethyl amine was added for neutralization, 7,000 parts of water was added to make it water-soluble.

After removing methyl ethyl ketone from the obtained transparent reaction product under a reduced pressure at a temperature range of from 40 to 60 degrees C., water was added to adjust the concentration to obtain a stable translucent colloidal aqueous dispersion having a nonvolatile content of 25 percent.

Preparation of Water-Dispersible Polyurethane Resin D

After 1,000 parts of the polyester polyol P-1 was dehydrated at 100 degrees C. under a reduced pressure and cooled down to 80 degrees C., 907 parts of methyl ethyl ketone was added and the obtained mixture was sufficiently stirred and dissolved. A total of 80 parts of 2,2'-dimethylolpropionic acid was added and thereafter 281 parts of isophorone diisocyanate was added to react at 75 degrees C. for eight hours to carry out urethanification.

After confirming that the isocyanate value was 0.1 percent or less, the mixture was cooled down to 50 degrees C. After 60 parts of triethyl amine was added for neutralization, 7,000 parts of water was added to make it water-soluble.

After removing methyl ethyl ketone from the obtained transparent reaction product under a reduced pressure at a temperature range of from 40 to 60 degrees C., water was added to adjust the concentration to obtain a stable translucent colloidal aqueous dispersion having a nonvolatile content of 25 percent.

Preparation of Acrylic-Silicone Polymer Particulate A

After sufficient replacement with nitrogen gas in a 1 L flask equipped with a mechanical stirrer, a thermometer, a nitrogen gas introducing tube, a reflux tube, and a dripping funnel, 8.0 g of LATEMUL S-180 (reactive anionic surfactant, manufactured by Kao Corporation) was admixed with 350 g of deionized water followed by heating the obtained mixture to 65 degrees C.

Thereafter, 3.0 g of t-butylperoxy benzoate and 1.0 g of sodium isoascorbate serving as reaction initiators were added to the mixture and five minutes later, a mixture of 45 g of methylmethacrylate, 160 g of methacrylic acid-2-ethylhexyl, 5 g of acrylic acid, 45 g of butylmethacrylate, 30 g of cyclohexyl methacrylate, 15 g of vinyltriethoxysilane, 8.0 g of LATEMUL S-180, and 340 g of deionized water were dripped to the resulting material in three hours. Subsequent to heating at 80 degrees C. for two-hour aging, the resulting matter was cooled down to room temperature. pH of the resulting matter was adjusted to 7 to 8 by sodium hydroxide. Thereafter, ethanol was distilled away by an evaporator followed by moisture adjustment to obtain 730 g of acrylic-silicone polymer particulate having a solid portion of 40 percent.

In addition, the median size ($D_{50}$) of the polymer particulate in the dispersion was 125 nm as measured by a particle size distribution measuring instrument (NANOTRAC UPA-EX150, manufactured by NIKKISO CO., LTD.).

Examples 1 to 26 and Comparative Examples 1 to 21

Manufacturing Example of Pre-Ink

Manufacturing Example 1 of Pre-Ink

A total of 7.50 parts of 3-methoxy-N,N-dimethylpropanamide represented by the Chemical formula 1 illustrated above, 5.00 parts of propylene glycol monopropyl ether, 18.00 parts of propylene glycol, 2.00 parts of 2,2,4-trimethyl-1,3-pentanediol, 0.50 parts of 2,4,7,9-tetramethyldecane-4,7-diol, and 1.00 part of the polyether-modified siloxane compound represented by the Chemical formula 8 illustrated above were loaded in a container equipped with a stirrer followed by mixing and stirring for 30 minutes. Thereafter, 0.05 parts of preservatives and fungicides (Proxel GXL, manufactured by Avecia Inkjet Limited), 0.30 parts of 2-amino-2-ethyl-1,3-propane diol, 56.00 parts of prepared water-dispersible polyurethane resin A, and 1.62 parts of polyurethane dispersion (TAKELAC™ W-6110, manufactured by Mitsui Chemicals, Inc. and a balance of highly pure water to make the total 100 parts were added to the mixture followed by mixing and stirring for 60 minutes. Thereafter, the thus-obtained mixture was filtrated with a polyvinylidene fluoride membrane filter having an average pore diameter of 1.2 μm under a pressure to remove coarse particles and dust to obtain pre-ink 1.

Manufacturing Example 2 of Pre-Ink

A total of 7.50 parts of 3-methoxy-N,N-dimethylpropanamide represented by the Chemical formula 1 illustrated above, 5.00 parts of propylene glycol monopropyl ether, 22.00 parts of propylene glycol, 2.00 parts of 2-ethyl-1,3-hexanediol, 0.50 parts of 2,4,7,9-tetramethyl decane-4,7-diol, and 1.50 parts of the polyether-modified siloxane compound represented by the Chemical formula 8 illustrated above were loaded in a container equipped with a stirrer followed by mixing and stirring for 30 minutes.

Thereafter, 0.05 parts of preservatives and fungicides (Proxel GXL, manufactured by Avecia Inkjet Limited), 0.30 parts of 2-amino-2-ethyl-1,3-propane diol, 24.00 parts of the prepared water-dispersible polyurethane resin A, 1.62 parts of polyurethane dispersion (TAKELAC™ W-6110, manufactured by Mitsui Chemicals, Inc.), 15.00 parts of surface-modified black pigment dispersion of Preparation Example 1, and a balance of highly pure water to make the total 100 parts were added to the mixture followed by mixing and stirring for 60 minutes. Thereafter, the thus-obtained mixture was filtrated with a polyvinylidene fluoride membrane filter having an average pore diameter of 1.2 μm under a pressure to remove coarse particles and dust to obtain pre-ink 2.

Manufacturing Examples 3 to 24 of Pre-Ink

The organic solvents, the surfactants, and the defoaming agents shown in each column of Manufacturing Examples 3 to 24 of pre-ink shown in Tables 1 to 3 were mixed and stirred, thereafter the preservatives and fungicides, the pH regulators, and the colorant (pigment dispersion) were mixed and stirred, and the water-dispersible polyurethane resin and resin particles shown in each column of Manufacturing Examples 3 to 24 of pre-ink shown in Tables 1 to 3 were mixed and stirred in the same manner as in Manufacturing Examples 1 and 2 of Pre-ink. Thereafter, the thus-obtained mixture was filtrated with a polyvinylidene fluoride membrane filter having an average pore diameter of 1.2 μm under a pressure to remove coarse particles and dust to obtain pre-inks 3 to 24.

TABLE 1

| Component (percent by mass) | | Pre-ink 1 | Pre-ink 2 | Pre-ink 3 | Pre-ink 4 |
|---|---|---|---|---|---|
| Colorant (pigment dispersion) | Surface-reformed black pigment dispersion (Preparation Example 1) | — | 15.00 | — | — |
| | Surface-reformed magenta pigment dispersion (Preparation Example 2) | — | — | 12.50 | — |
| | Surface-reformed cyan pigment dispersion (Preparation Example 3) | — | — | — | 10.00 |
| | Surface-reformed yellow pigment dispersion (Preparation Example 4) | — | — | — | — |
| | Liquid dispersion of polymer particulate containing magenta pigment (Preparation Example 5) | — | — | — | — |
| | Liquid dispersion of polymer particulate containing cyan pigment (Preparation Example 6) | — | — | — | — |

TABLE 1-continued

| | | | | | |
|---|---|---|---|---|---|
| | Liquid dispersion of polymer particulate containing yellow pigment (Preparation Example 7) | — | — | — | — |
| | Liquid dispersion of polymer particulate containing carbon black pigment (Preparation Example 8) | — | — | — | — |
| | Direct Blue 199 (Water-soluble cyan dye) | — | — | — | — |
| Polyurethane resin particle having structure of Chemical formula I | Water dispersible polyurethane resin A | 56.00 | 24.00 | — | — |
| | Water dispersible polyurethane resin B | — | — | 30.00 | — |
| | Water dispersible polyurethane resin C | — | — | — | 40.00 |
| | Water dispersible polyurethane resin D | — | — | — | — |
| Resin Particle | Polyurethane dispersion Super FLEX 300 | — | — | 1.67 | 1.00 |
| | Polyurethane dispersion TAKELAC ™ W-6110 | 1.62 | 1.62 | — | — |
| | Acrylic-silicone polymer particulate A | — | — | — | — |
| Organic solvent | Chemical formula 1 3-methoxy-N,N-dimethyl propaneamide (SP value: 9.19) | 7.50 | 7.50 | 5.00 | 5.00 |
| | Chemical formula 2 3-n-buthoxy-N,N-dimethyl propaneamide (SP value: 9.03) | — | — | 3.00 | — |
| | Chemical formula 5 3-ethyl-3-hydroxyl methyl oxetane (SP value: 11.31) | — | — | 2.00 | — |
| | Chemical formula 6 3-methyl-3-hydroxyl methyl oxetane (SP value: 11.79) | — | — | — | 3.00 |
| | Propylene glycol monopropyl ether (100 degrees C. vapor pressure: 107 mmHG) | 5.00 | 5.00 | — | — |
| | Propylene glycol monobutyl ether (100 degrees C. vapor pressure: 59 mmHG) | — | — | 2.00 | — |
| | 3-Methoxy-1-butanol (100 degrees C. vapor pressure: 76 mmHg) | — | — | — | — |
| | 3-Methoxy-3-methyl-1-butanol (100 degrees C. vapor pressure: 50 mmHg) | — | — | — | — |
| | Glycerin (SP value: 16.38) | — | — | 5.00 | — |
| | Propyleneglycol (SP value: 13.72) | 18.00 | 22.00 | 15.00 | 22.00 |
| | 2-ethyl-1,3-hexanediol (SP value: 10.6) | — | 2.00 | 2.00 | 2.00 |
| | 2,2,4-trimethyl-1,3-pentanediol (SP value: 10.8) | 2.00 | — | — | — |

TABLE 1-continued

| | Component (percent by mass) | | | | |
|---|---|---|---|---|---|
| Surfactant | Chemical formula 8 polyether-modified siloxane compound | 1.00 | 1.50 | — | — |
| | Chemical formula 10 polyether-modified siloxane compound | — | — | 1.00 | 2.00 |
| | Chemical formula 11 polyether-modified siloxane compound | — | — | — | — |
| | TEGO Wet 270 | — | — | — | — |
| | SILFACE SAG503A | — | — | — | — |
| | UNTDYNE™ DSN403N | — | — | — | — |
| Mildew-proofing agent | Proxel GXL | 0.05 | 0.05 | 0.05 | 0.05 |
| Foam Inhibitor (Defoaming Agent) | 2,4,7,9-tetramethyldecane-4,7-diol | 0.50 | 0.50 | 0.50 | 0.50 |
| | 2,5,8,11-tetramethyldodecane-5,8-diol | — | — | — | — |
| pH regulator | 2-amino-2-ethyl-1,3-propane diol | 0.30 | 0.30 | — | 0.10 |
| | 20 percent aqueous solution of potassium hydroxide | — | — | — | 0.24 |
| | 20 percent aqueous solution of sodium hydroxide | — | — | 0.17 | — |
| | Pure water | Balance | Balance | Balance | Balance |
| Total (Percent by mass) | | 100 | 100 | 100 | 100 |

| | Component (percent by mass) | Pre-ink 5 | Pre-ink 6 | Pre-ink 7 | Pre-ink 8 |
|---|---|---|---|---|---|
| Colorant (pigment dispersion) | Surface-reformed black pigment dispersion (Preparation Example 1) | — | — | — | — |
| | Surface-reformed magenta pigment dispersion (Preparation Example 2) | — | — | — | — |
| | Surface-reformed cyan pigment dispersion (Preparation Example 3) | — | — | — | — |
| | Surface-reformed yellow pigment dispersion (Preparation Example 4) | 12.50 | — | — | — |
| | Liquid dispersion of polymer particulate containing magenta pigment (Preparation Example 5) | — | 20.00 | — | — |
| | Liquid dispersion of polymer particulate containing cyan pigment (Preparation Example 6) | — | — | 16.67 | — |
| | Liquid dispersion of polymer particulate containing yellow pigment (Preparation Example 7) | — | — | — | 16.67 |
| | Liquid dispersion of polymer particulate containing carbon black pigment (Preparation Example 8) | — | — | — | — |

TABLE 1-continued

| | | | | | |
|---|---|---|---|---|---|
| | Direct Blue 199 (Water-soluble cyan dye) | — | — | — | — |
| Polyurethane resin particle having structure of Chemical formula I | Water dispersible polyurethane resin A | — | 32.00 | — | — |
| | Water dispersible polyurethane resin B | — | — | 24.00 | — |
| | Water dispersible polyurethane resin C | — | — | — | 34.00 |
| | Water dispersible polyurethane resin D | 30.00 | — | — | — |
| Resin Particle | Polyurethane dispersion Super FLEX 300 | 3.23 | — | — | 1.67 |
| | Polyurethane dispersion TAKELAC ™ W-6110 | — | 1.62 | 1.62 | — |
| | Acrylic-silicone polymer particulate A | — | — | 3.75 | — |
| Organic solvent | Chemical formula 1 3-methoxy-N,N-dimethyl propaneamide (SP value: 9.19) | — | — | 10.00 | 8.00 |
| | Chemical formula 2 3-n-buthoxy-N,N-dimethyl propaneamide (SP value: 9.03) | — | 3.00 | — | — |
| | Chemical formula 5 3-ethyl-3-hydroxyl methyl oxetane (SP value: 11.31) | — | 5.00 | — | 1.00 |
| | Chemical formula 6 3-methyl-3-hydroxyl methyl oxetane (SP value: 11.79) | — | — | — | — |
| | Propylene glycol monopropyl ether (100 degrees C. vapor pressure: 107 mmHG) | — | — | — | — |
| | Propylene glycol monobutyl ether (100 degrees C. vapor pressure: 59 mmHG) | — | — | — | — |
| | 3-Methoxy-1-butanol (100 degrees C. vapor pressure: 76 mmHg) | — | 3.00 | — | 6.00 |
| | 3-Methoxy-3-methyl-1-butanol (100 degrees C. vapor pressure: 50 mmHg) | — | — | 4.00 | — |
| | Glycerin (SP value: 16.38) | 3.00 | — | — | — |
| | Propyleneglycol (SP value: 13.72) | 30.00 | 20.00 | 20.00 | 18.00 |
| | 2-ethyl-1,3-hexanediol (SP value: 10.6) | — | — | 2.00 | 1.00 |
| | 2,2,4-trimethyl-1,3-pentanediol (SP value: 10.8) | 2.00 | 2.00 | — | — |
| Surfactant | Chemical formula 8 polyether-modified siloxane compound | — | — | — | — |
| | Chemical formula 10 polyether-modified siloxane compound | — | — | — | — |
| | Chemical formula 11 polyether-modified siloxane compound | 2.00 | — | — | — |
| | TEGO Wet 270 | — | 2.00 | — | 1.00 |
| | SILFACE SAG503A | — | — | 1.00 | 1.00 |

TABLE 1-continued

|  |  |  |  |  |  |
|---|---|---|---|---|---|
|  | UNIDYNE ™ DSN403N | — | — | — | — |
| Mildew-proofing agent | Proxel GXL | 0.05 | 0.05 | 0.05 | 0.05 |
| Foam Inhibitor (Defoaming Agent) | 2,4,7,9-tetramethyldecane-4,7-diol | — | — | 0.40 | 0.40 |
|  | 2,5,8,11-tetramethyldodecane-5,8-diol | 0.40 | 0.40 | — | — |
| pH regulator | 2-amino-2-ethyl-1,3-propane diol | 0.40 | 0.20 | — | 0.30 |
|  | 20 percent aqueous solution of potassium hydroxide | — | — | — | — |
|  | 20 percent aqueous solution of sodium hydroxide | — | 0.02 | — | — |
|  | Pure water | Balance | Balance | Balance | Balance |
|  | Total (Percent by mass) | 100 | 100 | 100 | 100 |

TABLE 2

| Component (percent by mass) |  | Pre-ink 9 | Pre-ink 10 | Pre-ink 11 | Pre-ink 12 |
|---|---|---|---|---|---|
| Colorant (pigment dispersion) | Surface-reformed black pigment dispersion (Preparation Example 1) | — | — | — | — |
|  | Surface-reformed magenta pigment dispersion (Preparation Example 2) | — | — | — | — |
|  | Surface-reformed cyan pigment dispersion (Preparation Example 3) | — | — | — | — |
|  | Surface-reformed yellow pigment dispersion (Preparation Example 4) | — | — | — | — |
|  | Liquid dispersion of polymer particulate containing magenta pigment (Preparation Example 5) | — | — | — | — |
|  | Liquid dispersion of polymer particulate containing cyan pigment (Preparation Example 6) | — | — | — | 6.67 |
|  | Liquid dispersion of polymer particulate containing yellow pigment (Preparation Example 7) | — | — | — | — |
|  | Liquid dispersion of polymer particulate containing carbon black pigment (Preparation Example 8) | 20.00 | 20.00 | 20.00 | — |
|  | Direct Blue 199 (Water-soluble cyan dye) | — | — | — | — |
| Polyurethane resin particle having structure of | Water dispersible polyurethane resin A | — | 11.20 | 20.00 | — |
|  | Water dispersible polyurethane resin B | — | — | — | 40.00 |

TABLE 2-continued

| | | | | | |
|---|---|---|---|---|---|
| Chemical formula I | Water dispersible polyurethane resin C | — | — | — | — |
| | Water dispersible polyurethane resin D | 26.00 | — | — | — |
| Resin Particle | Polyurethane dispersion Super FLEX 300 | — | 16.67 | 1.67 | — |
| | Polyurethane dispersion TAKELAC™ W-6110 | 1.62 | — | — | 1.62 |
| | Acrylic-silicone polymer particulate A | 2.40 | — | — | — |
| Organic solvent | Chemical formula 1 3-methoxy-N,N-dimethyl propaneamide (SP value: 9.19) | 7.50 | 5.00 | 5.00 | 5.00 |
| | Chemical formula 2 3-n-buthoxy-N,N-dimethyl propaneamide (SP value: 9.03) | — | — | — | — |
| | Chemical formula 5 3-ethyl-3-hydroxyl methyl oxetane (SP value: 11.31) | 2.50 | 3.00 | 3.00 | 3.00 |
| | Chemical formula 6 3-methyl-3-hydroxyl methyl oxetane (SP value: 11.79) | — | — | — | — |
| | Propylene glycol monopropyl ether (100 degrees C. vapor pressure: 107 mmHG) | 3.00 | — | 5.00 | — |
| | Propylene glycol monobutyl ether (100 degrees C. vapor pressure: 59 mmHG) | — | 3.00 | — | 5.00 |
| | 3-Methoxy-1-butanol (100 degrees C. vapor pressure: 76 mmHg) | — | — | — | — |
| | 3-Methoxy-3-methyl-1-butanol (100 degrees C. vapor pressure: 50 mmHg) | — | 2.00 | — | — |
| | Glycerin (SP value: 16.38) | — | — | 4.00 | — |
| | Propyleneglycol (SP value: 13.72) | 20.00 | 20.00 | 20.00 | 18.00 |
| | 2-ethyl-1,3-hexanediol (SP value: 10.6) | 2.00 | 2.00 | 2.00 | 2.00 |
| | 2,2,4-trimethyl-1,3-pentanediol (SP value: 10.8) | — | — | — | — |
| Surfactant | Chemical formula 8 polyether-modified siloxane compound | — | — | — | — |
| | Chemical formula 10 polyether-modified siloxane compound | — | 2.00 | — | — |
| | Chemical formula 11 polyether-modified siloxane compound | — | — | 3.00 | 3.00 |
| | TEGO Wet 270 | — | — | — | — |
| | SILFACE SAG503A | — | — | — | — |
| | UNIDYNE™ DSN403N | 0.20 | — | — | — |
| Mildew-proofing agent | Proxel GXL | 0.05 | 0.05 | 0.05 | 0.05 |
| Foam Inhibitor (Defoaming Agent) | 2,4,7,9-tetramethyldecane-4,7-diol | 0.80 | 0.40 | 0.40 | 0.40 |
| | 2,5,8,11-tetramethyldodecane-5,8-diol | — | — | — | — |

TABLE 2-continued

| | | | | | |
|---|---|---|---|---|---|
| pH regulator | 2-amino-2-ethyl-1,3-propane diol | 0.20 | 0.30 | 0.30 | 0.30 |
| | 20 percent aqueous solution of potassium hydroxide | — | 0.03 | — | 0.03 |
| | 20 percent aqueous solution of sodium hydroxide | 0.02 | — | — | — |
| | Pure water | Balance | Balance | Balance | Balance |
| Total (Percent by mass) | | 100 | 100 | 100 | 100 |

| Component (percent by mass) | | Pre-ink 13 | Pre-ink 14 | Pre-ink 15 | Pre-ink 16 |
|---|---|---|---|---|---|
| Colorant (pigment dispersion) | Surface-reformed black pigment dispersion (Preparation Example 1) | — | — | — | — |
| | Surface-reformed magenta pigment dispersion (Preparation Example 2) | — | — | — | — |
| | Surface-reformed cyan pigment dispersion (Preparation Example 3) | — | — | — | — |
| | Surface-reformed yellow pigment dispersion (Preparation Example 4) | — | — | — | — |
| | Liquid dispersion of polymer particulate containing magenta pigment (Preparation Example 5) | — | — | — | — |
| | Liquid dispersion of polymer particulate containing cyan pigment (Preparation Example 6) | — | — | 10.00 | — |
| | Liquid dispersion of polymer particulate containing yellow pigment (Preparation Example 7) | 7.33 | — | — | — |
| | Liquid dispersion of polymer particulate containing carbon black pigment (Preparation Example 8) | — | 16.67 | — | — |
| | Direct Blue 199 (Water-soluble cyan dye) | — | — | — | 3.00 |
| Polyurethane resin particle having structure of Chemical formula I | Water dispersible polyurethane resin A | — | — | — | 24.00 |
| | Water dispersible polyurethane resin B | — | — | — | — |
| | Water dispersible polyurethane resin C | 45.71 | — | — | — |
| | Water dispersible polyurethane resin D | — | — | 32.00 | — |
| Resin Particle | Polyurethane dispersion Super FLEX 300 | — | — | 1.67 | 1.67 |
| | Polyurethane dispersion TAKELAC ™ W-6110 | 1.62 | 24.27 | — | — |
| | Acrylic-silicone polymer particulate A | — | — | — | — |
| Organic solvent | Chemical formula 1 3-methoxy-N,N-dimethyl | 5.00 | 5.00 | 5.00 | 5.00 |

TABLE 2-continued

| | | | | | |
|---|---|---|---|---|---|
| | propaneamide (SP value: 9.19) | | | | |
| | Chemical formula 2 3-n-buthoxy-N,N-dimethyl propaneamide (SP value: 9.03) | — | — | — | — |
| | Chemical formula 5 3-ethyl-3-hydroxyl methyl oxetane (SP value: 11.31) | 3.00 | 3.00 | 3.00 | 3.00 |
| | Chemical formula 6 3-methyl-3-hydroxyl methyl oxetane (SP value: 11.79) | — | — | — | — |
| | Propylene glycol monopropyl ether (100 degrees C. vapor pressure: 107 mmHG) | 2.00 | — | — | 2.00 |
| | Propylene glycol monobutyl ether (100 degrees C. vapor pressure: 59 mmHG) | — | — | 5.00 | — |
| | 3-Methoxy-1-butanol (100 degrees C. vapor pressure: 76 mmHg) | — | — | — | — |
| | 3-Methoxy-3-methyl-1-butanol (100 degrees C. vapor pressure: 50 mmHg) | — | 5.00 | — | 2.00 |
| | Glycerin (SP value: 16.38) | 2.00 | — | 2.00 | 5.00 |
| | Propyleneglycol (SP value: 13.72) | 15.00 | 20.00 | 18.00 | 25.00 |
| | 2-ethyl-1,3-hexanediol (SP value: 10.6) | 2.00 | 2.00 | 2.00 | 2.00 |
| | 2,2,4-trimethyl-1,3-pentanediol (SP value: 10.8) | — | — | — | — |
| Surfactant | Chemical formula 8 polyether-modified siloxane compound | — | — | — | 2.00 |
| | Chemical formula 10 polyether-modified siloxane compound | — | — | — | — |
| | Chemical formula 11 polyether-modified siloxane compound | — | — | — | — |
| | TEGO Wet 270 | — | 2.00 | 2.00 | — |
| | SILFACE SAG503A | 2.00 | — | — | — |
| | UNIDYNE ™ DSN403N | — | — | — | — |
| Mildew-proofing agent | Proxel GXL | 0.05 | 0.05 | 0.05 | 0.05 |
| Foam Inhibitor (Defoaming Agent) | 2,4,7,9-tetramethyldecane-4,7-diol | 0.40 | — | — | 0.40 |
| | 2,5,8,11-tetramethyldodecane-5,8-diol | — | 0.40 | 0.40 | — |
| pH regulator | 2-amino-2-ethyl-1,3-propane diol | 0.30 | 0.30 | 0.30 | 0.20 |
| | 20 percent aqueous solution of potassium hydroxide | — | — | — | — |
| | 20 percent aqueous solution of sodium hydroxide | — | — | — | — |
| | Pure water | Balance | Balance | Balance | Balance |
| Total (Percent by mass) | | 100 | 100 | 100 | 100 |

TABLE 3

| Component (percent by mass) | | Pre-ink 17 | Pre-ink 18 | Pre-ink 19 | Pre-ink 20 |
|---|---|---|---|---|---|
| Colorant (pigment dispersion) | Surface-reformed black pigment dispersion (Preparation Example 1) | — | 15.00 | — | — |
| | Surface-reformed magenta pigment dispersion (Preparation Example 2) | — | — | — | — |
| | Surface-reformed cyan pigment dispersion (Preparation Example 3) | — | — | 10.00 | 10.00 |
| | Surface-reformed yellow pigment dispersion (Preparation Example 4) | — | — | — | — |
| | Liquid dispersion of polymer particulate containing magenta pigment (Preparation Example 5) | — | — | — | — |
| | Liquid dispersion of polymer particulate containing cyan pigment (Preparation Example 6) | — | — | — | — |
| | Liquid dispersion of polymer particulate containing yellow pigment (Preparation Example 7) | — | — | — | — |
| | Liquid dispersion of polymer particulate containing carbon black pigment (Preparation Example 8) | — | — | — | — |
| | Direct Blue 199 (Water-soluble cyan dye) | — | — | — | — |
| Polyurethane resin particle having structure of Chemical formula I | Water dispersible polyurethane resin A | 56.00 | 24.00 | — | — |
| | Water dispersible polyurethane resin B | — | — | — | — |
| | Water dispersible polyurethane resin C | — | — | 40.00 | 40.00 |
| | Water dispersible polyurethane resin D | — | — | — | — |
| Resin Particle | Polyurethane dispersion Super FLEX 300 | — | — | 1.00 | 1.00 |
| | Polyurethane dispersion TAKELAC ™ W-6110 | 1.62 | 1.62 | — | — |
| | Acrylic-silicone polymer particulate A | — | — | — | — |
| Organic solvent | Chemical formula 1 3-methoxy-N,N-dimethyl propaneamide (SP value: 9.19) | 7.50 | 7.50 | 5.00 | 5.00 |
| | Chemical formula 2 3-n-buthoxy-N,N-dimethyl propaneamide (SP value: 9.03) | — | — | — | — |
| | Chemical formula 5 3-ethyl-3-hydroxyl methyl oxetane (SP value: 11.31) | — | — | — | — |

TABLE 3-continued

| | | Pre-ink 21 | Pre-ink 22 | Pre-ink 23 | Pre-ink 24 |
|---|---|---|---|---|---|
| | Chemical formula 6 3-methyl-3-hydroxyl methyl oxetane (SP value: 11.79) | — | — | 3.00 | 3.00 |
| | Propylene glycol monopropyl ether (100 degrees C. vapor pressure: 107 mmHG) | 5.00 | 5.00 | — | — |
| | Propylene glycol monobutyl ether (100 degrees C. vapor pressure: 59 mmHG) | — | — | — | — |
| | 3-Methoxy-1-butanol (100 degrees C. vapor pressure: 76 mmHg) | — | — | — | — |
| | 3-Methoxy-3-methyl-1-butanol (100 degrees C. vapor pressure: 50 mmHg) | — | — | — | — |
| | Glycerin (SP value: 16.38) | — | — | — | — |
| | Propyleneglycol (SP value: 13.72) | 18.00 | 22.00 | 22.00 | 22.00 |
| | 2-ethyl-1,3-hexanediol (SP value: 10.6) | — | 2.00 | 2.00 | 2.00 |
| | 2,2,4-trimethyl-1,3-pentanediol (SP value: 10.8) | 2.00 | — | — | — |
| Surfactant | Chemical formula 8 polyether-modified siloxane compound | — | — | — | — |
| | Chemical formula 10 polyether-modified siloxane compound | — | — | 2.00 | 2.00 |
| | Chemical formula 11 polyether-modified siloxane compound | — | — | — | — |
| | TEGO Wet 270 | — | — | — | — |
| | SILFACE SAG503A | — | — | — | — |
| | UNIDYNE™ DSN403N | 1.00 | 1.50 | — | — |
| Mildew-proofing agent | Proxel GXL | 0.05 | 0.05 | 0.05 | 0.05 |
| Foam Inhibitor (Defoaming Agent) | 2,4,7,9-tetramethyldecane-4,7-diol | 0.50 | 0.50 | 0.50 | 0.50 |
| | 2,5,8,11-tetramethyldodecane-5,8-diol | — | — | — | — |
| pH regulator | 2-amino-2-ethyl-1,3-propane diol | 0.30 | 0.30 | 0.10 | 0.10 |
| | 20 percent aqueous solution of potassium hydroxide | — | — | — | — |
| | 20 percent aqueous solution of sodium hydroxide | — | — | 0.25 | 0.50 |
| | Pure water | Balance | Balance | Balance | Balance |
| Total (Percent by mass) | | 100 | 100 | 100 | 100 |

| Component (percent by mass) | | Pre-ink 21 | Pre-ink 22 | Pre-ink 23 | Pre-ink 24 |
|---|---|---|---|---|---|
| Colorant (pigment dispersion) | Surface-reformed black pigment dispersion (Preparation Example 1) | — | — | — | — |
| | Surface-reformed magenta pigment dispersion (Preparation Example 2) | — | — | — | — |
| | Surface-reformed cyan pigment | 10.00 | 10.00 | 10.00 | 10.00 |

TABLE 3-continued

| | | | | | |
|---|---|---|---|---|---|
| | dispersion (Preparation Example 3) | | | | |
| | Surface-reformed yellow pigment dispersion (Preparation Example 4) | — | — | — | — |
| | Liquid dispersion of polymer particulate containing magenta pigment (Preparation Example 5) | — | — | — | — |
| | Liquid dispersion of polymer particulate containing cyan pigment (Preparation Example 6) | — | — | — | — |
| | Liquid dispersion of polymer particulate containing yellow pigment (Preparation Example 7) | — | — | — | — |
| | Liquid dispersion of polymer particulate containing carbon black pigment (Preparation Example 8) | — | — | — | — |
| | Direct Blue 199 (Water-soluble cyan dye) | — | — | — | — |
| Polyurethane resin particle having structure of Chemical formula I | Water dispersible polyurethane resin A | — | — | — | — |
| | Water dispersible polyurethane resin B | — | — | — | — |
| | Water dispersible polyurethane resin C | 40.00 | 40.00 | 40.00 | 40.00 |
| | Water dispersible polyurethane resin D | — | — | — | — |
| Resin Particle | Polyurethane dispersion Super FLEX 300 | 1.00 | 1.00 | 1.00 | 1.00 |
| | Polyurethane dispersion TAKELAC ™ W-6110 | — | — | — | — |
| | Acrylic-silicone polymer particulate A | — | — | — | — |
| Organic solvent | Chemical formula 1 3-methoxy-N,N-dimethyl propaneamide (SP value: 9.19) | 5.00 | 5.00 | 5.00 | 5.00 |
| | Chemical formula 2 3-n-buthoxy-N,N-dimethyl propaneamide (SP value: 9.03) | — | — | — | — |
| | Chemical formula 5 3-ethyl-3-hydroxyl methyl oxetane (SP value: 11.31) | — | — | — | — |
| | Chemical formula 6 3-methyl-3-hydroxyl methyl oxetane (SP value: 11.79) | 3.00 | 3.00 | 3.00 | 3.00 |
| | Propylene glycol monopropyl ether (100 degrees C. vapor pressure: 107 mmHG) | — | — | — | — |
| | Propylene glycol monobutyl ether (100 degrees C. vapor pressure: 59 mmHG) | — | — | — | — |
| | 3-Methoxy-1-butanol (100 degrees C. | | | | |

TABLE 3-continued

| | | | | | |
|---|---|---|---|---|---|
| | vapor pressure: 76 mmHg) | | | | |
| | 3-Methoxy-3-methyl-1-butanol (100 degrees C. vapor pressure: 50 mmHg) | — | — | — | — |
| | Glycerin (SP value: 16.38) | — | — | — | — |
| | Propyleneglycol (SP value: 13.72) | 22.00 | 22.00 | 22.00 | 22.00 |
| | 2-ethyl-1,3-hexanediol (SP value: 10.6) | 2.00 | 2.00 | 2.00 | 2.00 |
| | 2,2,4-trimethyl-1,3-pentanediol (SP value: 10.8) | — | — | — | — |
| Surfactant | Chemical formula 8 polyether-modified siloxane compound | — | — | — | — |
| | Chemical formula 10 polyether-modified siloxane compound | 2.00 | 2.00 | 2.00 | 2.00 |
| | Chemical formula 11 polyether-modified siloxane compound | — | — | — | — |
| | TEGO Wet 270 | — | — | — | — |
| | SILFACE SAG503A | — | — | — | — |
| | UNIDYNE™ DSN403N | — | — | — | — |
| Mildew-proofing agent | Proxel GXL | 0.05 | 0.05 | 0.05 | 0.05 |
| Foam Inhibitor (Defoaming Agent) | 2,4,7,9-tetramethyldecane-4,7-diol | 0.50 | 0.50 | 0.50 | 0.50 |
| | 2,5,8,11-tetramethyldodecane-5,8-diol | — | — | — | — |
| pH regulator | 2-amino-2-ethyl-1,3-propane diol | 0.10 | 0.10 | 0.10 | 0.10 |
| | 20 percent aqueous solution of potassium hydroxide | — | 0.51 | 0.70 | 1.20 |
| | 20 percent aqueous solution of sodium hydroxide | 0.80 | — | — | — |
| | Pure water | Balance | Balance | Balance | Balance |
| Total (Percent by mass) | | 100 | 100 | 100 | 100 |

Details of abbreviations, etc., shown in Tables 1 and 3 are as follows:

Direct Blue 199 (water-soluble cyan dye): manufactured by EKTA INTERNATIONAL

SUPER FLEX 300: Polyurethane resin dispersion (solid portion: 30.0 percent, Tg: −42 degrees C., manufactured by DKS Co., Ltd.)

TAKELAC™ W-6110: Polyurethane dispersion, solid portion: 30.9 percent, Tg: −20 degrees C., manufactured by Mitsui Chemicals, Inc.)

Compound represented by Chemical formula 1: 3-methoxy-N,N-dimethyl propionamide

Compound represented by Chemical formula 2: 3-n-buthoxy-N,N-dimethyl propaneamide Compound represented by Chemical formula 5: 3-ethyl-3-hydroxymethyl oxetane Compound represented by Chemical formula 6: 3-methyl-3-hydroxymethyl oxetane TEGO Wet 270: Polyether-modified siloxane compound (manufactured by Evonik Industries AG, effective component: 100 percent)

SILFACE SAG503A: Polyether-modified siloxane compound (effective component: 100 percent, manufactured by Nisshin Chemical Co., Ltd.)

UNIDYNE™ DSN403N: Polyoxyethylene perfluoroalkyl ether (effective component: 100 percent, manufactured by DAIKIN INDUSTRIES, LTD.)

PROXEL GXL: Preservatives and fungicides containing 1,2-benzisothiazolin-3-one as a major component (component: 20 percent by mass, containing dipropylene glycol, manufactured by Avecia Inkjet Limited)

Properties of each ink of Manufacturing Examples 1 to 24 of Pre-ink were evaluated in the following manner. The results are shown in Table 4.

Viscosity

Viscosity of the ink was measured at 25 degrees C. using a viscometer (RE-85L, manufactured by TOKI SANGYO CO., LTD.).

pH pH of the ink was measured at 25 degrees C. using a pH meter (HM-30R type, manufactured by DKK-TOA CORPORATION).

Static Surface Tension

Viscosity of the ink was measured at 25 degrees C. using an automatic surface tensiometer (DY-300, manufactured by KYOWA INTERFACE SCIENCE Co., Ltd.).

Dynamic Surface Tension

Dynamic surface tension of the ink of the present disclosure was measured at 25 degrees C. at a surface life of 15 msec by SITA_DynoTester (manufactured by SITA Messtechnik GmbH) according to maximum bubble pressure technique.

TABLE 4

| Ink | Polyurethane resin particle solid portion having structure of Chemical formula I | Polyurethane resin particle solid portion (percent) | Ratio of polyurethane resin particle/colorant solid portion |
|---|---|---|---|
| Pre-ink 1 | 14.0 | 14.5 | — |
| Pre-ink 2 | 6.0 | 6.5 | 2.2 |
| Pre-ink 3 | 7.5 | 8.0 | 3.2 |
| Pre-ink 4 | 10.0 | 10.3 | 5.2 |
| Pre-ink 5 | 7.5 | 8.5 | 3.4 |
| Pre-ink 6 | 8.0 | 8.5 | 2.8 |
| Pre-ink 7 | 6.0 | 6.5 | 2.6 |
| Pre-ink 8 | 8.5 | 9.0 | 3.6 |
| Pre-ink 9 | 6.5 | 7.0 | 2.3 |
| Pre-ink 10 | 2.8 | 7.8 | 2.6 |
| Pre-ink 11 | 5.0 | 5.5 | 1.8 |
| Pre-ink 12 | 10.0 | 10.5 | 10.5 |
| Pre-ink 13 | 11.4 | 11.9 | 10.8 |
| Pre-ink 14 | 0.0 | 7.5 | 3.0 |
| Pre-ink 15 | 8.0 | 8.5 | 5.7 |
| Pre-ink 16 | 6.0 | 6.5 | 2.2 |
| Pre-ink 17 | 14.5 | — | 10.20 |
| Pre-ink 18 | 6.5 | 2.2 | 9.40 |
| Pre-ink 19 | 10.0 | 10.3 | 5.2 |
| Pre-ink 20 | 10.0 | 10.3 | 5.2 |
| Pre-ink 21 | 10.0 | 10.3 | 5.2 |
| Pre-ink 22 | 10.0 | 10.3 | 5.2 |
| Pre-ink 23 | 10.0 | 10.3 | 5.2 |
| Pre-ink 24 | 10.0 | 10.3 | 5.2 |

TABLE 4-continued

| | Ink property values | | | |
|---|---|---|---|---|
| Ink | Viscosity (mPa · s) | pH | Static surface tension (mN/m) | 15 msec dynamic surface tension (mN/m) |
| Pre-ink 1 | 10.20 | 8.70 | 21.5 | 32.7 |
| Pre-ink 2 | 9.40 | 8.75 | 20.9 | 31.8 |
| Pre-ink 3 | 9.50 | 9.20 | 21.3 | 32.2 |
| Pre-ink 4 | 9.20 | 9.50 | 20.6 | 31.3 |
| Pre-ink 5 | 9.10 | 8.90 | 20.5 | 30.6 |
| Pre-ink 6 | 9.47 | 9.00 | 20.7 | 30.9 |
| Pre-ink 7 | 9.30 | 8.20 | 21.4 | 32.3 |
| Pre-ink 8 | 9.60 | 8.80 | 20.4 | 30.3 |
| Pre-ink 9 | 9.40 | 9.05 | 22.5 | 33.0 |
| Pre-ink 10 | 8.90 | 9.16 | 20.3 | 30.1 |
| Pre-ink 11 | 9.20 | 8.87 | 20.1 | 29.9 |
| Pre-ink 12 | 9.08 | 9.40 | 20.1 | 29.8 |
| Pre-ink 13 | 9.70 | 8.90 | 20.6 | 30.9 |
| Pre-ink 14 | 8.56 | 8.80 | 20.8 | 31.2 |
| Pre-ink 15 | 9.40 | 8.70 | 20.7 | 31.1 |
| Pre-ink 16 | 8.84 | 8.60 | 20.9 | 31.6 |
| Pre-ink 17 | 8.70 | 19.5 | 29.6 | 29.6 |
| Pre-ink 18 | 8.75 | 19.1 | 29.4 | 29.4 |
| Pre-ink 19 | 9.19 | 9.78 | 20.6 | 31.5 |
| Pre-ink 20 | 9.06 | 10.56 | 20.5 | 31.3 |
| Pre-ink 21 | 9.01 | 10.85 | 20.5 | 31.2 |
| Pre-ink 22 | 9.18 | 9.94 | 20.7 | 31.5 |
| Pre-ink 23 | 9.08 | 10.61 | 20.6 | 31.4 |
| Pre-ink 24 | 8.99 | 10.97 | 20.5 | 31.3 |

Manufacturing Example of Ink

The pre-inks 1 to 24 were heated under the conditions shown in Table 5 to obtain Inks 1 to 27. For each ink, the properties were measured in the same manner as for the pre-ink. The pre-inks were heated to manufacture inks of Examples.

The results are shown in Table 5.

TABLE 5

| Ink | Pre-ink | Ink heating temperature and heating time | Polyurethane resin particle solid portion (percent) | Ratio of polyurethane resin particle/colorant solid portion |
|---|---|---|---|---|
| Ink 1 | Pre-ink 1 | 50 degrees C., 2 weeks | 14.5 | — |
| Ink 2 | Pre-ink 1 | 60 degrees C., 48 hours | 14.5 | — |
| Ink 3 | Pre-ink 2 | 65 degrees C., 8 hours | 6.5 | 2.2 |
| Ink 4 | Pre-ink 3 | 40 degrees C., one month (30 days) | 8.0 | 3.2 |
| Ink 5 | Pre-ink 4 | 60 degrees C., 24 hours | 10.3 | 5.2 |
| Ink 6 | Pre-ink 5 | 55 degrees C., 24 hours | 8.5 | 3.4 |
| Ink 7 | Pre-ink 6 | 68 degrees C., 6 hours | 8.5 | 2.8 |
| Ink 8 | Pre-ink 7 | 45 degrees C., one month (30 days) | 6.5 | 2.6 |
| Ink 9 | Pre-ink 8 | 65 degrees C., 12 hours | 9.0 | 3.6 |
| Ink 10 | Pre-ink 9 | 60 degrees C., 24 hours | 7.0 | 2.3 |
| Ink 11 | Pre-ink 10 | 60 degrees C., 24 hours | 7.8 | 2.6 |
| Ink 12 | Pre-ink 11 | 60 degrees C., 24 hours | 5.5 | 1.8 |

TABLE 5-continued

| Ink | Pre-ink | | | |
|---|---|---|---|---|
| Ink 13 | Pre-ink 12 | 60 degrees C., 16 hours | 10.5 | 10.5 |
| Ink 14 | Pre-ink 13 | 65 degrees C., 12 hours | 11.9 | 10.8 |
| Ink 15 | Pre-ink 15 | 60 degrees C., 12 hours | 8.5 | 5.7 |
| Ink 16 | Pre-ink 16 | 60 degrees C., 16 hours | 6.5 | 2.2 |
| Ink 17 | Pre-ink 12 | 50 degrees C., 36 hours | 10.5 | 10.5 |
| Ink 18 | Pre-ink 12 | 38 degrees C., one month (30 days) | 10.5 | 10.5 |
| Ink 19 | Pre-ink 17 | No heating | 14.5 | — |
| Ink 20 | Pre-ink 18 | No heating | 6.5 | 2.2 |
| Ink 21 | Pre-ink 19 | No heating | 10.3 | 5.2 |
| Ink 22 | Pre-ink 20 | No heating | 10.3 | 5.2 |
| Ink 23 | Pre-ink 21 | No heating | 10.3 | 5.2 |
| Ink 24 | Pre-ink 22 | No heating | 10.3 | 5.2 |
| Ink 25 | Pre-ink 23 | No heating | 10.3 | 5.2 |
| Ink 26 | Pre-ink 24 | No heating | 10.3 | 5.2 |
| Ink 27 | Pre-ink 19 | 60 degrees C., 12 hours | 10.3 | 5.2 |

| | | Ink Property values | | | |
|---|---|---|---|---|---|
| Ink | Pre-ink | Viscosity (mPa·s) | pH | Static surface tension (mN/m) | 15 msec dynamic surface tension (mN/m) |
| Ink 1 | Pre-ink 1 | 10.21 | 8.69 | 21.5 | 32.7 |
| Ink 2 | Pre-ink 1 | 10.14 | 8.42 | 21.3 | 32.5 |
| Ink 3 | Pre-ink 2 | 9.42 | 8.72 | 21.0 | 31.9 |
| Ink 4 | Pre-ink 3 | 9.50 | 9.19 | 21.3 | 32.2 |
| Ink 5 | Pre-ink 4 | 9.18 | 9.46 | 20.5 | 31.4 |
| Ink 6 | Pre-ink 5 | 9.11 | 8.84 | 20.5 | 30.6 |
| Ink 7 | Pre-ink 6 | 9.48 | 9.00 | 20.7 | 30.9 |
| Ink 8 | Pre-ink 7 | 9.26 | 8.12 | 21.3 | 32.1 |
| Ink 9 | Pre-ink 8 | 9.61 | 8.74 | 20.4 | 30.3 |
| Ink 10 | Pre-ink 9 | 9.41 | 9.04 | 22.5 | 33.0 |
| Ink 11 | Pre-ink 10 | 8.91 | 9.15 | 20.3 | 30.1 |
| Ink 12 | Pre-ink 11 | 9.22 | 8.84 | 20.2 | 29.9 |
| Ink 13 | Pre-ink 12 | 9.05 | 9.38 | 20.1 | 29.8 |
| Ink 14 | Pre-ink 13 | 9.70 | 8.83 | 20.6 | 30.9 |
| Ink 15 | Pre-ink 15 | 9.39 | 8.68 | 20.7 | 31.1 |
| Ink 16 | Pre-ink 16 | 8.85 | 8.58 | 20.9 | 31.6 |
| Ink 17 | Pre-ink 12 | 9.07 | 9.41 | 20.1 | 29.8 |
| Ink 18 | Pre-ink 12 | 9.06 | 9.39 | 20.1 | 29.8 |
| Ink 19 | Pre-ink 17 | 10.20 | 8.70 | 19.5 | 29.6 |
| Ink 20 | Pre-ink 18 | 9.40 | 8.75 | 19.1 | 29.4 |
| Ink 21 | Pre-ink 19 | 9.19 | 9.78 | 20.6 | 31.5 |
| Ink 22 | Pre-ink 20 | 9.06 | 10.56 | 20.5 | 31.3 |
| Ink 23 | Pre-ink 21 | 9.01 | 10.85 | 20.5 | 31.2 |
| Ink 24 | Pre-ink 22 | 9.18 | 9.94 | 20.7 | 31.5 |
| Ink 25 | Pre-ink 23 | 9.08 | 10.61 | 20.6 | 31.4 |
| Ink 26 | Pre-ink 24 | 8.99 | 10.97 | 20.5 | 31.3 |
| Ink 27 | Pre-ink 19 | 9.15 | 9.58 | 20.4 | 31.1 |

An ink pack was filled with the pre-ink and the ink heated under each condition. The ink was allowed to stand at room temperature environment (20 to 30 degrees C.) for one month (30 days) and evaluated in the following manner. Also, using the ink, images were formed and the properties were evaluated. The results are shown in Table 6.

Quality and Quantification of Crystal of Cyclic Ester Having Structure Represented by Chemical Formula I Contained in Ink Qualitative Method and Quantification Method Simply, the quantification of the crystal of the cyclic ester having the structure represented by Chemical formula I contained in the ink was as follows:

Each ink of Manufacturing Example is filtered with a filtration jig in which filter paper having a Φ of 60 mm No. 5C (particle retention capacity of 1 μm) for Kiriyama funnel was set in a Kiriyama funnel having a Φ of 60 mm and the crystals and the filter paper retained after the filtration was sufficiently rinsed with highly pure water followed by drying them until the moisture content of the filter paper was the same as before the filtration. By taking the difference between the weight of the filter paper before filtration and the total of the weight of the crystals retained after the filtration and the weight of the filter paper, the crystal of the cyclic ester having the structure represented by the Chemical formula I was quantified.

The amount of ink to be filtered was determined by filtering 3,000 g of the ink to increase the quantification accuracy.

All the crystals on the filter paper were dissolved with tetrahydrofuran and the remaining filter paper was dried and weighed. There was no difference between the weight of the weighed filter paper and the weight of the filter paper weighed before filtration. Further, the solution dissolved in tetrahydrofuran was subjected to LC-MS analysis to check whether or not other components were contained. The structure of the crystals precipitated in the ink and obtained by filtration was analyzed by GC-MS analysis and LC-MS analysis+$C^{13}$-NMR+$H^1$-NMR+FT-IR. As a result of the qualitative analysis, it was confirmed that all was cyclic esters having a structure represented by the following Chemical formula B.

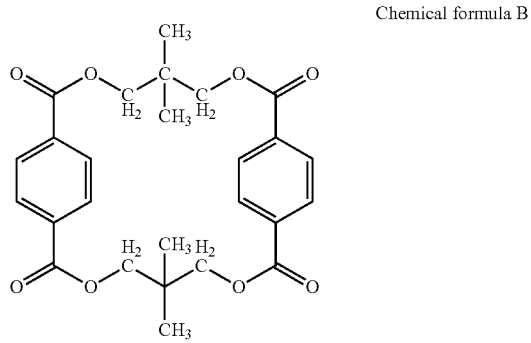 [SMILES: CC1(C)COC(=O)c2ccc(cc2)C(=O)OCC(C)(C)COC(=O)c2ccc(cc2)C(=O)OC1]

Chemical formula B

Ink Discharging (Image Forming)

In an environment of 22.5 to 23.5 degrees C. and 45 to 55 percent RH, using an inkjet recording device (IPSiO GXe-5500, manufactured by RICOH CO., LTD.), the drive voltage of the piezo element was changed to discharge the same amount of ink in order to attach the same amount of the ink onto a recording medium (OK topcoat+, weight: 104.7 g/m², manufactured by OJI PAPER CO., LTD.). In Examples 18, 19 and Comparative Examples 18 and 19, a filter was provided on the ink flow path between the ink containing unit (ink cartridge) and the discharging head (device to discharge the ink).

As the filter, the following Acro-Last Chance filter (manufactured by NIHON PALL LTD.) was used.

10 μm disposable filter: PALL ACRO25 LCF-12100, filtration accuracy: 10 μm, material: polypropylene Next, the manufacturing of the nozzle plate to be mounted on an inkjet head will be described.

Manufacturing Example 101

Manufacturing of Nozzle Plate A
Synthesis of Fluorine-Containing Acrylate Ester Polymer A
Synthesis of Fluorine Monomer (MPOERfA) Having Ethylene Oxide Chain The synthesis reaction of the fluorine monomer having an ethylene oxide chain is illustrated below.

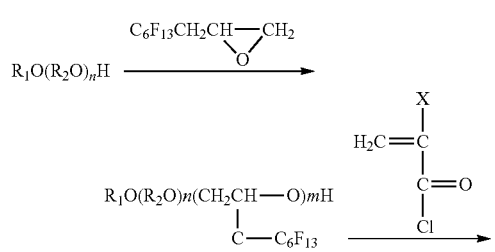

In the chemical reaction, the average of n is from 8 to 9.

Next, a four-necked flask was charged with 52.13 g of methoxypolyethylene glycol at a terminal (average EO number: 8 to 9, UNIOX M-400, manufactured by NOF Corporation) and 0.94 g of boron trifluoride diethyl ether complex. In a nitrogen atmosphere, 50 g of 3-perfluorohexyl-1,2-epoxypropane was dripped at room temperature in 30 to 40 minutes while paying attention to heat generation. After completion of dripping, the reaction was allowed to continue at room temperature for about two hours. Thereafter, it was confirmed by gas chromatography (GC) that the peak of 3-perfluorohexyl-1,2-epoxypropane had disappeared.

To this, 0.03 g of tertiary butyl catechol was added followed by stirring. Further, 14.81 g of triethylamine was added and 12.04 g of acrylic acid chloride was dripped over about 20 minutes while paying attention to heat generation. After completion of the dripping, the reaction was allowed to continue at room temperature for about two hours and it was confirmed by GC that the peak of acrylic acid chloride had almost disappeared. The product was identified by the IR spectrum, 1H-NMR and 19F-NMR spectra.

Synthesis of Fluorine-Containing Acrylate Ester Polymer A

In a 200 mL four-necked flask, 60 percent by mass of isopropyl alcohol was placed for a monomer composition of 10 percent by mass synthesized MPOERfA monomer, 60 percent by mass 2-(perfluorohexyl)ethyl acrylate, 20 percent by mass polyethylene glycol monoacrylate (EO: 10 mol, AE-400, manufactured by NOF CORPORATION), 5 percent by mass 2-hydroxyethyl acrylate, 2.5 percent by mass acetoacetoxyethyl methacrylate, and 2.5 percent by mass dimethylaminoethyl acrylate. Nitrogen was blown into this for 60 minutes to replace air in the system with nitrogen. While continuing the nitrogen flow, the internal temperature was raised to 75 to 80 degrees C. Thereafter, 0.25 g of azobisisobutyronitrile was added to allow polymerization reaction for eight hours to obtain a liquid polymer. When the liquid polymer was analyzed by gas chromatography (GC) and gel permeation chromatography, it was confirmed that the peak derived from the monomer had almost disappeared and the peak derived from a copolymer had appeared. The weight average molecular weight of the copolymer was 17,000 (in polystyrene conversion). Finally, 0.42 g of acetic acid was added for neutralization and the mixture was diluted with water to obtain a 20 percent by mass solution of the fluorine-containing acrylate ester copolymer A.

Manufacturing of Nozzle Plate

Next, a nozzle substrate made of stainless steel (SUS304) nozzle substrate of 34 mm×16 mm with an average thickness of 20 μm was prepared. On the nozzle substrate, four rows, each having 320 nozzle holes having an average hole diameter of 25 μm, were formed with a shortest distance between the centers of the nozzle holes of 85 μm (300 dpi).

A 20 percent by mass solution of the prepared fluorine-containing acrylate ester polymer A was applied to the surface of the nozzle substrate on the ink discharging side by dipping and dried to form a film having an average thickness of 50 nm.

Thus, the nozzle plate A of Manufacturing Example 101 was manufactured. At this time, the nozzle holes were masked with a water-soluble resin and the back surface of the nozzle substrate was masked with a tape. After forming the ink-repellent film, the tape was peeled off and removed. Further, the nozzle plate A was heated at 120 degrees C. for one hour to form an ink-repellent film.

Manufacturing Example 102

Manufacturing of Nozzle Plate B

Fluorine-Containing Acrylate Ester Polymer B

Synthesis of Rf Epoxy Adduct (FAGMA) with 2-Hydroxyethyl Acrylate (HEA)

The reaction formula of the synthesis reaction of the Rf epoxy adduct with 2-hydroxyethyl acrylate is shown below.

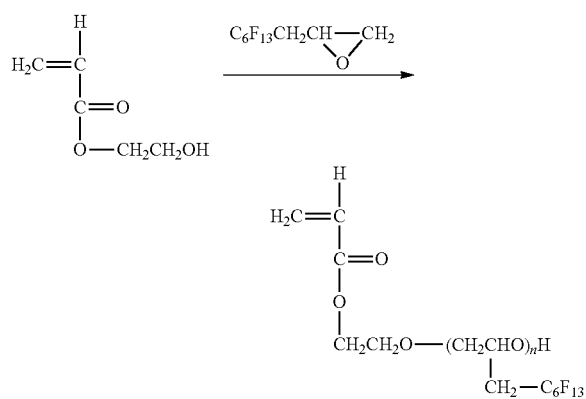

A four-necked flask was charged with 20 g of 2-hydroxyethyl acrylate (HEA), 0.61 g of boron trifluoride diethyl ether complex, and 0.026 g of tertiary-butyl catechol. In a nitrogen atmosphere, 64.83 g of 3-perfluorohexyl-1,2-epoxypropane was dripped at room temperature in 30 to 40 minutes while paying attention to heat generation. After completion of the dripping, the reaction was allowed to continue at room temperature for about two hours. Thereafter, it was confirmed by gas chromatography (GC) that the peak of 3-perfluorohexyl-1,2-epoxypropane had disappeared. After completion of the reaction, the reaction product was dissolved in 100 g of 1,1-dichloro-1,2,2,3,3-pentafluoropropane (HCFC225) and 100 g of water was further added. Thereafter, the resulting solution was rinsed and liquid-separated to extract an organic layer.

The organic layer was again subject to rinsing and liquid separation and after extracting the organic layer, 5 g of anhydrous magnesium sulfate was added followed by drying overnight. HCFC225 was evaporated to obtain an Rf epoxy adduct (FAGMA) with HEA. The product was identified by the IR spectrum, 1H-NMR and 19F-NMR spectra. According to the analysis results of the product, a monomer mixture of about 64 percent by mass 1-mol adduct (n=1) of 3-perfluorohexyl-1,2-epoxypropane, about 27 percent by mass 2-mol adduct (n=2), and about 9 percent by mass 3-mol adduct was obtained.

Synthesis of Fluorine Monomer Containing Sulfonic Acid

The synthesis reaction of the fluorine monomer containing sulfonic acid is illustrated below.

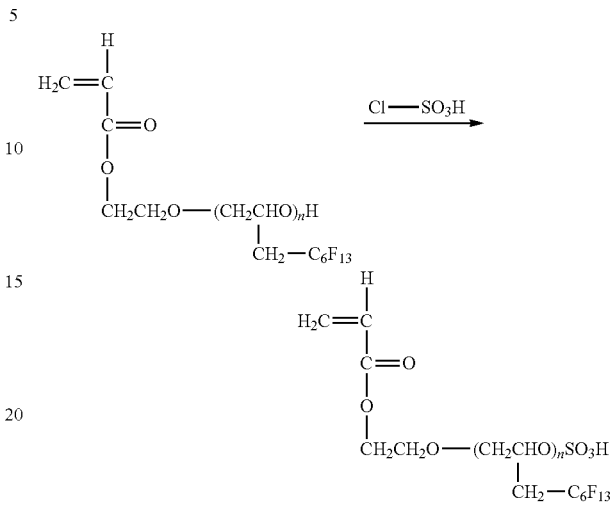

30 g of the synthesized Rf epoxy adduct (FAGMA) with HEA, 30 g of dichloromethane, 7.8 g of triethylamine, and 0.024 g of hydroquinone monomethyl ether were charged into a four-necked flask. This liquid mixture was cooled down in an ice bath in such a manner that the temperature was 0 to 10 degrees C. A dichloromethane solution (7.48 g of chlorosulfonic acid+15 g of dichloromethane) of chlorosulfonic acid was gradually dripped thereto over about 30 minutes while paying attention to heat generation. After completion of the dripping, the reaction was allowed to continue at room temperature for three hours. A total of 100 g of water was added to the reaction product and the rinsing and liquid separation operations were repeated twice. The organic layer was extracted and 5 g of anhydrous magnesium sulfate was added followed by drying overnight. The product (fluorine monomer containing sulfonic acid) was identified by the IR spectrum, 1H-NMR, and 19F-NMR spectra.

Synthesis of Fluorine-Containing Acrylate Ester Polymer B

Fluorine-containing acrylate ester polymer B was synthesized in the same manner as in Manufacturing Example 101 except that the monomer composition was changed to 60 percent by mass 2-(perfluorohexyl) ethyl acrylate, 20 percent by mass fluorine monomer containing sulfonic acid group, 17.5 percent by mass polyethylene glycol monoacrylate (EO: 10 mol, AE-400, manufactured by NOF Corporation), and 2.5 percent by mass acetoacetoxyethyl methacrylate. The weight average molecular weight of the thus-obtained copolymer was 17,000 (in polystyrene conversion). Finally, 0.42 g of acetic acid was added for neutralization and the mixture was diluted with water to obtain a 20 percent by mass solution of the fluorine-containing acrylate ester polymer B.

Manufacturing of Nozzle Plate

A 20 percent by mass solution of the prepared fluorine-containing acrylate ester polymer B was applied to the surface of the same nozzle substrate as in Manufacturing Example 101 on the ink discharging side by dipping and dried to form an ink-repellent film having an average thickness of 30 nm.

Thus, the nozzle plate B of Manufacturing Example 102 was manufactured. At this time, the nozzle holes were masked with a water-soluble resin and the back surface of the nozzle substrate was masked with a tape. After forming the ink-repellent film, the tape was peeled off and removed. Further, the nozzle plate B was heated at 120 degrees C. for one hour to form an ink-repellent film.

Manufacturing Example 103

Manufacturing of Nozzle Plate C
A fluorine-containing acrylate ester polymer solution (Optool DSX, manufactured by DAIKIN INDUSTRIES, LTD.) was prepared.
The prepared fluorine-containing acrylate ester polymer solution (Optool DSX, manufactured by DAIKIN INDUSTRIES, LTD.) was applied to the surface of the same nozzle substrate as in Manufacturing Example 101 on the ink discharging side by dipping and dried to form an ink-repellent film having an average thickness of 20 nm.
Thus, the nozzle plate C of Manufacturing Example 103 was manufactured. At this time, the nozzle holes were masked with a water-soluble resin and the back surface of the nozzle substrate was masked with a tape. After forming the ink-repellent film, the tape was peeled off and removed. Further, the nozzle plate C was heated at 120 degrees C. for one hour to form an ink-repellent film.

Manufacturing Example 104

Manufacturing of Nozzle Plate D
Silicone resin solution (SR 2441 RESIN, manufactured by Dow Corning Toray Co., Ltd.) was prepared.
The prepared silicone resin solution was applied to the surface of the same nozzle substrate as in Manufacturing Example 101 on the ink discharging side by dipping and dried to form an ink-repellent film having an average thickness of 100 nm. Thus, the nozzle plate D of Manufacturing Example 104 was manufactured. At this time, the nozzle holes were masked with a water-soluble resin and the back surface of the nozzle substrate was masked with a tape. After forming the ink-repellent film, the tape was peeled off and removed. This was heated and cured at 150 degrees C. for two hours in the atmosphere to form an ink-repellent film.

Manufacturing Example 105

Manufacturing of Nozzle Plate E
A liquid diluted to 0.2 percent by mass prepared by diluting CYTOP CTX-105 (manufactured by Asahi Glass Co., Ltd.) with a liquid mixture of Ct-solv. 100 (manufactured by ASAHI GLASS CO., LTD.) and Ct-solv. 180 (manufactured by ASAHI GLASS CO., LTD.) with a volume ratio of 1:1 was used as the ink repellent treatment agent.
Silicone rubber was placed on a spinner and 2 mL of this solution was dripped on the silicone rubber. After the dripping, the liquid was rotated on the spinner to produce a uniform film. The rate of rotation was set to firstly 1,000 rpm for 5 seconds and secondly 3,000 rpm for 20 seconds.
The same nozzle substrate surface as in Manufacturing Example 101 was pressed against the silicone rubber to transfer the film.
The number of transfer was three times and the pressing pressure was 2 kg/head.

After the transfer was completed, the head was placed in an oven at 150 degrees C. for two and a half hours for heat treatment to prepare a nozzle plate E of Manufacturing Example 105.

Manufacturing Example 106

Manufacturing of Nozzle Plate F
A liquid diluted to 0.5 percent by mass prepared by diluting AF1600 (Teflon® AF, manufactured by E.I. du Pont de Nemours and Company) with Fluorinert FC-75 (manufactured by 3M Company) was used as the ink repellent treatment agent.
Silicone rubber was placed on a spinner and 2 mL of this solution was dripped on the silicone rubber in the same manner as in Manufacturing Example 105. After the dripping, the liquid was rotated on the spinner to produce a uniform film. The rate of rotation was set to firstly 1,000 rpm for 5 seconds and secondly 3,000 rpm for 20 seconds.
The same nozzle substrate surface as in Manufacturing Example 1 was pressed onto the silicone rubber to transfer the film. The number of transfer was three times and the pressing pressure was 2 kg/head.
After the transfer was completed, the head was placed in an oven at 165 degrees C. for two and a half hours for heat treatment to prepare a nozzle plate F of Manufacturing Example 106.

Ink Discharging (Printing)
In an environment of 22.5 to 23.5 degrees C. and 45 to 55 percent RH, using an inkjet printing device (IPSiO GXe-5500, manufactured by RICOH CO., LTD.), the drive voltage of the piezo element was changed to discharge the same amount of ink in order to attach the same amount of the ink onto a recording medium (OK topcoat+, weight: 104.7 g/m$^2$, manufactured by OJI PAPER CO., LTD.).

Image Density
A chart having general symbols of 64 point JIS X 0208 (1997), 2223 created by Microsoft Word 2000 was printed on MyPaper (manufactured by Ricoh Company Ltd.) by using each ink and thereafter the colors of the symbols were measured by a spectrodensitometer (X-Rite 939, manufactured by X-Rite) to evaluate the image density of each color according to the following criteria. The print mode used was: A modified mode in which "Plain Paper—Standard Fast" was modified to "No Color Calibration" by the driver installed onto the printer. Incidentally, the symbols of JIS X 0208 (1997), 2223 had squares for the exterior and the inside thereof was entirely painted by ink.

Evaluation Criteria
A: Black: 1.25 or greater
Yellow: 0.80 or greater
Magenta: 1.00 or greater
Cyan: 1.05 or greater
B: Black: 1.20 to less than 1.25
Yellow: 0.75 to less than 0.80
Magenta: 0.95 to less than 1.00
Cyan: 1.00 to less than 1.05
C: Black: 1.15 to less than 1.20
Yellow: 0.70 to less than 0.75
Magenta: 0.90 to less than 0.95
Cyan: 0.95 to less than 1.00
D: Black: less than 1.15
Yellow: less than 0.70
Magenta: less than 0.90
Cyan: less than 0.95
Storage Stability of Ink Using the viscometer mentioned above, storage stability of an ink was determined from the viscosity of the ink before storage and the viscosity measured after storage of the ink in a sealed container at 60 degrees C. for seven days according to the following relationship and evaluated based on the following evaluation criteria.

Storage stability(percent)={(Viscosity after storage)/(viscosity before storage)}×100 storage Evaluation Criteria
A: 95 to 105 percent
B: Greater than 90 percent to less than 95 percent and greater than 105 percent to less than 110 percent
C: 90 or less and 110 or greater Liquid Permeability
Using a cellulose acetate membrane filter (28CP, manufactured by Advantec Toyo Kaisha, Ltd.) having a pore diameter of 0.8 µm, the ink was filtered under a pressure of an air pressure of 1 kgf/cm$^2$ and the liquid permeability of the ink was evaluated based on the slope (attenuation rate) obtained by linearly approximating the decrease in the filtration rate to the amount of liquid passing through the filter and the maximum filtration rate.
Evaluation Criteria Liquid permeability Good A<------>D Bad
A: Attenuation rate was less than $1.5×10^{-3}$ sec and the maximum filtration rate was 1.0 g/sec or more
B: Attenuation rate was $1.5×10^{-3}$/sec and the maximum filtration rate was less than 1.0 g/sec
C: Attenuation rate was $1.5×10^{-3}$/sec or more to less than $2.5×10^{-3}$/sec
D: Attenuation rate was $2.5×10^{-3}$/sec or more Discharging Stability 1: Continuous Discharging Evaluation Immediately after 1 L of each individually adjusted ink was passed from an ink cartridge of an inkjet printing device (IPSiO GXe-5500, manufactured by Ricoh Co., Ltd.) to a discharging head of each color, a chart of a solid image created by Microsoft Word 2000 covering 80 percent area of an A4 paper was continuously printed on MyPaper (manufactured by Ricoh Co., Ltd.) with a run length of 200 sheets and thereafter a nozzle check chart was printed to evaluate discharging disturbance of each nozzle according to the following criteria.

The print mode used was: a modified mode in which Plain Paper—Standard Fast was modified to No Color Calibration from the user setting for plain paper by the driver installed onto the printer.
Evaluation Criteria
A: No discharging disturbance present
B: Slight discharging disturbance present
C: Discharging disturbance present or no discharging present
D: Significant discharging disturbance present or many nozzles not discharging Discharging Stability 2: Evaluation on Ink Repelling Time of Nozzle Plate In an environment of 22.5 to 23.5 degrees C. and 45 to 55 percent RH, 50 g of each ink shown in Table 7 was loaded into a 50 mL beaker. The nozzle plate in the image forming device (IPSiO GXe-5500, manufactured by RICOH CO., LTD.) was taken out, nipped by tweezers, dipped into the ink at a rate of 315 mm/minute, and taken out at the same rate to measure the ink repelling time from the ink repelling layer of the nozzle plate and evaluate discharging stability according to the following criteria.
Evaluation Criteria
A: Ink repelling time of less than 10 seconds
B: Ink repelling time of 10 to less than 30 seconds
C: Ink repelling time of 30 to less than 60 seconds
D: Ink repelling time of 60 seconds or longer
If the ink repelling time is long, the nozzle plate is easily wet with the ink so that the nozzle omission tends to occur in a continuous discharging evaluation.

Receding Contact Angle
In the environment of 25 degrees C., 2.0 µl of each ink shown in Tables 4 and 5 was squeezed from a syringe having a syringe needle having an inner diameter of 0.37 µm with a inner diameter of 0.18 mm and the receding contact angle at 25 degrees C. was measured by an automatic contact angle measuring device (Dmo-501, manufactured by Kyowa Interface Science Co., Ltd.) according to the contraction method.

Drying Property
The chart having the same general symbols as for the image density was printed by the image forming device illustrated in FIG. 1 on OK TOP COAT+ (weight: 104.7 g/m$^2$, manufactured by OJI PAPER CO., LTD.). The symbols were dried by heated wind of 100 degrees C. for 10 seconds in the drying process. Thereafter, whether the ink of the image portion was attached to the transfer roll was visually checked for the dried image portion and evaluated according to the following criteria.
Evaluation Criteria
A: No transfer present
B: Slight transfer present causing no practical problem
C: Transfer present
D: Significant transfer present Alcohol Resistance (Fixability)
Using each ink, a chart carrying 64 point general symbols of JIS X 0208 (1997), 2223 created by Microsoft Word 2000 was printed on a vinyl chloride medium (NIJ-PVCM, available form Panacea). The print mode used was: A modified mode in which "Plain Paper—Standard Clear" was modified to "No Color Calibration" by the driver installed onto the printer.

A cotton swab was infiltrated with 0.5 mL of ethanol and the printed solid image portion was abraded 10 times and the image was visually checked and evaluated according to the following criteria.
Evaluation Criteria
A: No change in image area
B: Image was identifiable but slightly scratched
C: Image was identifiable but scratched
D: Image part peeled off and the recording medium part was visible.

TABLE 6

| | Ink | Ink heating temperature and heating time | Amount of crystal containing compound having structure of Chemical formula I (ppm) | 10 µm dispofilter onn ink flow path? | Nozzle plate evaluation |
|---|---|---|---|---|---|
| Example 1 | Ink 1 | 50 degrees C., 2 weeks | 3.9 | None | Nozzle plate A |

TABLE 6-continued

| | | | | | |
|---|---|---|---|---|---|
| Example 2 | Ink 2 | 60 degrees C., 48 hours | 1.8 | None | Nozzle plate A |
| Example 3 | Ink 3 | 65 degrees C., 8 hours | 0.2 | None | Nozzle plate A |
| Example 4 | Ink 4 | 40 degrees C., one month (30 days) | 3.5 | None | Nozzle plate B |
| Example 5 | Ink 5 | 60 degrees C., 24 hours | 1.1 | None | Nozzle plate C |
| Example 6 | Ink 6 | 55 degrees C., 24 hours | 1.3 | None | Nozzle plate D |
| Example 7 | Ink 7 | 68 degrees C., 6 hours | 0.4 | None | Nozzle plate E |
| Example 8 | Ink 8 | 45 degrees C., one month (30 days) | 3.7 | None | Nozzle plate F |
| Example 9 | Ink 9 | 65 degrees C., 12 hours | 1.6 | None | Nozzle plate A |
| Example 10 | Ink 10 | 60 degrees C., 24 hours | 0.4 | None | Nozzle plate B |
| Example 11 | Ink 11 | 60 degrees C., 24 hours | 0.2 | None | Nozzle plate C |
| Example 12 | Ink 12 | 60 degrees C., 24 hours | 0.2 | None | Nozzle plate D |
| Example 13 | Ink 13 | 60 degrees C., 16 hours | 0.3 | None | Nozzle plate E |
| Example 14 | Ink 14 | 65 degrees C., 12 hours | 1.2 | None | Nozzle plate F |
| Example 15 | Ink 15 | 60 degrees C., 12 hours | 0.7 | None | Nozzle plate A |
| Example 16 | Ink 16 | 60 degrees C., 16 hours | 0.5 | None | Nozzle plate B |
| Example 17 | Ink 17 | 50 degrees C., 36 hours | 3.8 | None | Nozzle plate C |
| Example 18 | Ink 17 | 50 degrees C., 36 hours | 3.8 | Yes | Nozzle plate A |
| Example 19 | Ink 1 | 50 degrees C., 2 weeks | 3.9 | Yes | Nozzle plate A |
| Example 20 | Ink 21 | None | 1.5 | None | Nozzle plate C |
| Example 21 | Ink 22 | None | 0.2 | None | Nozzle plate C |
| Example 22 | Ink 23 | None | 0.0 | None | Nozzle plate C |
| Example 23 | Ink 24 | None | 0.4 | None | Nozzle plate C |
| Example 24 | Ink 25 | None | 0.2 | None | Nozzle plate C |
| Example 25 | Ink 26 | None | 0.0 | None | Nozzle plate C |
| Example 26 | Ink 27 | 60 degrees C., 12 hours | 0.0 | None | Nozzle plate C |
| Comparative Example 1 | Pre-ink 1 | None | 14.5 | None | Nozzle plate A |
| Comparative Example 2 | Pre-ink 2 | None | 5.4 | None | Nozzle plate A |
| Comparative Example 3 | Pre-ink 3 | None | 4.6 | None | Nozzle plate B |
| Comparative Example 4 | Pre-ink 4 | None | 6.1 | None | Nozzle plate C |
| Comparative Example 5 | Pre-ink 5 | None | 6.3 | None | Nozzle plate D |
| Comparative Example 6 | Pre-ink 6 | None | 6.2 | None | Nozzle plate E |
| Comparative Example 7 | Pre-ink 7 | None | 6.4 | None | Nozzle plate F |
| Comparative Example 8 | Pre-ink 8 | None | 6.9 | None | Nozzle plate A |
| Comparative Example 9 | Pre-ink 9 | None | 5.3 | None | Nozzle plate B |
| Comparative Example 10 | Pre-ink 10 | None | 4.2 | None | Nozzle plate C |
| Comparative Example 11 | Pre-ink 11 | None | 4.8 | None | Nozzle plate D |
| Comparative Example 12 | Pre-ink 12 | None | 6.9 | None | Nozzle plate E |
| Comparative Example 13 | Pre-ink 13 | None | 8.5 | None | Nozzle plate F |
| Comparative Example 14 | Pre-ink 15 | None | 6.8 | None | Nozzle plate A |

TABLE 6-continued

| | Ink | Condition | Value | Yes/None | Nozzle plate |
|---|---|---|---|---|---|
| Comparative Example 15 | Pre-ink 16 | None | 5.3 | None | Nozzle plate B |
| Comparative Example 16 | Pre-ink 14 | None | 0 | None | Nozzle plate D |
| Comparative Example 17 | Ink 18 | 38 degrees C., one month (30 days) | 6.5 | None | Nozzle plate C |
| Comparative Example 18 | Pre-ink 12 | None | 7.9 | Yes | Nozzle plate C |
| Comparative Example 19 | Pre-ink 13 | None | 8.5 | Yes | Nozzle plate F |
| Comparative Example 20 | Ink 19 | None | 14.5 | None | Nozzle plate D |
| Comparative Example 21 | Ink 20 | None | 5.4 | None | Nozzle plate A |

| | Ink | Receding contact angle (°) | Image density | Ink storage stability | Liquid permeability | Drying property |
|---|---|---|---|---|---|---|
| Example 1 | Ink 1 | 61 | — | B | B | B |
| Example 2 | Ink 2 | 60 | — | B | A | B |
| Example 3 | Ink 3 | 53 | A | A | A | A |
| Example 4 | Ink 4 | 57 | A | A | B | B |
| Example 5 | Ink 5 | 51 | A | B | A | A |
| Example 6 | Ink 6 | 38 | B | A | A | B |
| Example 7 | Ink 7 | 41 | A | A | A | B |
| Example 8 | Ink 8 | 58 | B | A | B | A |
| Example 9 | Ink 9 | 50 | A | A | A | B |
| Example 10 | Ink 10 | 64 | A | A | A | A |
| Example 11 | Ink 11 | 45 | A | A | A | A |
| Example 12 | Ink 12 | 37 | A | A | A | A |
| Example 13 | Ink 13 | 39 | A | B | A | A |
| Example 14 | Ink 14 | 46 | A | B | A | A |
| Example 15 | Ink 15 | 47 | A | A | A | A |
| Example 16 | Ink 16 | 52 | B | B | A | B |
| Example 17 | Ink 17 | 46 | A | B | B | A |
| Example 18 | Ink 17 | 48 | A | B | B | A |
| Example 19 | Ink 1 | 60 | — | B | B | B |
| Example 20 | Ink 21 | 50 | A | B | A | A |
| Example 21 | Ink 22 | 48 | A | B | A | A |
| Example 22 | Ink 23 | 46 | A | B | A | A |
| Example 23 | Ink 24 | 49 | A | B | A | A |
| Example 24 | Ink 25 | 47 | A | B | A | A |
| Example 25 | Ink 26 | 46 | A | B | A | A |
| Example 26 | Ink 27 | 49 | A | B | A | A |
| Comparative Example 1 | Pre-ink 1 | 59 | — | B | D | B |
| Comparative Example 2 | Pre-ink 2 | 54 | A | A | C | A |
| Comparative Example 3 | Pre-ink 3 | 58 | A | A | C | B |
| Comparative Example 4 | Pre-ink 4 | 52 | A | A | D | A |
| Comparative Example 5 | Pre-ink 5 | 39 | B | A | C | B |
| Comparative Example 6 | Pre-ink 6 | 40 | A | A | C | B |
| Comparative Example 7 | Pre-ink 7 | 59 | B | A | D | A |
| Comparative Example 8 | Pre-ink 8 | 50 | A | A | D | B |
| Comparative Example 9 | Pre-ink 9 | 65 | A | A | C | A |
| Comparative Example 10 | Pre-ink 10 | 44 | A | A | C | A |
| Comparative Example 11 | Pre-ink 11 | 36 | A | A | C | A |
| Comparative Example 12 | Pre-ink 12 | 40 | A | A | D | A |
| Comparative Example 13 | Pre-ink 13 | 47 | A | A | D | A |
| Comparative Example 14 | Pre-ink 15 | 46 | A | A | D | A |
| Comparative Example 15 | Pre-ink 16 | 53 | B | B | C | B |
| Comparative Example 16 | Pre-ink 14 | 38 | A | A | C | B |

TABLE 6-continued

| | Ink | | | | | |
|---|---|---|---|---|---|---|
| Comparative Example 17 | Ink 18 | 47 | A | A | C | A |
| Comparative Example 18 | Pre-ink 12 | 49 | A | A | D | A |
| Comparative Example 19 | Pre-ink 13 | 47 | A | A | D | A |
| Comparative Example 20 | Ink 19 | 28 | — | B | D | B |
| Comparative Example 21 | Ink 20 | 30 | A | B | C | B |

| | Ink | Discharging stability-1 Continuous discharging evaluation | Discharging stability-2 Ink repelling time | Alcohol resistance (fixability) |
|---|---|---|---|---|
| Example 1 | Ink 1 | B | A | A |
| Example 2 | Ink 2 | A | A | A |
| Example 3 | Ink 3 | A | A | A |
| Example 4 | Ink 4 | B | A | A |
| Example 5 | Ink 5 | A | A | A |
| Example 6 | Ink 6 | A | B | A |
| Example 7 | Ink 7 | A | B | A |
| Example 8 | Ink 8 | B | A | B |
| Example 9 | Ink 9 | A | A | A |
| Example 10 | Ink 10 | A | A | A |
| Example 11 | Ink 11 | A | A | B |
| Example 12 | Ink 12 | A | B | A |
| Example 13 | Ink 13 | A | B | A |
| Example 14 | Ink 14 | A | A | A |
| Example 15 | Ink 15 | A | A | A |
| Example 16 | Ink 16 | A | A | A |
| Example 17 | Ink 17 | B | A | A |
| Example 18 | Ink 17 | A | A | A |
| Example 19 | Ink 1 | A | A | A |
| Example 20 | Ink 21 | A | A | A |
| Example 21 | Ink 22 | A | A | A |
| Example 22 | Ink 23 | A | A | A |
| Example 23 | Ink 24 | A | A | A |
| Example 24 | Ink 25 | A | A | A |
| Example 25 | Ink 26 | A | A | A |
| Example 26 | Ink 27 | A | A | A |
| Comparative Example 1 | Pre-ink 1 | D | A | A |
| Comparative Example 2 | Pre-ink 2 | C | A | A |
| Comparative Example 3 | Pre-ink 3 | C | A | A |
| Comparative Example 4 | Pre-ink 4 | D | A | A |
| Comparative Example 5 | Pre-ink 5 | C | B | A |
| Comparative Example 6 | Pre-ink 6 | C | B | A |
| Comparative Example 7 | Pre-ink 7 | D | A | B |
| Comparative Example 8 | Pre-ink 8 | D | A | A |
| Comparative Example 9 | Pre-ink 9 | C | A | A |
| Comparative Example 10 | Pre-ink 10 | C | A | B |
| Comparative Example 11 | Pre-ink 11 | D | B | A |
| Comparative Example 12 | Pre-ink 12 | D | B | A |
| Comparative Example 13 | Pre-ink 13 | D | A | A |
| Comparative Example 14 | Pre-ink 15 | C | A | A |
| Comparative Example 15 | Pre-ink 16 | C | A | A |
| Comparative Example 16 | Pre-ink 14 | C | A | D |
| Comparative Example 17 | Ink 18 | C | B | A |
| Comparative Example 18 | Pre-ink 12 | C | B | A |

TABLE 6-continued

| | | | | |
|---|---|---|---|---|
| Comparative Example 19 | Pre-ink 13 | C | A | A |
| Comparative Example 20 | Ink 19 | D | D | A |
| Comparative Example 21 | Ink 20 | D | D | A |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An ink, comprising:
water;
an organic solvent;
a polyurethane resin; and
a cyclic ester including a structure represented by Chemical formula I,

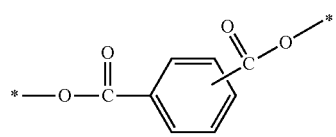

Chemical formula I wherein a proportion of the cyclic ester having a particle diameter of 1 μm or greater is less than 4 ppm of a total of the ink after the ink is allowed to stand at a temperature range of from 20 to 30 degrees C. for 30 days.

2. The ink according to claim 1, wherein the polyurethane resin comprises a polyurethane resin having a structure represented by the Chemical formula I.

3. The ink according to claim 1, further comprising a colorant.

4. The ink according to claim 3, wherein a proportion of a solid portion of the polyurethane resin in the ink is 3 percent by mass or more and a solid portion ratio of the colorant to the polyurethane resin is from 1.0:2.0 to 1.0:11.0.

5. The ink according claim 1, wherein the organic solvent comprises a diol compound and an organic solvent having a solution parameter (SP) of from 8.9 to 12.0.

6. The ink according to claim 1, wherein the ink has a pH of 8.5 or greater.

7. The ink according to claim 6, further comprising a strong basic compound.

8. The ink according to claim 7, wherein the strong basic compound comprises sodium hydroxide or potassium hydroxide.

9. The ink according to claim 1, further comprising a polyether-modified siloxane compound.

10. A method of manufacturing an ink, comprising:
mixing water, an organic solvent, and polyurethane resin to obtain a mixture; and
heating the mixture in a temperature range of from 40 to lower than 70 degrees C. for six hours to obtain the ink according to claim 1.

11. A method of manufacturing an ink, comprising:
mixing water, an organic solvent, a polyurethane resin, and a colorant to obtain a mixture; and
heating the mixture in a temperature range of from 40 to lower than 70 degrees C. for six hours to obtain the ink according to claim 1.

12. A printing method, comprising:
attaching the ink of claim 1 to a substrate.

13. The printing method according to claim 12,
wherein the attaching further includes discharging the ink from an ink discharging head including a nozzle plate through which the ink is discharged,
wherein the ink comprises water, an organic solvent, a polyurethane resin, and
a cyclic ester including a structure represented by Chemical formula I,

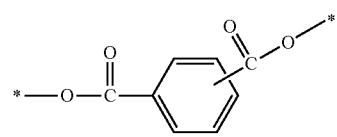

Chemical formula I wherein a proportion of the cyclic ester having a particle diameter of 1 μm or greater is less than 4 ppm of a total of the ink after the ink is allowed to stand at a temperature range of from 20 to 30 degrees C. for 30 days,
wherein the ink has a receding contact angle of 35 degrees or greater to the nozzle plate.

14. A printing device, comprising:
an ink cartridge containing the ink of claim 1; and
a discharging device that discharges the ink.

15. The printing device according to claim 14, further comprising a filter disposed on an ink flow path between the ink cartridge and the discharging device.

16. The printing device according to claim 14,
wherein the discharging device comprises an ink discharging head including a nozzle plate that discharges the ink,
wherein the ink has a receding contact angle of 35 degrees or greater to the nozzle plate.

17. The printing device according to claim 16,
wherein the nozzle plate has an ink-repellent film
wherein the ink-repellent film comprises a fluorine-containing acrylate ester polymer.

18. The printing device according to claim 17,
wherein the fluorine-containing acrylate ester polymer comprises a polymer obtained by polymerizing at least one of a compound represented by the following Chemical formula II and a compound represented by the following Chemical formula III, Chemical formula II

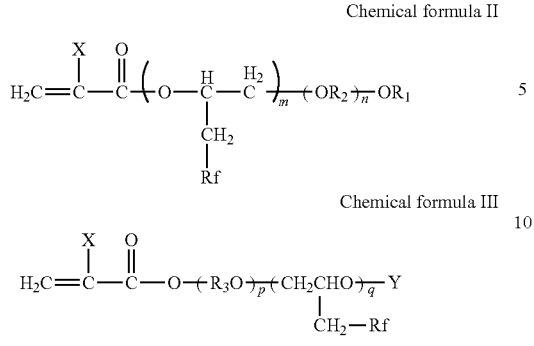

Chemical formula III where, in Chemical formula II and Chemical formula III, X represents a hydrogen atom, a linear or branched alkyl group having 1 to 21 carbon atoms, a halogen atom, a CFX1X2 group, where X1 and X2 each, independently represent hydrogen atoms or halogen atoms, a cyano group, a linear or branched fluoroalkyl group having 1 to 21 carbon atoms, a substituted or non-substituted benzyl group, and a substituted or non-substituted phenyl group, $R_1$ represents an alkyl group having 1 to 18 carbon atoms, $R_2$ represents an alkylene group having 2 to 6 carbon atoms, $R_3$ represents an alkylene group having 2 to 6 carbon atoms, Y represents an acid group, Rf represents a linear or branched fluoroalkyl group having 1 to 21 carbon atoms, m represents an integer of from 1 to 10, n represents an integer of from 2 to 90, p represents an integer of from 1 to 90, and q represents an integer of from 1 to 10.

19. The printing device according to claim 18, wherein the fluorine-containing acrylate ester polymer comprises a polymer having at least one of a structure unit represented by the following Chemical formula IV and a structure unit represented by the following Chemical formula V, Chemical formula IV

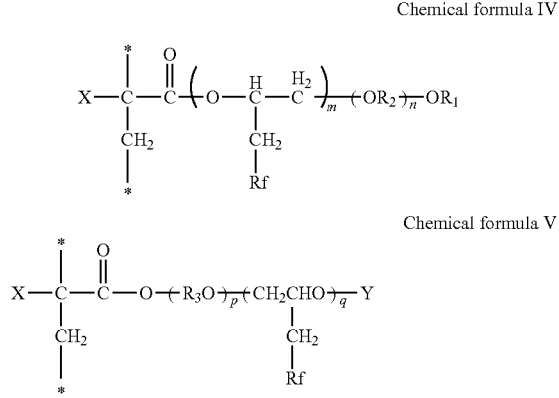

Chemical formula V where, in Chemical formula IV and Chemical formula V, X represents a hydrogen atom, a linear or branched alkyl group having 1 to 21 carbon atoms, a halogen atom, a CFX1X2 group, where X1 and X2 each, independently represent hydrogen atoms or halogen atoms, a cyano group, a linear or branched fluoroalkyl group having 1 to 21 carbon atoms, a substituted or non-substituted benzyl group, and a substituted or non-substituted phenyl group, $R_1$ represents an alkyl group having 1 to 18 carbon atoms, $R_2$ represents an alkylene group having 2 to 6 carbon atoms, $R_3$ represents an alkylene group having 2 to 6 carbon atoms, Y represents an acid group, Rf represents a linear or branched fluoroalkyl group having 1 to 21 carbon atoms, m represents an integer of from 1 to 10, n represents an integer of from 2 to 90, p represents an integer of from 1 to 90, and q represents an integer of from 1 to 10.

20. The printing device according to claim 17, wherein the ink-repellent film comprises a polymer having a fluorine-containing heterocyclic structure in a main chain.

* * * * *